(12) United States Patent
Takada

(10) Patent No.: US 6,697,486 B1
(45) Date of Patent: Feb. 24, 2004

(54) ECHO CANCELER AND OPERATING METHOD

(75) Inventor: Masashi Takada, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/533,968

(22) Filed: Mar. 23, 2000

(30) Foreign Application Priority Data

Sep. 7, 1999 (JP) .............................. 11-253168

(51) Int. Cl.⁷ .................................................. H04B 3/20
(52) U.S. Cl. ............................. 379/406.01; 379/406.02; 379/406.08; 379/406.07; 379/406.09; 370/290
(58) Field of Search ...................... 379/406.01, 406.02, 379/406.04, 406.05, 406.06, 406.07, 406.08, 406.09, 406.12, 392.01, 390.03, 390.02, 390.01, 392; 370/286, 288, 289, 290; 455/570

(56) References Cited

U.S. PATENT DOCUMENTS 5,546,459 A   8/1996  Sih et al.
5,696,821 A   12/1997 Urbanski
5,745,564 A   4/1998  Meek
5,909,384 A   6/1999  Tal et al.
6,185,300 B1 * 2/2001  Romesburg ............ 379/406.01

FOREIGN PATENT DOCUMENTS

DE   198 48 641    10/1997
JP   9-93088       4/1997
JP   A-9-93088    4/1997

* cited by examiner

Primary Examiner—Rexford Barnie
(74) Attorney, Agent, or Firm—Venable; James R. Burdett

(57) ABSTRACT

When an echo attenuation amount ACOM(i) is smaller than a desired echo attenuation amount ACOM, and an echo cancellation amount ACANC(i) is equal to or greater than a echo/noise ratio E/N(i), a block length computer increases the block length BL(i) and outputs that increased block length BL(i) to a block length controller. The echo canceler comprises such a block length computer and such a block length controller, wherefore the echo attenuation amount can ultimately be made to be equal to or greater than the desired echo attenuation amount.

33 Claims, 26 Drawing Sheets

ECHO CANCELER AND OPERATING METHOD

BACKGROUND OF THE INVENTION

1. Field of the Invention

This invention relates to an echo canceler and to an operating method therefor.

2. Description of Related Art

In long-distance telephone lines, part of the reception signal output from the sending party's end passes through a two-wire-to-four-wire conversion hybrid (or echo path) on the receiving party's end and circles back to the sending party, resulting in an echo which interferes significantly with the call. One apparatus for preventing this is a conventional echo canceler. One example of such an echo canceler is disclosed in Japanese Patent Application Laid-Open No. H9-93088/1997.

FIG. 27 is a configuration diagram for an echo canceler disclosed in the cited literature.

This echo canceler 100 comprises an adaptive filter modulus computing system 102, and adaptive filter 104, and an adder 106. The adaptive filter modulus computing system 102 produce an adaptive filter modulus $H_m(i)$ for eliminating an echo $E(i)$ that comes back with a delay to the sender's side SS. The adaptive filter 104, using that adaptive filter modulus $H_m(i)$, produces a pseudo-echo signal $GE(i)$ for that echo $E(i)$. The adder 106 subtracts the pseudo-echo signal $GE(i)$ from the echo $E(i)$ to eliminate the echo $E(i)$. Accordingly, the power of the echo component in the voice of the receiving party that comes back after a delay to the receiving side RS is reduced.

The symbol i (i=1, 2, 3, . . . ) represents a sample number for each signal. For example, the reception signal $X(i)$ for the sample number 2 becomes $X(2)$. The symbol m (m=1, 2, 3, . . . ) is a number (or convolution number) associated with each of a plurality of the delayers (or tap devices) that configure the adaptive filter modulus computer (described below) contained in the adaptive filter modulus computing system 102. For example, the adaptive filter modulus $H_m(i)$ for the sample number 3 in the delayer having the number 5 becomes $H_5(3)$.

A concrete description is now given for the operation of the adaptive filter modulus computing system 102, the adaptive filter 104, and the adder 106.

This adaptive filter modulus computing system 102 only operates when the call status is in a simplex status, that is, when a reception signal $X(i)$ directed toward the receiving party's side RS by the sending party exists, but no transmission signal exists that is directed toward the sending party's side SS by the receiving party. This adaptive filter modulus computing system 102 estimates the delay characteristics (that is, impulse response in the echo path) of the two-wire-to-four-wire conversion hybrid HB at the receiving party's side RS by a commonly known least mean square method (hereinafter LMS method). That estimated impulse response becomes the adaptive filter modulus $H_m(i)$ described above. With the LMS method, the power of the echo cannot be reduced to or below the noise level. A method for resolving this problem is disclosed in the prior art literature cited earlier. Specifically, this adaptive filter modulus computing system 102 computes the adaptive filter modulus $H_m(i)$ according to formula 16 or formula 17 below, each of which is a computation formula in the LMS method.

$$A_m(i) = \sum_{j=iBL(i)+1}^{(i+1)BL(i)} ER(j) X(j-m) \\ XP_m = \sum_{i=1}^{T} \left( \sum_{j=iBL(i)+1}^{(i+1)BL(i)} X^2(j-m) \right) \\ R_m(i) = \frac{A_m(i)}{XP_m} \\ H_m(i+1) = H_m(i) + KR_m(i)$$ (16)

$$A_m(i) = \sum_{j=iBL(i)+1}^{(i+1)BL(i)} ER(j) X(j-m) \\ XP_m(i) = \sum_{j=iBL(i)+1}^{(i+1)BL(i)} X^2(j-m) \\ R_m(i) = \frac{A_m(i)}{XP_m(i)} \\ H_m(i+1) = H_m(i) + KR_m(i)$$ (17)

In these formulas 16 and 17, $ER(i)$ represents the echo remainder, that is, the difference between the echo $E(i)$ and the pseudo-echo signal $GE(i)$. This echo remainder $ER(i)$ is the echo component that cannot be eliminated, and hence remains, even after subtracting the pseudo-echo signal $GE(i)$ from the echo $E(i)$. $R_m(i)$ is the modulus update amount. K (K>0) is the step gain. $BL(i)$ is the block length (or number of computation terms). T is the number of delayers (or tap devices) contained in the adaptive filter modulus computing system 102 that are used. This number used is called the tap length T, and is preset. The maximum value of this tap length T is the total number of delayers.

The parameters for the adaptive filter modulus $H_m(i)$ described in the foregoing are the echo remainder $ER(i)$, the reception signal $X(i)$, and the block length $BL(i)$. Of these parameters, the echo remainder $ER(i)$ and reception signal $X(i)$ are both observed values, while the block length $BL(i)$ is an artificial parameter.

The method of determining the block length $BL(i)$ is now described.

The adaptive filter modulus computing system 102 described in the foregoing compares the size relationship between the modulus update amount in the formulas 16 and 17 and the $R_m(i)$ after one sample from that modulus update amount $R_m(i)$, and thereby determines the block length $BL(i)$ which it outputs to the adaptive filter 104.

Now, according to the LMS method, by producing a pseudo-echo signal $GE(i)$ using the adaptive filter modulus $Hm(i)$ produced according to formulas 16 and 17, and subtracting that pseudo-echo signal $GE(i)$ from the echo $E(i)$, the power of the echo remainder $ER(i)$ is reduced to the level of the power of the noise $N(i)$. This noise $N(i)$, however, is assumed not to contain an echo component.

According to formula 16 or formula 17, when the modulus update amount is $Rm(i+1) \leq Rm(i)$, $H_m(i)$ converges. When this happens, this adaptive filter modulus computing system 102 estimates that the power of the echo remainder $ER(i)$ can be reduced to the level of the noise $N(i)$ power, and, based on that decision, holds the block length $BL(i)$.

When the modulus update amount is $Rm(i+1) > Rm(i)$, the adaptive filter modulus $H_m(i)$ diverges. When that happens, the adaptive filter modulus computing system 102 described earlier estimates that the power of the echo remainder $ER(i)$ cannot be reduced to the level of the noise $N(i)$ power, and, based on that decision, lengthens the block length $BL(i)$.

This adaptive filter modulus computing system 102, however, does not lengthen the block length BL(i) using the block length BL(i) at that current point in time as a reference value, but sequentially lengthens it from the predetermined minimum value of the block length. For example, if the current block length BL(i) is 30 and the modulus update value $R_m(i+1) > R_m(i)$, this block length BL(i) will first return from 30 to the minimum value (10, for example) of the block length BL(i). Next, this adaptive filter modulus computing system 102 starts increasing that block length BL(i) at a constant ratio (adding 1 at a time, for example), from that minimum value. This computation of the modulus update amount $R_m(i)$ by lengthening the block length BL(i) is continued until $R_m(i+1) \leq R_m(i)$.

Next, the adaptive filter 104 described earlier produces a pseudo-echo signal GE(i) for the echo E(i) that circles back to the sending party's side SS, using formula 3 below. That is, the adaptive filter 104 produces the pseudo-echo signal GE(i) by convoluting the reception signal X(i) with the adaptive filter modulus $H_m(i)$ output from the adaptive filter modulus computing system 102, and outputs that to the adder 106.

$$GE(i) = \sum_{m=1}^{T} H_m(i) X(i-m) \qquad (3)$$

Next, that adder 106 subtracts the pseudo-echo signal GE(i) from the echo E(i) and thereby weakens the power of the echo E(i).

By repeating the process described in the foregoing, according to the LMS method, the power of the echo remainder can theoretically be lowered to the noise power from formula 3 and either formula 16 or formula 17.

However, the echo canceler 100 described in the foregoing is subject to a number of problems as discussed below.

First Problem: According to the known LMS method described in the foregoing, the power of the echo remainder ER(i) cannot theoretically be lowered below the level of the noise N(i) power.

Second Problem: Even with prior art that remedies the problems with the LMS method, moreover, the power of the echo remainder ER(i) cannot always be lowered to the level of the noise N(i) power. This is due to the following main causative factors:

(1) amplitude of noise N(i) fluctuates greatly;

(2) impulse response in echo path fluctuates; and (3) tap length T is inadequate.

Thus the call is interfered with because the power of the echo remainder ER(i) is greater than the power of the noise N(i).

Third Problem: According to the echo canceler 100 having the conventional configuration described in the foregoing, moreover, when the modulus update amount $R_m(i+1) > R_m(i)$, the block length BL(i) is sequentially lengthened with a constant ratio from the predetermined minimum value, following formula 16 or 17 given earlier, until the modulus update amount becomes such that $R_m(i+1) \leq R_m(i)$ As a consequence, the computation volume for updating the modulus update amount $R_m(i)$ becomes significantly larger. Accordingly, much time is required to determine the block length BL(i), resulting in the shortcoming that much time is required to determine the adaptive filter modulus $H_m(i)$. This also involves the shortcoming of the power consumption becoming high.

Fourth Problem: According to the echo canceler 100 having the conventional configuration described in the foregoing, moreover, the block length BL(i) is only computed when the call status is simplex. Hence when the call status changes to the simplex status from any call status other than the simplex status, this echo canceler 100 must again redo the block length BL(i) computation beginning from the predetermined minimum value. As a result, in the simplex status, much time is required to determine the block length BL(i), resulting in the shortcoming that much time is required to determine the adaptive filter modulus $H_m(i)$ This also involves the shortcoming of the power consumption becoming high.

SUMMARY OF THE INVENTION

Thereupon, an object of the present invention is to provide an echo canceler capable of lowering the power of the echo remainder below the level of the noise power in order to resolve the first problem.

Another object of the present invention is to provide an echo canceler capable of lowering the power of the echo remainder to the level of the noise power, even when the noise amplitude fluctuates greatly, even when the impulse response in the echo path fluctuates, and even when the tap length is inadequate, in order to resolve the second problem.

Yet another object of the present invention is to provide an echo canceler that performs simple computations in deriving the adaptive filter modulus, in order to resolve the third problem.

Yet another object of the present invention is to provide an echo canceler that estimates the block length when the call status is other than the simplex status, and utilizes that estimated block length when the call status is changed from that non-simplex status to the simplex status, in order to resolve the fourth problem.

In order to attain these objects, the echo canceler of the present invention comprises a unique configuration that is described below. That is, the echo canceler of the present invention comprises an adaptive filter modulus computing system, adaptive filter, and adder for eliminating the echo produced when part of the reception signal output from the sending party side in a telephone line circles around to that sending party side via an echo path on the receiving party side.

With this invention, the adaptive filter modulus computing system estimates the echo path impulse response by the least mean square method, and outputs that estimated impulse response as the adaptive filter modulus. The adaptive filter convolutes the adaptive filter modulus and the reception signal and thereby produces, and outputs, a pseudo-echo signal for the echo. And the adder subtracts the pseudo-echo signal from the echo, thereby eliminating that echo.

With this invention, moreover, the adaptive filter modulus computing system described above comprises a duplex detector, block length determinator, and adaptive filter modulus computer.

With this invention, the difference between the echo and the pseudo-echo signal is made the echo remainder, the logarithmic ratio between the power of the reception signal and the power of the echo remainder is made the echo attenuation amount, and any predetermined target value for that echo attenuation amount is made the desired echo attenuation amount. The duplex detector noted above determines what the call status is, whether the simplex status, duplex status, call-transmission status, or non-calling status.

With this present invention, furthermore, when the call status has been determined by the duplex detector to be the simplex status, the block length determinator determines the block length in the least mean square method, and outputs it, so that the echo attenuation amount is finally made to be equal to or greater than the desired echo attenuation amount. The adaptive filter modulus computer then computes the adaptive filter modulus, using the block length, the echo remainder, and the reception signal, and outputs that adaptive filter modulus to the adaptive filter.

According to the configuration of this invention, when the duplex detector has determined that the call status is the simplex status, the echo attenuation amount can be made equal to or greater than the desired echo attenuation amount. That desired echo attenuation amount can be preset to any value. Accordingly, if, for example, the desired echo attenuation amount is set so that it is larger than the logarithmic ratio between the reception signal power and the noise power, the echo remainder power can be lowered below the level of the noise power.

In embodying this invention, it is preferable that, if in sample number i (i=1, 2, 3, . . . ) the reception signal be made X(i), the echo remainder be made ER(i), the m'th (m=1, 2, 3, . . . ) adaptive filter modulus be made $H_m(i)$, and the block length be made BL(i), then, when the duplex detector has determined that the call status is the simplex status, the adaptive filter modulus computer be configured so that it computes the adaptive filter modulus $H_m(i)$ according to formula 1 below (where $\delta_P$ is a smoothing constant within the range $0<\delta_P<1$, and K (K>0) is the step gain).

$$\left. \begin{array}{l} A_m(i) = \sum_{j=iBL(i)+1}^{(i+1)BL(i)} ER(j) X(j-m) \\ XP_m = (1-\delta_p)XP_m(i-1) + \delta_p X^2(i) \\ R_m(i) = \dfrac{A_m(i)}{XP_m(i)} \\ H_m(i+1) = H_m(i) + KR_m(i) \end{array} \right\} \quad (1)$$

According to this configuration of this invention, $XP_m(i)$ is approximately smoothed as a recurrence formula. Accordingly, compared to the $XP_m(i)$ formula in the conventional configuration, the computation volume and memory volume required to derive this $XP_m(i)$ are sharply reduced. Accordingly, the adaptive filter modulus $H_m(i)$ can be simply derived.

In embodying this invention, moreover, it is preferable that, when the noise is made a noise component that excludes the echo component, the logarithmic ratio between the echo power and the echo remainder power is made the echo cancellation amount, and the logarithmic ratio between the echo power and the noise power is made the echo/noise ratio, the block length determinator comprises an echo attenuation amount computer, a desired echo attenuation amount indicator, an echo cancellation amount computer, an echo/noise comparison unit, a block length computer, and a block length controller.

When the duplex detector has determined that the call status is the simplex status, the echo attenuation amount computer noted above computes and outputs the echo attenuation amount. The desired echo attenuation amount indicator noted above indicates the desired echo attenuation amount. The echo cancellation amount computer computes and outputs the echo cancellation amount. And the echo/noise comparison unit computes and outputs the echo/noise ratio.

The block length computer noted above, based on the echo attenuation amount, desired echo attenuation amount, echo cancellation amount, and echo/noise ratio, computes and outputs the block length so that the echo attenuation amount is made equal to or greater than the desired echo attenuation amount.

From that block length, the block length controller noted above determines the block length to be output to the adaptive filter modulus computer and outputs that block length to the adaptive filter modulus computer.

In embodying this invention, it is preferable that the echo/noise comparison unit comprise an echo power computer, a noise power computer, and an echo/noise ratio computing unit. The echo power computer computes and outputs the echo power. The noise power computer computes and outputs the noise power. The echo/noise ratio computing unit computes, and then outputs, the echo/noise ratio from the echo power output by the echo power computer and the noise power output by the noise power computer.

As according to a preferable embodiment of this invention, moreover, the echo canceler also comprises an attenuation amount controller and an attenuator. The attenuation amount controller computes and outputs an insertion attenuation amount that is an attenuation amount for further reducing the power of the echo remainder. The attenuator further reduces the power of the echo remainder by that insertion attenuation amount.

According to this configuration of this invention, in the simplex status, using the noted attenuator, the power of the echo remainder can be forcibly reduced by the insertion attenuation amount, even when the power of the echo remainder cannot be reduced to the level of the noise power due, for example, to large fluctuations in the amplitude of the noise, to fluctuations in the impulse response of the echo path, or to inadequate tap length.

According to another preferable embodiment of this invention, moreover, the echo canceler further comprises an attenuator and an attenuation amount controller such as described below. That is, the attenuation amount controller computes and outputs an insertion attenuation amount for further reducing the power of the echo remainder. With this invention, this attenuation amount controller computes the insertion attenuation amount as the difference between the desired echo attenuation amount output from the desired echo attenuation amount indicator and the echo attenuation amount output from the echo attenuation amount computer. The attenuator further reduces the power of the echo remainder by the insertion attenuation amount.

According to yet another preferable embodiment of this invention, the echo canceler further comprises an attenuator and an attenuation amount controller such as described below. That is, the attenuation amount controller computes and outputs an insertion attenuation amount for further reducing the power of the echo remainder. With this invention, this attenuation amount controller first computes a reception signal/noise ratio that is a logarithmic ratio between the reception signal power and the noise power output by the noise power computer, and then computes the insertion attenuation amount as the difference between that reception signal/noise ratio and the echo attenuation amount output from the echo attenuation amount computer. The attenuator further reduces the power of the echo remainder by the insertion attenuation amount.

According to yet another preferable embodiment of this invention, the echo canceler further comprises an attenuator and an attenuation amount controller such as described below. That is, the attenuation amount controller computes and outputs an insertion attenuation amount for further reducing the power of the echo remainder. With this invention, this attenuation amount controller computes the insertion attenuation amount as the difference between the echo/noise ratio output by the echo/noise ratio computing unit and the echo cancellation amount output by the echo cancellation amount computer. The attenuator further reduces the power of the echo remainder by the insertion attenuation amount.

In embodying this invention, it is preferable that the echo canceler also comprise a tap length controller for lengthening the tap length in the adaptive filter modulus computer when the echo cancellation amount is smaller than the echo/noise ratio.

According to this configuration of this invention, in the simplex status, even in cases where the echo remainder power cannot be reduced to the level of the noise power due to the tap length being inadequate, for example, that tap length is lengthened under the control of the tap length controller, wherefore it can be expected that the power of the echo remainder will be reduced to the level of the noise power.

In embodying this invention, moreover, it is preferable that, when the duplex detector has determined that the call status has been changed from the simplex status to the duplex status, the echo attenuation amount computer, while in that duplex status, estimate the echo attenuation amount during the time of that duplex status, and output that estimated echo attenuation amount to the block length computer.

According to this configuration of this invention, when the duplex detector has determined that the call status has changed from the duplex status to the simplex status, the adaptive filter modulus computer can utilize the estimated block length held by the block length controller during the time of the duplex status.

According to a preferable embodiment of this invention, the echo canceler further comprises an echo loss amount computer that computes an echo loss amount that is the logarithmic ratio between the reception signal power and the echo power. When the duplex detector has determined that the call status has changed from the duplex status to the simplex status, this echo loss amount computer estimates the echo attenuation amount while in this duplex status by taking it to be the sum of the echo loss amount while in the simplex status immediately prior to changing to the duplex status and the echo cancellation amount while in this simplex status. After that, this echo loss amount computer, while in this duplex status, estimates the echo remainder during this duplex status by taking it to be the difference between the reception signal during the duplex status and the estimated echo attenuation amount, and outputs that estimated echo remainder to the echo attenuation amount computer. This echo attenuation amount computer also estimates that the echo attenuation amount during this duplex status is the logarithmic ratio between the reception signal during this duplex status and the estimated echo remainder.

According to this configuration of this invention, while in the duplex status, the echo attenuation amount computer can estimate the block length using the echo remainder estimated by the echo loss amount computer.

According to another preferable embodiment of this invention, when the duplex detector has determined that the call status has changed from the simplex status to the duplex status, the echo attenuation amount computer computes the differential between the pseudo-echo signal power during this duplex status and the reception signal power during this duplex status, while in this duplex status. Then this echo attenuation amount computer estimates the echo attenuation amount during this duplex status by taking it to be the sum of that differential and the echo cancellation amount during the simplex status immediately prior to the change to this duplex status.

According to this configuration of this invention, the echo attenuation amount computer can estimate the block length by itself while in the duplex status.

In embodying this invention, it is preferable that the block length determinator described in the foregoing further comprise a delay register and a first comparator. This delay register, when the duplex detector has determined that the call status is the simplex status, holds the echo attenuation amount output by the echo attenuation amount computer, and outputs it after a delay of a $\Delta i$ sample (where $\Delta i$ is a natural number). The first comparator compares the size relationship between the echo attenuation amount output from this delay register and the echo attenuation amount output from the echo attenuation amount computer.

According to a preferable embodiment of this invention, the block length controller, according to the comparison results produced by the first comparator, either outputs to the adaptive filter modulus computer the block length output by the block length computer without delaying it, or outputs to the adaptive filter modulus computer the block length at a point in time prior to the $\Delta i$ sample held by that block length controller.

According to another preferable embodiment of this invention, the block length determinator further comprises a second delay register that delays the echo attenuation amount output by the first comparator by a $\Delta i$ sample and then outputs it, and a second comparator that compares the size relationship between the echo attenuation amount output from that second delay register and the echo attenuation amount output by the echo attenuation amount computer.

The block length computer noted above may, according to the comparison results produced by the second comparator, output the block length to the block length controller, or, alternatively, output a predetermined initial block length as the block length to the block length controller.

In embodying this invention, it is preferable that, when the noise is made a noise component that excludes the echo component, the block length determinator comprise an echo attenuation amount computer, a desired echo attenuation amount indicator, a block length computer, a delay register, a first comparator, and a block length controller.

The echo attenuation amount computer noted above computes and outputs the echo attenuation amount when the duplex detector has determined that the call status is the simplex status. The desired echo attenuation amount indicator noted above designates the desired echo attenuation amount. The block length computer noted above computes and outputs the block length, based on the echo attenuation amount and the desired echo attenuation amount, so that the echo attenuation amount is made equal to or greater than the desired echo attenuation amount. The delay register noted above holds the echo attenuation amount output by the echo attenuation amount computer, and outputs it after a delay of a $\Delta i$ sample (where $\Delta i$ is a natural number). The first comparator noted above compares the size relationship between the echo attenuation amount output from the delay register and the echo attenuation amount output from the echo attenuation amount computer. The block length controller noted above, according to the comparison results produced by the first comparator, either outputs the block length output by the block length computer to the adaptive filter modulus computer without delaying it, or, alternatively, outputs the block length at a point in time prior to the $\Delta i$ sample (where $\Delta i$ is a natural number), held by that block length controller, to the adaptive filter modulus computer.

Next, the operating method for the echo canceler of the present invention is a method for operating an echo canceler that cancels echoes resulting when part of the reception signal output from the sending party side in a telephone line circles back to the sending party side via an echo path on the receiving party side. The echo canceler operating method of the present invention contains the characteristic process steps described below.

This echo canceler comprises an adaptive filter modulus computing system, an adaptive filter, and an adder, while that adaptive filter modulus computing system comprises a duplex detector, a block length determinator, and an adaptive filter modulus computer.

In this invention, the adaptive filter modulus computing system described above estimates the impulse response of the echo path by the least mean square method, and outputs that estimated impulse response as the adaptive filter modulus. The adaptive filter noted above produces and outputs a pseudo-echo signal for the echo by convoluting the adaptive filter modulus and the reception signal. And the adder noted above cancels the echo by subtracting the pseudo-echo signal from the echo.

Here, the difference between the echo and the pseudo-echo signal is made the echo remainder, the logarithmic ratio between the power of the reception signal and the power of the echo remainder is made the echo attenuation amount, and any predetermined target value for that echo attenuation amount is made the desired echo attenuation amount.

In this invention, the duplex detector noted above determines whether the call status is a simplex status, duplex status, call-transmission status, or non-calling status. When this duplex detector has determined that the call status is the simplex status, the block length determinator noted above determines, and outputs, the block length according to the least mean square method, so that the echo attenuation amount is finally made equal to or greater than the desired echo attenuation amount. After that, the adaptive filter modulus computer noted above computes the adaptive filter modulus using the block length, the echo remainder, and the reception signal, and outputs that adaptive filter modulus to the adaptive filter.

In embodying this invention, it is preferable that the block length determinator noted above comprise an echo attenuation amount computer, a desired echo attenuation amount indicator, an echo cancellation amount computer, an echo/noise ratio computing unit, a block length computer, and a block length controller.

Here, the noise is made a noise component that excludes the echo component, the logarithmic ratio between the echo power and the echo remainder power is made the echo cancellation amount, and the logarithmic ratio between the echo power and the noise power is made the echo/noise ratio.

In this invention, when the duplex detector has determined that the call status is the simplex status, the echo attenuation amount computer noted above computes and outputs the echo attenuation amount. The desired echo attenuation amount indicator noted above designates the desired echo attenuation amount. The echo cancellation amount computer noted above computes and outputs the echo cancellation amount. The block length computer noted above computes, and outputs, the block length so that the echo attenuation amount is made equal to or greater than the desired echo attenuation amount, based on the echo attenuation amount, the desired echo attenuation amount, the echo cancellation amount, and the echo/noise ratio. The block length controller noted above, from the block length, determines the block length to output to the adaptive filter modulus computer, and outputs that block length to the adaptive filter modulus computer.

In embodying this invention, it is preferable that, when the duplex detector has determined that the call status is the simplex status, the block length computer compare the size relationship between the echo attenuation amount and the desired echo attenuation amount in process step A-1.

Process Step A-1-1: When the echo attenuation amount is equal to or greater than the desired echo attenuation amount, this block length computer outputs the block length at the current time to the block length controller, as it is, without updating it.

Process Step A-1-2: When the echo attenuation amount is smaller than the desired echo attenuation amount, on the other hand, this block length computer compares the size relationship between the echo cancellation amount and the echo/noise ratio.

Process Step A-1-2-1: When the echo cancellation amount is smaller than the echo/noise ratio, this block length computer outputs the block length at the current time, as it is, without updating it, to the block length controller.

Process Step A-1-2-2: When the echo cancellation amount is equal to or greater than the echo/noise ratio, on the other hand, if the block length at the current time is less than a predetermined maximum value of the block length, this block length computer increases the block length, and outputs that increased block length to the block length controller. Then it returns to process step A-1. If the block length at the current time is the maximum value for the block length, however, this block length computer outputs the block length at the current time, as it is, without updating it, to the block length controller.

Process Step A-2: Next, the block length controller outputs the block length to the adaptive filter modulus computer.

According to this configuration of this invention, in the simplex status, when the echo attenuation amount is equal to or greater than the desired echo attenuation amount, that echo attenuation amount can be maintained at or higher than the desired echo attenuation amount. In the simplex status, when the echo attenuation amount is smaller than the desired echo attenuation amount, and the echo cancellation amount is smaller than the echo/noise ratio, either the echo attenuation amount can be increased up to the value of the desired echo attenuation amount, or, alternatively, the power of the echo remainder can be decreased down to the level of the noise power. Moreover, in the simplex status, when the echo attenuation amount is smaller than the desired echo attenuation amount, and the echo cancellation amount is equal to or greater than the echo/noise ratio, the echo attenuation amount can be gradually increased up to the value of the desired echo attenuation amount.

Furthermore, in embodying this invention, it is preferable that the echo canceler further comprise an attenuation amount controller and an attenuator. After the processes of process step A-1-2-1, described above, the attenuation amount controller computes and outputs an insertion attenuation amount that is an attenuation amount for further reducing the power of the echo remainder. Then the attenuator further reduces the power of the echo remainder by that insertion attenuation amount.

According to this configuration of this invention, in the simplex status, the power of the echo remainder can be forcibly reduced by this insertion attenuation amount, using this attenuator, even when the echo remainder power cannot be reduced down to the level of the noise power due, for example, to large fluctuations in the noise amplitude, or fluctuations in the impulse response of the echo path, or inadequate tap length.

In embodying this invention, furthermore, it is preferable that the echo canceler further comprise a tap length controller. After the processes in process step A-1-2-1, described earlier, the tap length controller lengthens the tap length in the adaptive filter modulus computer.

According to this configuration of this invention, in the simplex status, even when the echo remainder power cannot be reduced down to the level of the noise power due to insufficient tap length, for example, that tap length is lengthened under the control of the tap length controller, wherefore the power of the echo remainder can be expected to be reduced down to the level of the noise power.

In embodying this invention, it is preferable that the echo canceler further comprise an attenuation amount controller and an attenuator. That attenuation amount controller computes and outputs an insertion attenuation amount that is an attenuation amount for further reducing the power of the echo remainder. The attenuator noted above further reduces the echo remainder power by the insertion attenuation amount output by the attenuation amount controller.

Then, after the tap length in the adaptive filter modulus computer described above has been lengthened by the tap length controller described above, the echo attenuation amount computer compares the size relationship between the echo attenuation amount after the lengthening calculated on the basis of the lengthened tap length and the echo attenuation amount prior to the lengthening calculated on the basis of the tap length prior to lengthening.

After that, when the echo attenuation amount after lengthening is larger than the echo attenuation amount prior to lengthening, this echo attenuation amount computer maintains the lengthening of the tap length in the adaptive filter modulus computer by the tap length controller.

This echo attenuation amount computer, moreover, when the echo attenuation amount after lengthening is equal to or less than the echo attenuation amount prior to lengthening, terminates the lengthening of the tap length in the adaptive filter modulus computer by the tap length controller. Then the attenuation amount controller described earlier computes an insertion attenuation amount, and the attenuator described earlier further reduces the power of the echo remainder by that insertion attenuation amount.

According to this configuration of this invention, after the tap length has been lengthened, confirmation is made as to whether or not the lengthening of the tap length was effective. When the echo attenuation amount after lengthening is larger than the echo attenuation amount prior to lengthening, then the lengthening is shown to have been effective. Accordingly, the lengthening of the tap length is continued. When the echo attenuation amount after lengthening is equal to or less than the echo attenuation amount prior to lengthening, then the lengthening is shown to have been ineffective. In that case, the power of the echo remainder can be forcibly reduced by that insertion attenuation amount by the attenuator described in the foregoing.

In embodying this invention, furthermore, it is preferable that, when the duplex detector has determined that the call status has been changed from the simplex status to the duplex status, the echo cancellation amount computer described earlier estimate the echo cancellation amount immediately prior during the simplex status immediately prior to the change to the duplex status as the echo cancellation amount during the duplex status. The echo/noise ratio computing unit described earlier estimates the echo/noise ratio immediately prior during the simplex status immediately prior to the change to this duplex status as the echo/noise ratio during that duplex status.

Next, during that duplex status, the echo attenuation amount computer described earlier estimates the echo attenuation amount during that duplex status time, and outputs that estimated echo attenuation amount to the block length computer.

Process Step B-1: The block length computer compares the size relationship between the estimated echo attenuation amount and the desired echo attenuation amount output by the desired echo attenuation amount indicator.

Process Step B-1-1: When the estimated echo attenuation amount is equal to or greater than the desired echo attenuation amount, this block length computer outputs the block length at the current time, as is, without updating it, to the block length controller.

Process Step B-1-2: Alternatively, when the estimated echo attenuation amount is smaller than the desired echo attenuation amount, this block length computer compares the size relationship between the estimated echo cancellation amount and the estimated echo/noise ratio.

Process Step B-1-2-1: When the estimated echo cancellation amount is smaller than the estimated echo/noise ratio, this block length computer outputs the block length at the current time, as is, without updating it, to the block length controller.

Process Step B-1-2-2: When, on the other hand, the estimated echo cancellation amount is equal to or greater than the estimated echo/noise ratio, if the block length at the current time is less than the predetermined maximum value of the block length, this block length computer increases the block length, and outputs the increased block length to the block length controller. Then it returns to process step. If, on the other hand, the block length at the current time is the maximum value of the block length, then the block length computer outputs the block length at the current time, as is, without updating it, to the block length controller noted above.

Process Step B-2: Next, the block length controller holds this block length without outputting it to the adaptive filter modulus computer.

The adaptive filter modulus compute r stops the computation of the adaptive filter modulus, also holds t he adaptive filter modulus immediately prior during the simplex status immediately prior to that duplex status, and outputs that adaptive filter modulus to the adaptive filter.

Next, when the duplex detector determines that the call status has been changed from the duplex status to the simplex status, the block length controller outputs the block length held by that block length controller to the adaptive filter modulus computer.

According to this configuration of this invention, when the duplex detector determines that the call status has been change d from the duplex status to the simplex status, the adaptive filter modulus computer can utilize the estimated block length held by the block length controller during the duplex status.

In embodying this invention, it is preferable that, when the logarithmic ratio between the reception signal power and the echo power is defined as the echo loss amount, the block length determinator described earlier comprise an echo loss amount computer for computing that echo loss amount.

When the duplex detector has determined that the call status has been changed from the simplex status to the duplex status, the echo loss amount computer estimates the echo attenuation amount during that duplex status to be the sum of the echo loss amount during the simplex status immediately prior to the change to that duplex status and the echo cancellation amount during that simplex status.

Next, during this duplex status, the echo loss amount computer estimates the echo remainder during that duplex status to be the difference between the reception signal during that duplex status and the estimated echo attenuation amount, and outputs that estimated echo remainder to the echo attenuation amount computer. The echo attenuation amount computer estimates the echo attenuation amount during this duplex status to be the logarithmic ratio between the reception signal during this duplex status and this estimated echo remainder, and outputs that estimated echo attenuation amount to the block length computer.

According to this configuration of this invention, during the duplex status, the echo attenuation amount computer can estimate the block length using the echo remainder estimated by the echo loss amount computer.

In embodying this invention, furthermore, it is preferable that, when the duplex detector has determined that the call status has been changed from the simplex status to the duplex status, during that duplex status, the echo attenuation amount computer described in the foregoing compute the differential between the power of the reception signal during this duplex status and the power of the pseudo-echo signal during the duplex status. Next, this echo attenuation amount computer estimates the echo attenuation amount during this duplex status as the sum of that differential and the echo cancellation amount during the simplex status immediately prior to the change to the duplex status, and outputs that estimated echo attenuation amount to the block length computer.

According to this configuration of this invention, during the duplex status, the echo attenuation amount computer can estimate the block length by itself.

In embodying this invention, furthermore, it is preferable that the block length determinator described earlier further comprise a delay register and a first comparator. Then, when the duplex detector has determined that the call status is the simplex status, the delay register holds the echo attenuation amount output by the echo attenuation amount computer, and outputs it after a delay of a $\Delta i$ sample (where $\Delta i$ is a natural number). Next, the first comparator noted above compares the size relationship between the echo attenuation amount output from the delay register and the echo attenuation amount output from the echo attenuation amount computer.

According to a preferred embodiment of this invention, when the duplex detector has determined that the call status is the simplex status, the block length computer, in process step C-1, compares the size relationship between the echo attenuation amount and the desired echo attenuation amount.

Process Step C-1-1: When the echo attenuation amount is equal to or greater than the desired echo attenuation amount, this block length computer outputs the block length at the current time, as is, without updating it, to the block length controller.

Process Step C-1-2: When the echo attenuation amount is smaller than the desired echo attenuation amount, on the other hand, the block length computer compares the size relationship between the echo cancellation amount and the echo/noise ratio.

Process Step C-1-2-1: When the echo cancellation amount is smaller than the echo/noise ratio, the block length computer outputs the block length at the; current time, as is, without updating it, to the block length controller.

Process Step C-1-2-2: When the echo cancellation amount is equal to or greater than the echo/noise ratio, on the other hand, if the block length at the current time is less than the predetermined maximum value of the block length, the block length computer increases the block length, and outputs that increased block length to the block length controller. After that, it returns to process step C-1. If, on the other hand, the block length at the current time is the maximum value for the block length, then the block length computer outputs the block length at the current time, as is, without updating it, to the block length controller.

Process Step C-2: Next, the block length controller holds the block length output by the block length computer.

Here, the echo attenuation amount output from the delay register is made the delayed echo attenuation amount, and the echo attenuation amount output from the echo attenuation amount computer is made the first undelayed echo attenuation amount.

Process Step C-3: Next, the first comparator compares the size relationship between the first undelayed echo attenuation amount and the delayed echo attenuation amount.

Process Step C-3-1: When the first undelayed echo attenuation amount is judged by the first comparator to be larger than the delayed echo attenuation amount, the first comparator causes the block length controller to output the block length output from the block length computer, without delaying it, to the adaptive filter modulus computer.

Process Step C-3-2: When, on the other hand, the first undelayed echo attenuation amount has been determined by the first comparator to be equal to or less than the delayed echo attenuation amount, the first comparator causes the block length controller to output the block length at a point in time prior to the $\Delta i$ sample held by the block length controller to the adaptive filter modulus computer.

According to this configuration of this invention, in the simplex status, confirmation is made as to whether or not the echo attenuation amount is increasing as time elapses.

When the first undelayed echo attenuation amount is larger than the delayed echo attenuation amount, that is, when the echo attenuation amount at the current time is larger than the echo attenuation amount at a point in time prior to the $\Delta i$ sample, this echo canceler is known to be operating normally. In that case, the first comparator exercises no particular control over the block length controller.

When, on the other hand, the first undelayed echo attenuation amount is equal to or less than the delayed echo attenuation amount, that is, when the echo attenuation amount at the current time is equal to or less than the echo attenuation amount at a point in time prior to the $\Delta i$ sample, it is known that this echo canceler is not operating normally. A possible cause of that would be large noise fluctuation. In that case, the first comparator judges that the echo attenuation amount cannot be reduced any further even though the block length be increased. Thereupon, the block length controller, under the control of the first comparator, outputs the block length at a point in time prior to the $\Delta i$ sample to the adaptive filter modulus computer. After that current point in time, if the large noise fluctuations have ceased, the echo attenuation amount can be expected to again be increased.

In embodying this invention, it is preferable that the block length determinator further comprise a second delay register and a second comparator.

In process step C-3-1, described in the foregoing, the first comparator also outputs the first undelayed echo attenuation amount as the first delayed echo attenuation amount for consideration. And in process step C-3-2, described in the foregoing, the first comparator also outputs the delayed echo attenuation amount as the first delayed echo attenuation amount for consideration.

Next, the second delay register delays the first delayed echo attenuation amount for consideration by the $\Delta i$ sample and outputs it as the second delayed echo attenuation amount for consideration.

Next, the second comparator compares the size relationship between the second delayed echo attenuation amount for consideration output from the second delay register and the echo attenuation amount output by the echo attenuation amount computer. When the echo attenuation amount is judged by the second comparator to be larger than the second delayed echo attenuation amount for consideration, the second comparator does nothing. When, on the other hand, the second comparator judges that the echo attenuation amount is equal to or less than the second delayed echo attenuation amount for consideration, the second comparator outputs a control signal to the block length computer to cause a predetermined initial block length to be output as the block length to the block length controller. At the same time, this second comparator outputs a control signal to the block length controller to cause the initial block length to be output to the adaptive filter modulus computer.

According to this configuration of this invention, it can be verified as to whether returning the block length to the block length at a point in time prior to the $\Delta i$ sample was effective or not.

According to a preferred embodiment of this invention, furthermore, when the duplex detector has determined that the call status is the simplex status, the first comparator, in process step D-1, compares the size relationship between the echo attenuation amount output with a delay of the $\Delta i$ sample from the delay register and the echo attenuation amount output from the echo attenuation amount computer.

Here, the echo attenuation amount output with a delay of the $\Delta i$ sample from the delay register is made the delayed echo attenuation amount, and the echo attenuation amount output from the echo attenuation amount computer is made the first undelayed echo attenuation amount.

Process Step D-1-1: When the first undelayed echo attenuation amount has been judged by the first comparator to be larger than the delayed echo attenuation amount, the first comparator outputs that first undelayed echo attenuation amount as the echo attenuation amount to the block length computer.

Process Step D-1-2: When the first comparator has judged that the first undelayed echo attenuation amount is equal to or less than the delayed echo attenuation amount, on the other hand, the first comparator causes the desired echo attenuation amount indicator to output the desired echo attenuation amount from that desired echo attenuation amount indicator to that first comparator, and then outputs that desired echo attenuation amount as the echo attenuation amount to the block length computer.

Process Step D-2: Next, the block length computer compares the size relationship between the echo attenuation amount output from the first comparator and the desired echo attenuation amount.

Process Step D-2-1: When the echo attenuation amount is equal to or greater than the desired echo attenuation amount, this block length computer outputs the block length at the current time, as is, without updating it, to the block length controller.

Process Step D-2-2: When the echo attenuation amount is smaller than the desired echo attenuation amount, on the other hand, the block length computer compares the size relationship between the echo cancellation amount and the echo/noise ratio.

Process Step D-2-2-1: When the echo cancellation amount is smaller than the echo/noise ratio, this block length computer outputs the block length at the current time, as is, without updating it, to the block length controller.

Process Step D-2-2-2: When the echo cancellation amount is equal to or greater than the echo/noise ratio, on the other hand, if the block length at the current time is less than the predetermined maximum value of the block length, the block length computer increases the block length, and outputs that increased block length to the block length controller. Then it returns to process step D-2. If, however, the block length at the current time is the maximum value of the block length, then the block length computer outputs the block length at the current time, as is, without updating it, to the block length controller.

Process Step D-3: Next, the block length controller outputs that block length to the adaptive filter modulus computer.

According to this configuration of this invention, in the simplex status, confirmation is made as to whether or not the echo attenuation amount is increasing as time elapses.

When the first undelayed echo attenuation amount is larger than the delayed echo attenuation amount, that is, when the echo attenuation amount at the current time is larger than the echo attenuation amount at a point in time prior to the $\Delta i$ sample, it is known that this echo canceler is operating normally. In that case, the first undelayed echo attenuation amount is output from the first comparator to the block length computer. Accordingly, to all appearances, the echo attenuation amount is directly output from the echo attenuation amount computer to the block length computer.

When the first undelayed echo attenuation amount is equal to or less than the delayed echo attenuation amount, on the other hand, that is, when the echo attenuation amount at the current time is equal to or less than the echo attenuation amount at a point in time prior to the $\Delta i$ sample, it is known that this echo canceler is not operating normally. A possible cause thereof is large fluctuation in the noise amplitude. In that case, the first comparator judges that the echo attenuation amount cannot be further reduced even if the block length be increased. Thereupon, the first comparator outputs the desired echo attenuation amount from the desired echo attenuation amount computer to that first comparator, and that desired echo attenuation amount is output as the echo attenuation amount to the block length computer. Accordingly, to all appearances, an echo attenuation amount having the same value as the desired echo attenuation amount is directly output from the echo attenuation amount computer to the block length computer. Hence this block length computer outputs the block length at the current time, without increasing the block length, to the block length controller. This block length controller outputs the block length at this current time to the adaptive filter modulus computer. After that current time, if the large fluctuations in the noise amplitude have ceased, it can be expected that the echo attenuation amount will again be increased.

In embodying this invention, it is preferable that the block length determinator described earlier further comprise a second delay register and a second comparator.

In process step D-1-1, described earlier, when the first comparator judges that the first undelayed echo attenuation amount is larger than the delayed echo attenuation amount, the delayed echo attenuation amount is also output as the first delayed echo attenuation amount for consideration to the second delay register. Furthermore, in process step D-1-2, described earlier, the first comparator, after causing the desired echo attenuation amount to be output from the desired echo attenuation amount indicator to that first comparator, also outputs the delayed echo attenuation amount as the first delayed echo attenuation amount for consideration to the second delay register.

Next, the second delay register outputs the delayed echo attenuation amount, after further delaying it by the $\Delta i$ sample, as the second delayed echo attenuation amount for consideration, to the second comparator.

Next, the second comparator compares the size relationship between the second delayed echo attenuation amount for consideration and the echo attenuation amount output by the echo attenuation amount computer. When this second comparator judges that the echo attenuation amount is larger than the second delayed echo attenuation amount for consideration, that second comparator does nothing. When, however, the second comparator judges that the echo attenuation amount is equal to or less than the second delayed echo attenuation amount for consideration, the second comparator causes the block length computer to output the predetermined initial block length, as the block length, to the block length controller.

According to this configuration of this invention, confirmation is made as to whether or not it was effective to return the block length at the current time to the block length at a point in time prior to the $\Delta i$ sample.

In embodying this invention, moreover, it is preferable, when the difference between the echo attenuation amount and the desired echo attenuation amount in sample number i (where i=1, 2, 3, . . . ) is made Z(i), that the block length be made BL(i), and that the increase in that block length BL(i) be made $\Delta BL(i)$, and, when the duplex detector has determined that the call status is the simplex status, and when the block length computer has determined that the echo attenuation amount input to that block length computer is smaller than the desired echo attenuation amount and that the echo cancellation amount is equal to or greater than the echo/noise ratio, that the block length computer, in accordance with formulas 2 and 2' given below, increase and compute the block length BL(i) (where INT is an integerizing function, and C1 is either a constant or a function for the ratio between the echo power and the noise power).

$$BL(i+1) = BL(i) + \Delta BL(i) \brace \Delta BL(i) = INT\left(10^{\frac{Z(i)}{20}} + C1\right)} \quad (2)$$

$$BL(i+1) = (1.0 + \Delta BL(i)) \cdot BL(i) \brace \Delta BL(i) = INT\left(10^{\frac{Z(i)}{20}} + C1\right)} \quad (2)'$$

According to this configuration of this invention, the block length BL(i) is treated as a Z(i) function. When the echo attenuation amount is sufficiently smaller than the desired echo attenuation amount, that is, when Z(i) is large, the increase $\Delta BL(i)$ in the block length BL(i) is also large, so the block length BL(i) will greatly increase. Accordingly, it is possible to quickly find the optimum block length BL(i) for making the echo attenuation amount approximate the desired echo attenuation amount. Using an echo canceler having a conventional configuration, on the other hand, the block length is increased at a constant ratio (by 1, for example) irrespective of the size of the echo attenuation amount. Accordingly, this invention is able to more quickly find the optimum block length BL(i) for making the echo attenuation amount approximate the desired echo attenuation amount than an echo canceler having a conventional configuration.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
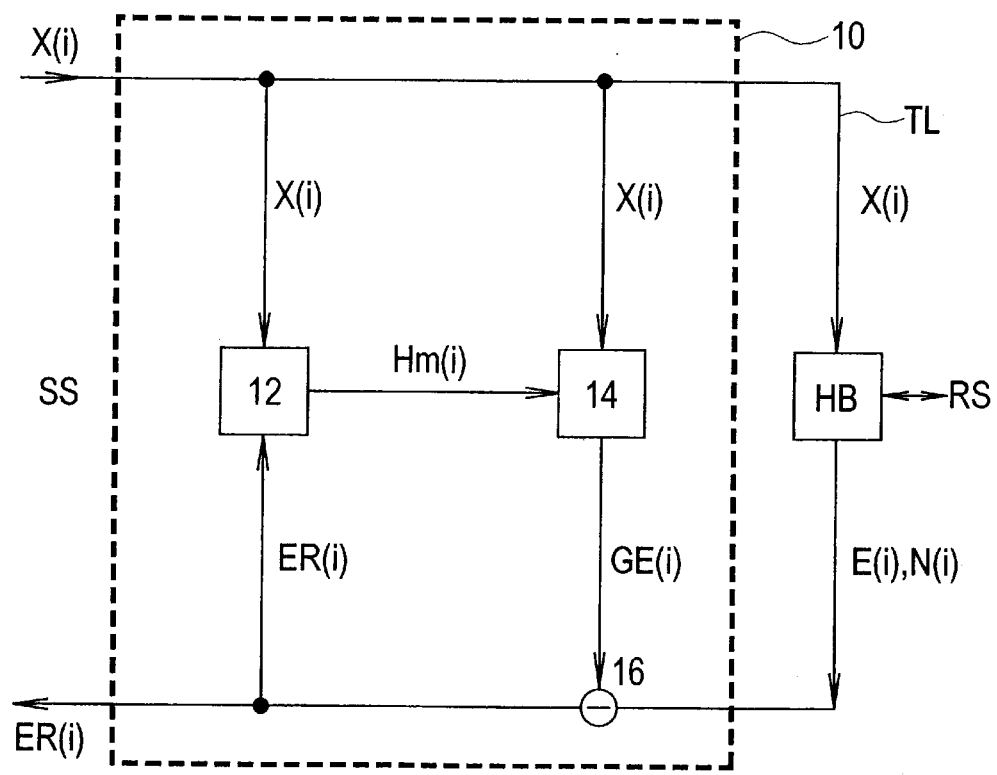
FIG. 1 is a configuration diagram of the echo canceler of the present invention.

Embodiments of the present invention are now described, in the following, with reference to the drawings. In the drawings, the sizes, shapes, and positional relationships of the configuring components are only represented to a degree sufficient to enable comprehension of the invention. Accordingly, the present invention is not limited to or by the examples shown in the drawings.

FIG. 1 is a simplified configuration diagram of an echo canceler in an embodiment of the present invention.

The echo canceler 10 is an apparatus for canceling an echo E(i) produced when a portion of a reception signal X(i) output from the sending party side SS, in a long-distance telephone line TL, circles back to the sending party side SS via an echo path (2 wire-4 wire hybrid HB) on the receiving party side RS.

This echo canceler 10 comprises an adaptive filter modulus computing system 12, an adaptive filter 14, and an adder 16.

The adaptive filter modulus computing system 12 estimates the impulse response of the echo path, inclusive of the delay characteristics of the 2 wire-4 wire hybrid HB, by an LMS method described subsequently, and, after making that estimated impulse response an adaptive filter modulus $H_m(i)$, outputs that adaptive filter modulus $H_m(i)$ to the adaptive filter 14.

By impulse response is meant a response function when the reception signal X(i) is made an impulse (delta function).

The adaptive filter 14 noted above, by convoluting the adaptive filter modulus $H_m(i)$ and the reception signal X(i), that is, following formula 3 given below, forms a pseudo-echo signal GE(i) for the echo E, and then outputs that pseudo-echo signal GE(i) to the adder 16.

This adder 16 cancels the echo E(i) by subtracting the pseudo-echo signal GE(i) from the echo E(i) that comes circling back to the sending party SS. Hence the power of the echo component that returns to the receiving party after a delay is reduced.

In actual practice, however, noise N(i) (called background noise) is also present in addition to the echo E(i), so the adaptive filter modulus $H_m(i)$ does not perfectly match the impulse response of the echo path described above.

The symbol i (where i=1, 2, 3, ...) represents a sample number for each signal. Thus the reception signal X(i) for sample number 2 becomes X(2), for example. The symbol m (where m=1, 2, 3, ...) is a number for one of a plurality of delay registers (or tap devices, not shown) configuring an adaptive filter modulus computer (described below) contained in the adaptive filter modulus computing system 12 (or, alternately, a convolution number). For example, the adaptive filter modulus $H_m(i)$ for sample number 3 in the 5th delay register is represented as $H_5(3)$. T is the number of delay registers (or tap devices) used and contained in the adaptive filter modulus computing system 12. This number of devices used is called the tap length T, and is predetermined. The maximum value for the tap length T is the total number of delay registers.

We here define the power of the reception signal X(i) as the reception signal power XP(i). More specifically, this reception signal power XP(i) is defined according to formula 4 below.

$$XP(i+1)=(1-\delta_{XP})XP(i)+\delta_{XP}X^2(i+1) \qquad (4)$$

where $\delta_{XP}$ is a smoothing constant within the range $0<\delta_{XP}<1$.

The power of the echo E(i) is defined as the echo power EP(i). More specifically, the echo power EP(i) is defined according to formula 5 below.

$$EP(i+1)=(1-\delta_{EP})EP(i)+\delta_{EP}E^2(i+1) \qquad (5)$$

where $\delta_{EP}$ is a smoothing constant within the range $0<\delta_{EP}<1$.

The power of the noise N(i) is defined as the noise power NP(i). It is assumed, however, as noted earlier, that this noise N(i) does not contain noise induced by an echo component. More specifically, in the simplex status, this noise power NP(i) is defined according to formula 6 below.

$$NP(i+1)=(1-\delta_{NP})NP(i)+\delta_{NP}N^2(i+1) \qquad (6)$$

where $\delta_{NP}$ is a smoothing constant within the range $0<\delta_{NP}<1$.

In a non-calling status, the noise power NP(i) is defined according to formula 7 below.

$$NP(i+1)=NP(i) \qquad (7)$$

The difference between the echo E(i) and the pseudo-echo signal GE(i) is defined as the echo remainder ER(i). The power of this echo remainder ER(i) is defined as the echo remainder power ERP(i). More specifically, this echo remainder power ERP(i) is defined according to formula 8 below.

$$ERP(i+1)=(1-\delta_{ERP})ERP(i)+\delta_{ERP}ER^2(i+1) \qquad (8)$$

where $\delta_{ERP}$ is a smoothing constant within the range $0<\delta_{ERP}<1$.

In this embodiment of the present invention, furthermore, it is assumed that the noise N(i) and the pseudo-echo signal GE(i) are mutually identical signals.

The logarithmic ratio between the reception signal power XP(i) and the echo remainder power ERP(i) is defined as the echo attenuation amount ACOM(i). More specifically, this echo attenuation amount ACOM(i) is defined according to formula 9 below.

$$ACOM(i) = 10\log\frac{XP(i)}{ERP(i)} \qquad (9)$$

Any predetermined target value for the echo attenuation amount ACOM(i) is defined as the desired echo attenuation amount ACOM.

The logarithmic ratio between the echo power EP(i) and the echo remainder power ERP(i) is defined as the echo cancellation amount ACANC(i). More specifically, the echo cancellation amount ACANC(i) is defined according to formula 10 below.

$$ACANC(i) = 10\log\frac{EP(i)}{ERP(i)} \quad (10)$$

The logarithmic ratio between the echo power EP(i) and the noise power NP(i) is defined as the echo/noise ratio E/N(i). More specifically, this echo/noise ratio E/N(i) is defined according to formula 11 below.

$$\left.\begin{array}{l}D(i) = 10\log\frac{EP(i)}{NP(i)} \\ E/N(i+1) = \delta_{E/N}EN(i) + (1-\delta_{E/N})D(i+1)\end{array}\right\} \quad (11)$$

In formula 11, $\delta_{E/N}$ is a smoothing constant within the range $0<\delta_{E/N}<1$. Also, the echo/noise ratio E/N(i) is made a smoothing value for the logarithmic ratio D(i) between the echo power EP(i) and the noise power NP(i).

Figure 2:
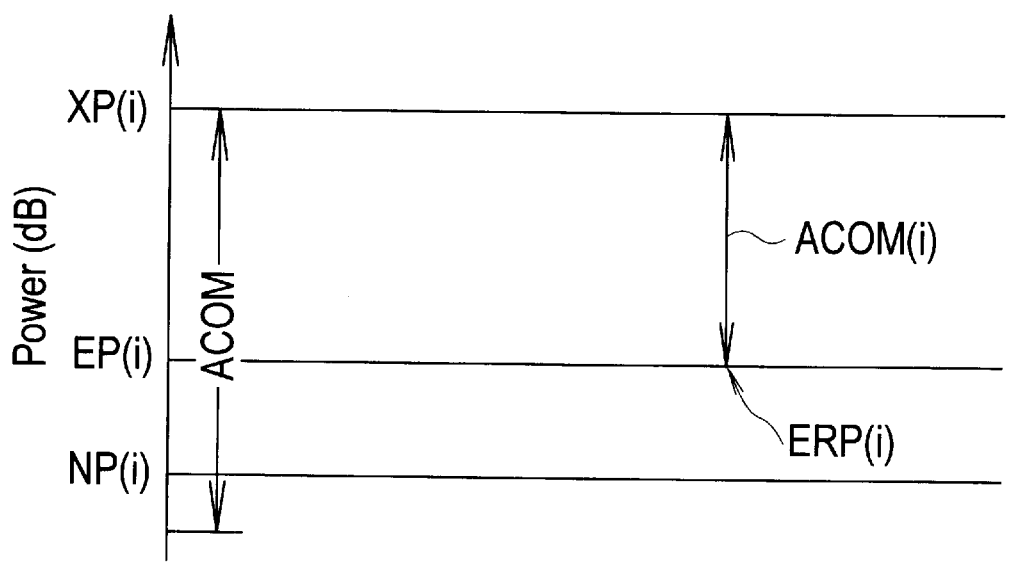
FIG. 2 is a diagram of the correlation between various power-related quantities prior to echo canceler operation.
Figure 3:
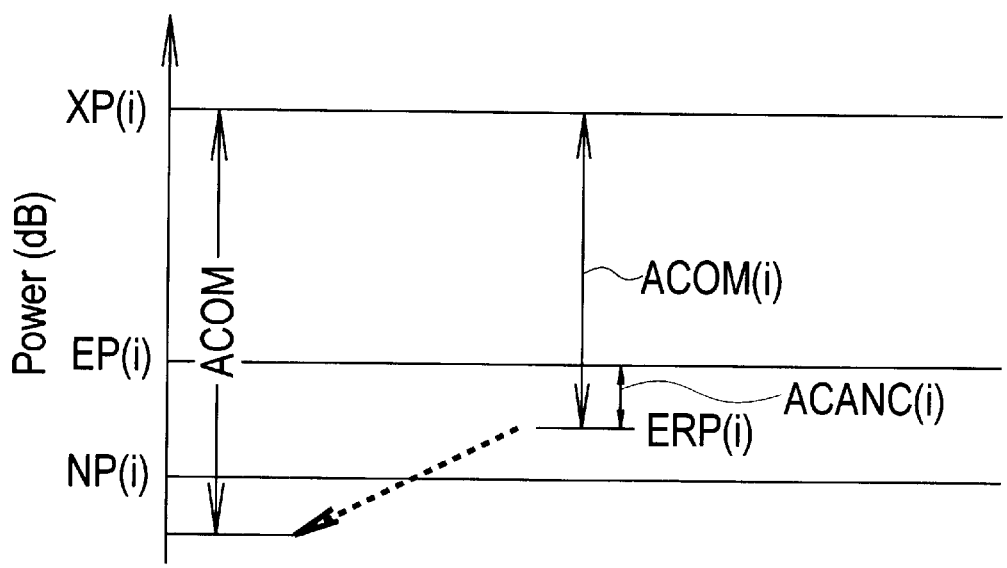
FIG. 3 is a diagram of the correlation between various power-related quantities during echo canceler operation.

FIG. 2 and FIG. 3 are diagrams that, respectively, represent examples of correlations in these power-related amounts. Power (unit=dB) is represented on the vertical axes, in a logarithmic region. FIG. 2 is a diagram of the power relationships prior to the operation of the echo canceler 10, while FIG. 3 is a diagram of the power relationships during the operation of the echo canceler 10.

It is self-evident that the reception signal power XP(i) is always larger than the echo power EP(i). The desired echo attenuation amount ACOM is set larger than the difference between the reception signal power XP(i) and the noise power NP(i). And the echo power EP(i) is assumed to be larger than the noise power NP(i).

In FIG. 2, the echo canceler 10 is not yet operating, so the echo remainder power ERP(i) is equal to the echo power EP(i). That is, the echo cancellation amount ACANC(i) is zero, which means that the echo attenuation amount ACOM (i) is equal to the difference between the reception signal XP(i) and the echo power EP(i).

In FIG. 3, on the other hand, the echo canceler 10 is operating, so the echo remainder power ERP(i) is smaller than the value of the echo power EP(i). This echo remainder power ERP(i) gradually diminishes with the passage of time. In other words, both the echo attenuation amount ACOM(i) and the echo cancellation amount ACANC(i) gradually increase as time elapses. The echo canceler 10 has functions capable of causing this echo attenuation amount ACOM(i) to increase to the value of the desired echo attenuation amount ACOM. The adaptive filter modulus computer described earlier has such functions.

Conventionally configured echo cancelers, however, as noted earlier, were not able to cause the echo remainder power ERP(i) to decline to the noise power NP(i). Accordingly, when the desired echo attenuation amount ACOM was set larger than the difference between the reception signal power XP(i) and the noise power NP(i), the echo attenuation amount ACOM(i) could not be increased to the value of the desired echo attenuation amount ACOM. Thus the echo component could not be sufficiently eliminated, and that constituted the main cause of call interference, especially in long-distance telephone lines.

This led to a demand for an echo canceler capable of increasing the echo attenuation amount ACOM(i) to the desired echo attenuation amount ACOM. The echo canceler set forth below in a first embodiment answers that demand.

First Embodiment

Figure 4:
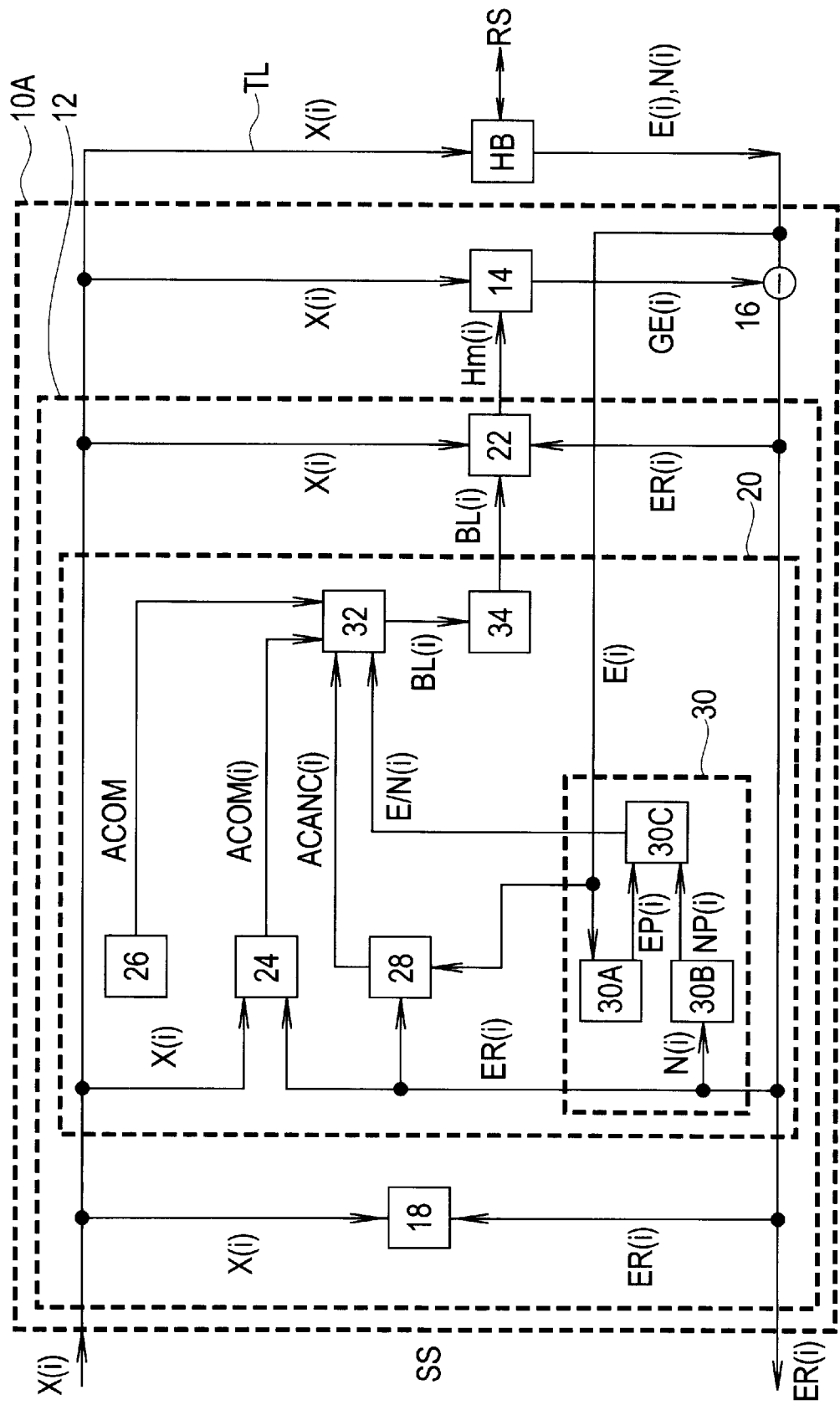
FIG. 4 is a configuration diagram of a first echo canceler.

FIG. 4 is a simplified configuration diagram of the echo canceler in the first embodiment. The echo canceler in this first embodiment is hereafter called the first echo canceler 10A.

The first echo canceler 10A comprises an adaptive filter modulus computer 12, an adaptive filter 14, and an adder 16.

The adaptive filter modulus computer 12 comprises a duplex detector 18, a block length determinator 20, and an adaptive filter modulus computer 22.

The duplex detector 18, using the reception signal X(i) and the echo remainder ER(i), determines whether the call status is a simplex status, duplex status, call-transmission status, or non-calling status. The method of this determination of the call status by the duplex detector 18 is prior art, and so is not further described here.

By simplex status is meant a state wherein a reception signal X(i) is present, but no transmission signal is present. By duplex status is meant a state wherein both a reception signal X(i) and a transmission signal are present simultaneously. By call-transmission status is meant a state where a transmission signal is present but no reception signal X(i) is present. And by non-calling status is meant a state where neither a reception signal X(i) nor a transmission signal is present.

When the duplex detector 18 has determined that the call status is the simplex status, the block length determinator 20 determines the block length BL(i) by the LMS method so that the echo attenuation amount ACOM(i) is made equal to or greater than the value of the desired echo attenuation amount ACOM, and outputs that block length BL(i) to the adaptive filter modulus computer 22. A specific method for determining this block length will be described subsequently.

The adaptive filter modulus computer 22, using the block length BL(i), the echo remainder ER(i), and the reception signal X(i), computes the adaptive filter modulus $H_m(i)$ described earlier and outputs it to the adaptive filter 14. A specific method for computing this adaptive filter modulus $H_m(i)$ will be described subsequently.

The configuration of the block length determinator 20 is described next.

The block length determinator 20 noted above, more specifically, comprises an echo attenuation amount computer 24, a desired echo attenuation amount indicator 26, an echo cancellation amount computer 28, an echo/noise ratio computing unit 30, a block length computer 32, and a block length controller 34. The echo attenuation amount computer 24 computes and outputs the echo attenuation amount ACOM(i) according to formula 9 given earlier. The desired echo attenuation amount indicator 26 pre-designates the desired echo attenuation amount ACOM. The echo cancellation amount computer 28 computes and outputs the echo cancellation amount ACANC(i) according to formula 10 given earlier. The echo/noise ratio computing unit 30 computes and outputs the echo/noise ratio E/N(i) according to formula 11 given earlier. The block length computer 32 and the block length controller 34 will be described subsequently.

This block length computer 32, based on the echo attenuation amount ACOM(i), the desired echo attenuation amount ACOM, the echo cancellation amount ACANC(i), and the echo/noise ratio E/N(i), determines and outputs the block length BL(i) so that the echo attenuation amount ACOM(i) is made equal to or greater than the value of the desired echo attenuation amount ACOM. A specific method for computing this block length BL(i) by the block length computer 32 will be described subsequently.

The block length controller 34 determines, from this block length BL(i), the block length BL(i) that is output to the adaptive filter modulus computer 22, and outputs that block length BL(i) to the adaptive filter modulus computer 22. A specific method for determining this block length BL(i) by the block length controller 34 will be described subsequently.

The echo/noise ratio computing unit 30, more specifically, comprises an echo power computer 30A, a noise power computer 30B, and an echo/noise ratio computing unit 30C. The echo power computer 30A computes and outputs the echo power EP(i). The noise power computer 30B computes and outputs the noise power NP(i). And the echo/noise ratio computing unit 30C computes the echo/noise ratio E/N(i) from the echo power EP(i) and the noise power NP(i).

The operation of the first echo canceler 10A is next described for each call status.

Figure 5:
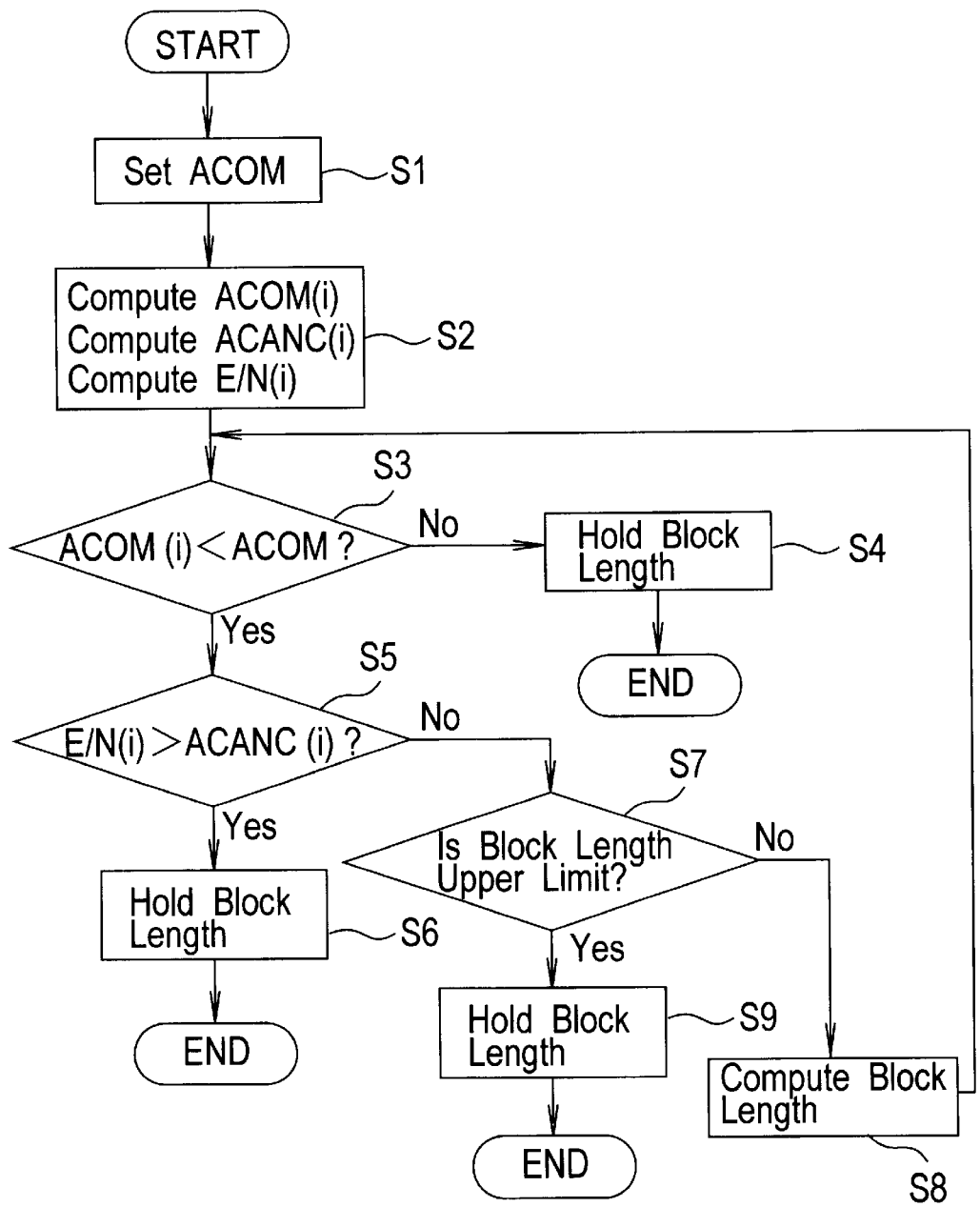
FIG. 5 is a flowchart used in describing the operation of the first echo canceler.

FIG. 5 is a flowchart for describing the operation of the first echo canceler 10A in the simplex status.

(A) Case Where Call Status is Judged by Duplex Detector 18 to be Simplex Status:

First, the desired echo attenuation amount indicator 26 outputs the desired echo attenuation amount ACOM to the block length computer 32 (S1 in FIG. 5). The desired echo attenuation amount indicator 26 outputs the desired echo attenuation amount ACOM to the block length computer 32 beforehand, irrespective of the call status.

Next, the duplex detector 18 outputs control signals, respectively, to the adaptive filter modulus computer 22, echo attenuation amount computer 24, desired echo attenuation amount indicator 26, echo cancellation amount computer 28, echo power computer 30A, noise power computer 30B, echo/noise ratio computing unit 30C, block length computer 32, and block length controller 34, so that those units will all begin operating (not shown in FIG. 5).

Next, the echo attenuation amount computer 24 computes the echo attenuation amount ACOM(i), and outputs that echo attenuation amount ACOM(i) to the block length computer 32. The echo cancellation amount computer 28 also computes the echo cancellation amount ACANC(i), and outputs that echo cancellation amount ACANC(i) to the block length computer 32. The echo power computer 30A computes the echo power EP(i), and outputs that echo power EP(i) to the echo/noise ratio computing unit 30C. The noise power computer 30B computes the noise power NP(i), and outputs that noise power NP(i) to the echo/noise ratio computing unit 30C. The echo/noise ratio computing unit 30C computes the echo/noise ratio E/N(i), and outputs that echo/noise ratio E/N(i) to the block length computer 32 (S2 in FIG. 5).

A method for determining the block length by the block length computer 32 is described next.

Process Step 1: The block length computer 32 first compares the size relationship between the desired echo attenuation amount ACOM and the echo attenuation amount ACOM(i) noted above (S3 in FIG. 5).

Process Step 1-1: When the echo attenuation amount ACOM(i) is equal to or greater than the desired echo attenuation amount ACOM, the block length computer 32 outputs the block length BL(i) at the current time as is, without updating it, to the block length controller 34 (S4 in FIG. 5). Accordingly, the echo attenuation amountACOM(i) can be maintained equal to or greater than the desired echo attenuation amount ACOM.

Process Step 1-2: When the echo attenuation amount ACOM(i) is smaller than the desired echo attenuation amount ACOM, the block length 32 compares the size relationship between the echo cancellation amount ACANC(i) and the echo/noise ratio E/N(i) (S5 in FIG. 5).

Process Step 1-2-1: When the echo cancellation amount ACANC(i) is smaller than the echo/noise ratio E/N(i), the block length computer 32 outputs the block length BL(i) at the current time as, without updating it, to the block length controller 34 (S6 in FIG. 5). In that case, the echo remainder power ERP(i) can be gradually diminished to the noise power NP(i) using a learning-identification method that is an algorithm in the adaptive filter modulus computer 22. This learning-identification method is prior art and so is not further described here.

Process Step 1-2-2: When the echo cancellation amount ACANC(i) is equal to or greater than the echo/noise ratio E/N(i), however, the block length computer 32 determines whether or not the block length BL(i) is the predetermined upper limit of the block length (S7 in FIG. 5). If the block length BL(i) is less than the maximum value for the block length, then the block length computer 32 increases the block length BL(i)., and outputs that increased block length BL(i) to the block length controller 34. Then it returns to process step 1 (S8 in FIG. 5). If the block length BL(i) is the maximum value for the block length, however, the block length computer 32 outputs the block length BL(i) at the current time as is, without updating it, to the block length controller 34 (S9 in FIG. 5).

Accordingly, based on this first echo canceler 10A, in the simplex status, the echo attenuation amount ACOM(i) can be increased to the desired echo attenuation amount ACOM so long as the block length BL(i) has not reached the upper limit for that block length BL(i).

Now, should it happen that the echo power EP(i) be equal to or less than the noise power NP(i), the first echo canceler 10A then cannot effectively cancel the echo E(i). For that reason, the echo power EP(i) will not be diminished even though the echo E(i) pass through the adder 16. Accordingly, the echo remainder power ERP(i) becomes equal to that echo power EP(i). It should be noted that, as described in the foregoing, this first echo canceler 10A treats the echo remainder ER(i) and the noise N(i) mutually as the same signal. Consequently, when the echo power EP(i) is equal to or less than the noise power NP(i), the echo remainder power ERP(i), that echo power EP(i), and the noise power NP(i) all become apparently equal. Hence the echo cancellation amount ACANC(i) and the echo/noise ratio become mutually equal. Accordingly, as described above in process step 1-2-2, the block length computer 32 will increase the block length BL(i).

Process Step 2: Next, the block length controller 34 outputs the block length BL(i) output by the block length computer 32 to the adaptive filter modulus computer 22.

In process 1-2-2, it should be noted, when Z(i) is made the difference between the desired echo attenuation amount ACOM and the echo attenuation amount ACOM(i), the block length computer 32 increases and computes the block length BL(i) in accordance with either formula 2 or formula 2' below, wherein INT is made an integerizing function, and C1 is either made a constant or the ratio between the echo power EP(i) and the noise power NP(i). In this embodiment aspect, however, formula 2 is used.

$$BL(i+1) = BL(i) + \Delta BL(i) \brace \Delta BL(i) = INT\left(10^{\frac{Z(i)}{20}} + C1\right)} \quad (2)$$

$$BL(i+1) = (1.0 + \Delta BL(i)) \cdot BL(i) \brace \Delta BL(i) = INT\left(10^{\frac{Z(i)}{20}} + C1\right)} \quad (2)'$$

In formula 2 above, the block length BL(i) is made a function of Z(i). When the echo attenuation amount ACOM (i) is sufficiently smaller than the desired echo attenuation amount ACOM, that is, when Z(i) is large, the increase $\Delta BL(i)$ in the block length BL(i) is also large, wherefore this block length BL(i) will increase greatly. It is therefore possible to quickly find the optimum block length for causing the echo attenuation amount ACOM(i) to approximate the desired echo attenuation amount ACOM. According to the conventionally configured echo canceler, on the other hand, the block length BL(i) is increased at a constant ratio (in increments of 1, for example), irrespective of the size of the echo attenuation amount ACOM(i). Accordingly, this invention is capable of quickly finding the optimum block length BL(i) for causing the echo attenuation amount ACOM(i) to approximate the desired echo attenuation amount ACOM.

Next, the adaptive filter modulus computer 22, in specific terms, computes the adaptive filter modulus $H_m(i)$, using the LMS-based computation formula in the present invention, that is, according to formula 1 below.

$$A_m(i) = \sum_{j=iBL(i)+1}^{(i+1)BL(i)} ER(j) X(j-m) \brace XP_m(i) = (1-\delta_p)XP_m(i-1) + \delta_p X^2(i) \brace R_m(i) = \frac{A_m(i)}{XP_m(i)} \brace H_m(i+1) = H_m(i) + KR_m(i)} \quad (1)$$

where $\delta_p$ is the smoothing constant described earlier, and K (where K>0) is the step gain.

In formula 1 above, $XP_m(i)$ is approximately smoothed as a recurrence formula. Accordingly, compared to the $XP_m(i)$ formula in the conventional configuration, the computation volume for deriving this $XP_m(i)$ is drastically reduced. Hence the adaptive filter modulus $H_m(i)$ can be readily derived.

(B) Case Where Call Status is Judged by Duplex Detector 18 to be Either Non-calling Status or Call-transmission Status:

The duplex detector 18 outputs control signals, respectively, to the adaptive filter modulus computer 22, echo attenuation amount computer 24, desired echo attenuation amount indicator 26, echo cancellation amount computer 28, echo power computer 30A, echo/noise ratio computing unit 30C, block length computer 32, and block length controller 34, so that those units will all stop operating (not shown in FIG. 5).

Next, the echo attenuation amount computer 24 stops computing the echo attenuation amount ACOM(i). The desired echo attenuation amount indicator 26 also stops outputting the desired echo attenuation amount ACOM. The echo cancellation amount computer 28 also stops computing the echo cancellation amount ACANC(i). The echo power computer 30A also stops computing the echo power EP(i). The echo/noise ratio 30C also stops computing the echo/noise ratio E/N(i). The block length computer 32 also stops computing the block length BL(i). The block length controller 34 also stops outputting the block length BL(i) to the adaptive filter modulus computer 22. The adaptive filter modulus computer 22 also stops computing the adaptive filter modulus $H_m(i)$ And the adaptive filter 14 also stops producing the pseudo-echo signal GE(i).

The noise power computer 30B, however, computes the noise power NP(i) according to formula 7 given earlier.

Accordingly, in either the non-calling status or call-transmission status, the first echo canceler 10A stops functioning.

(C) Case Where Call Status is Judged by Duplex Detector 18 to be the Duplex Status:

The duplex detector 18 outputs control signals, respectively, to the echo attenuation amount computer 24, desired echo attenuation amount indicator 26, echo cancellation amount computer 28, echo/noise ratio computing unit 30(echo power computer 30A, noise power computer 30B, and echo/noise ratio computing unit 30C), block length computer 32, and block length controller 34, so to that those units will all stop operating (not shown in FIG. 5).

Next, the echo attenuation amount computer 24 stops computing the echo attenuation amount ACOM(i). The desired echo attenuation amount indicator 26 also stops outputting the desired echo attenuation amount ACOM. The echo cancellation amount computer 28 also stops computing the echo cancellation amount ACANC(i). The echo/noise ratio computing unit 30 stops computing the echo/noise ratio E/N(i). The block length computer 32 also stops computing the block length BL(i). And the block length controller 34 also stops outputting the block length BL(i) to the adaptive filter modulus computer 22.

Although the adaptive filter modulus computer 22 stops computing the adaptive filter modulus $H_m(i)$, when the call status immediately prior to that duplex status was the simplex status, it preserves the immediately prior adaptive filter modulus $H_m(i)$ in that simplex status, and outputs that adaptive filter modulus $H_m(i)$ to the adaptive filter 14.

Accordingly, in the duplex status, it is possible to cancel the echo E(i).

Second Embodiment

Figure 6:
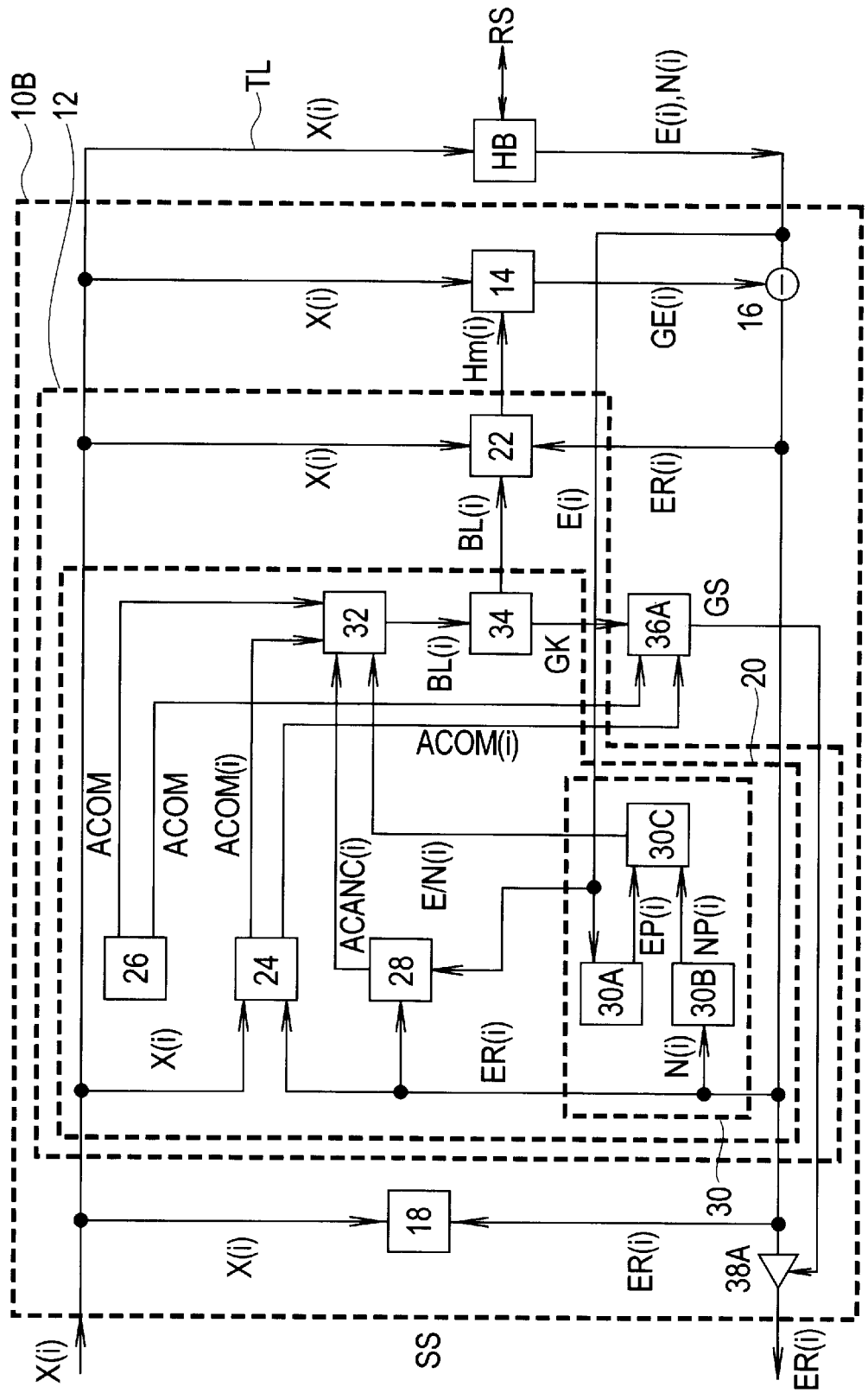
FIG. 6 is a configuration diagram of a second echo canceler.

FIG. 6 is a configuration diagram of an echo canceler in a second embodiment. The echo canceler in this second embodiment is hereinafter called the second echo canceler 10B.

This second echo canceler 10B is based on the first echo canceler 10A.

In the first echo canceler 10A in the first embodiment described in the foregoing, adequate attenuation of the echo power EP(i) cannot be expected when the amplitude of the noise N(i) fluctuates greatly, or when the impulse response in the echo path fluctuates, or when the tap length T is insufficient. Hence the learning-identification method cannot be expected to be effective in process step 1-2-1 described earlier. As a consequence, the echo remainder power ERP(i) cannot be attenuated to the noise power NP(i).

That being so, this second echo canceler 10B comprises an attenuation amount controller 36A and an attenuator 38A. The attenuation amount controller 36A is a device that, following process step 1-2-1 in the first embodiment described earlier, computes and outputs an insertion attenuation amount $ATT_1(i)$ that is an attenuation amount for further attenuating the echo remainder power ERP(i). The attenuator 38A is a device that further attenuates the echo remainder power ERP(i) by that insertion attenuation amount $ATT_1(i)$.

The insertion attenuation amount $ATT_1(i)$ is the difference between the desired echo attenuation amount ACOM and the echo attenuation amount ACOM(i).

In process step 1-2-1 in the first embodiment, when the block length computer 32 has determined that the echo cancellation amount ACANC(i) is smaller than the echo/noise ratio E/N(i), this block length computer 32 outputs an attenuation amount computation signal GK to the block length controller 34. In response to that attenuation amount computation signal GK, the attenuation amount controller 36A computes the insertion attenuation amount $ATT_1(i)$.

The attenuation amount controller 36A, first, in response to the attenuation amount computation signal GK, computes the insertion attenuation amount $ATT_1(i)$ that is the difference between the desired echo attenuation amount ACOM output from the desired echo attenuation amount indicator 26 and the echo attenuation amount ACOM(i) output by the echo attenuation amount computer 24. Then the attenuation amount controller 36A outputs an attenuation amount control signal GS to the attenuator 38A in order to reduce the echo remainder power ERP(i) by that insertion attenuation amount $ATT_1(i)$.

Next, the attenuator 38A, in response to the attenuation amount control signal GS, forcibly reduces the echo remainder power ERP(i) by the insertion attenuation amount $ATT_1(i)$.

Accordingly, the second echo canceler 10B can increase the echo attenuation amount ACOM(i) to the desired echo attenuation amount ACOM even when the amplitude of the noise N(i) fluctuates greatly, or the impulse response in the echo path fluctuates, or the tap length T is insufficient.

Except for the operation described above, the operations are the same as those of the first echo canceler 10A, and hence are not further described here.

Third Embodiment

Figure 7:
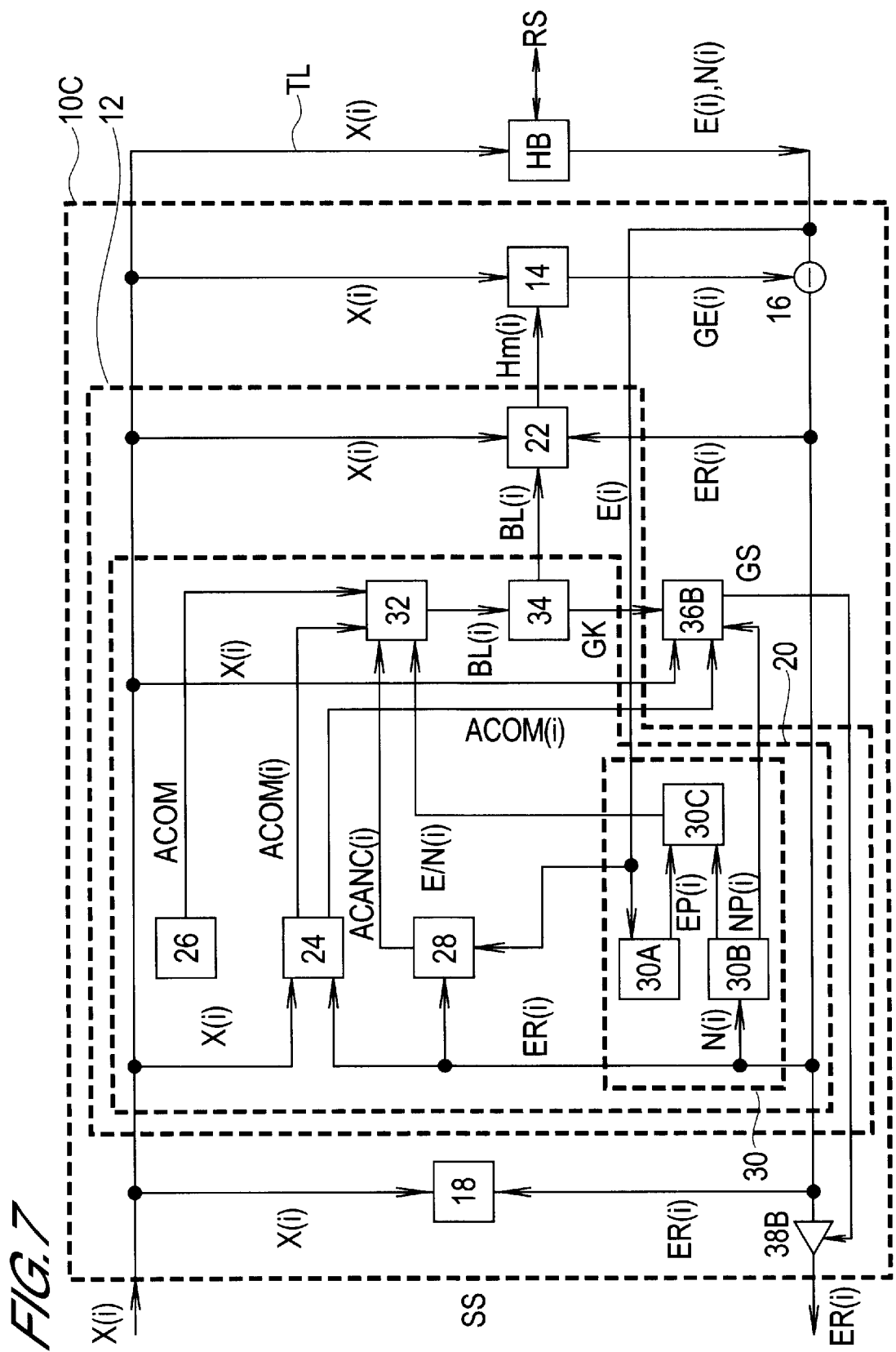
FIG. 7 is a configuration diagram of a third echo canceler.

FIG. 7 is a configuration diagram of an echo canceler in a third embodiment. The echo canceler in this third embodiment is hereinafter called the third echo canceler 10C.

The configuration of this third echo canceler 10C is a modification of the configuration of the second echo canceler 10B.

This third echo canceler 10C comprises an attenuation amount controller 36B and an attenuator 38B. The attenuation amount controller 36B is a device that computes and outputs an insertion attenuation amount $ATT_2(i)$ that is an attenuation amount for further attenuating the echo remainder power ERP(i). The attenuator 38B is a device that further attenuates the echo remainder power ERP(i) by the insertion attenuation amount $ATT_2(i)$.

The insertion attenuation amount $ATT_2(i)$ is the difference between the reception signal/noise ratio X/N(i) and the echo attenuation amount ACOM(i). The reception signal/noise ratio X/N(i) is defined as the logarithmic ratio between the reception signal power XP(i) and the noise power NP(i), given by formula 12 below.

$$X/N(i) = 10\log\frac{XP(i)}{NP(i)} \quad (12)$$

In process step 1-2-1 in the first embodiment, when the block length computer 32 has determined that the echo cancellation amount ACANC(i) is smaller than the echo/noise ratio E/N(i), that block length computer 32 outputs an attenuation amount computation signal GK to the block length controller 34. In response to that attenuation amount computation signal GK, the attenuation amount controller 36B computes the insertion attenuation amount $ATT_2(i)$.

The attenuation amount controller 36B first, in response to the attenuation amount computation signal GK, computes the insertion attenuation amount $ATT_2(i)$ using the echo attenuation amount ACOM(i) output by the echo attenuation amount computer 24, the reception signal X(i), and the noise power NP(i) output by the noise power computer 30B. This attenuation amount controller 36B outputs an attenuation amount control signal GS to the attenuator 38B so that the echo remainder power ERP(i) is attenuated by the insertion attenuation amount $ATT_2(i)$.

Next, the attenuator 38B, in response to the attenuation amount control signal GS, forcibly attenuates the echo remainder power ERP(i) by the insertion attenuation amount $ATT_2(i)$.

Accordingly, this third echo canceler 10C can reduce the echo remainder power ERP(i) down to the level of the noise power NP(i) even though the amplitude of the noise N(i) fluctuate greatly, or even though the impulse response in the echo path fluctuate, or even though the tap length be insufficient. These devices, namely the attenuation amount controller 36B and the attenuator 38B, can guarantee an echo attenuation amount ACOM(i) that is responsive to the level of the noise power NP(i) irrespective of the value at which the desired echo attenuation amount ACOM is set. Accordingly, this third echo canceler 10C is effective in cases where the echo/noise ratio E/N(i) is large (that is, when the noise power N(i) is sufficiently small).

Except for the operation described above, the operations are the same as those of the first echo canceler 10A, and so are not further described here.

Fourth Embodiment

Figure 8:
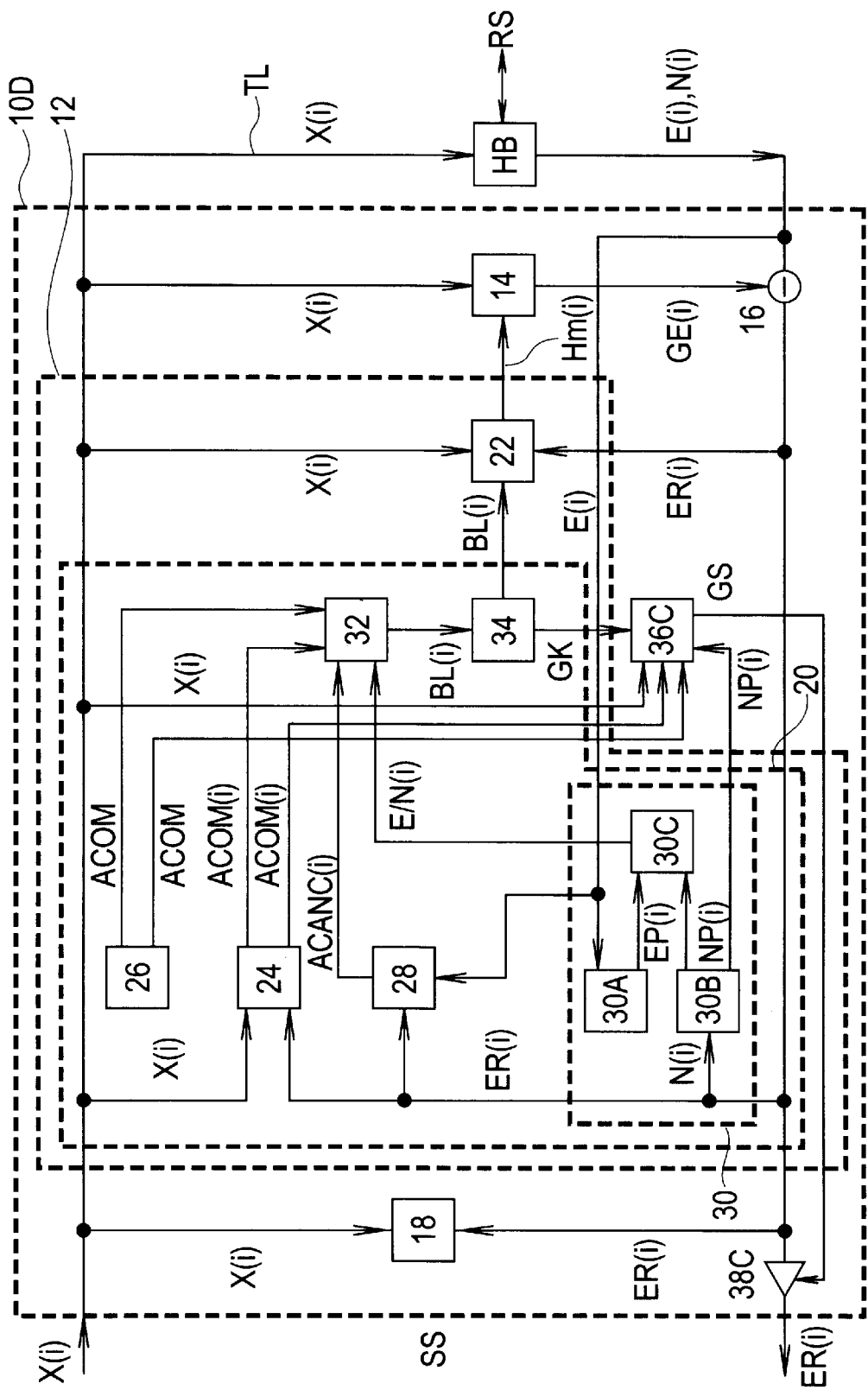
FIG. 8 is a configuration diagram of a fourth echo canceler.

FIG. 8 is a configuration diagram of an echo canceler in a fourth embodiment. The echo canceler in this fourth embodiment is hereinafter called the fourth echo canceler 10D.

The configuration of this fourth echo canceler 10D is a configuration which combines the second echo canceler 10B and the third echo canceler 10C, respectively.

The fourth echo canceler 10D comprises an attenuation amount controller 36C and an attenuator 38C. The attenuation amount controller 36C is a device for computing and outputting an insertion attenuation amount $ATT_3(i)$ that is an attenuation amount for further attenuating the echo remainder power ERP(i). The attenuator 38C is a device for further attenuating the echo remainder power ERP(i) by that insertion attenuation amount $ATT_3(i)$.

In process step 1-2-1 in the first embodiment, when the block length computer 32 has determined that the echo cancellation amount ACANC(i) is smaller than the echo/noise ratio E/N(i), that block length computer 32 outputs an attenuation amount computation signal GK to the block length controller 34 so that the attenuation amount controller 36C will compute the insertion attenuation amount $ATT_3(i)$.

Next, the attenuation amount controller 36C computes the insertion attenuation amount $ATT_3(i)$ in response to that attenuation amount computation signal GK. The attenuation amount controller 36C, when it has determined that the reception signal/noise ratio X/N(i) is larger than the desired echo attenuation amount ACOM, computes the insertion attenuation amount $ATT_2(i)$ in the third embodiment as this insertion attenuation amount $ATT_3(i)$. That is, the attenuation amount controller 36C computes the insertion attenuation amount $ATT_3(i)$ as the difference between the reception signal/noise X/N(i) and the echo attenuation amount ACOM(i). When it has determined, on the other hand, that the reception signal/noise ratio X/N(i) is equal to or less than the desired echo attenuation amount ACOM, the attenuation amount controller 36C computes the insertion attenuation amount $ATT_1(i)$ in the second embodiment as this insertion attenuation amount $ATT_3(i)$ That is, the attenuation amount controller 36C computes the insertion attenuation amount $ATT_3(i)$ as the difference between the desired echo attenuation amount ACOM and the echo attenuation amount ACOM(i).

Then the attenuation amount controller 36C outputs an attenuation amount control signal GS to the attenuator 38C so that the echo remainder power ERP(i) is attenuated by the insertion attenuation amount $ATT_3(i)$.

Next, the attenuator 38C, in response to that attenuation amount control signal GS, forcibly reduces the echo remainder power ERP(i) by that insertion attenuation amount $ATT_3(i)$.

Accordingly, in cases where the reception signal/noise ratio X/N(i) is larger than the desired echo attenuation amount ACOM, this fourth echo canceler 10C can reduce the echo remainder power ERP(i) down to the level of the noise power NP(i) even though the amplitude of,the noise N(i) fluctuate greatly, or even though the impulse response in the echo path fluctuate, or even though the tap length T be insufficient. Accordingly, the echo attenuation amount ACOM(i) can be made larger than the desired echo attenuation amount ACOM. On the other hand, when the reception signal/noise ratio X/N(i) is equal to or less than the desired echo attenuation amount ACOM, this fourth echo canceler 10D can increase the echo attenuation amount ACOM(i) up to the desired echo attenuation amount ACOM. Hence the echo remainder power ERP(i) can always be, minimized to the extent possible.

Except for the operation described above, the operations are the same as those of the first echo canceler 10A, and so are not further described here.

Fifth Embodiment

Figure 9:
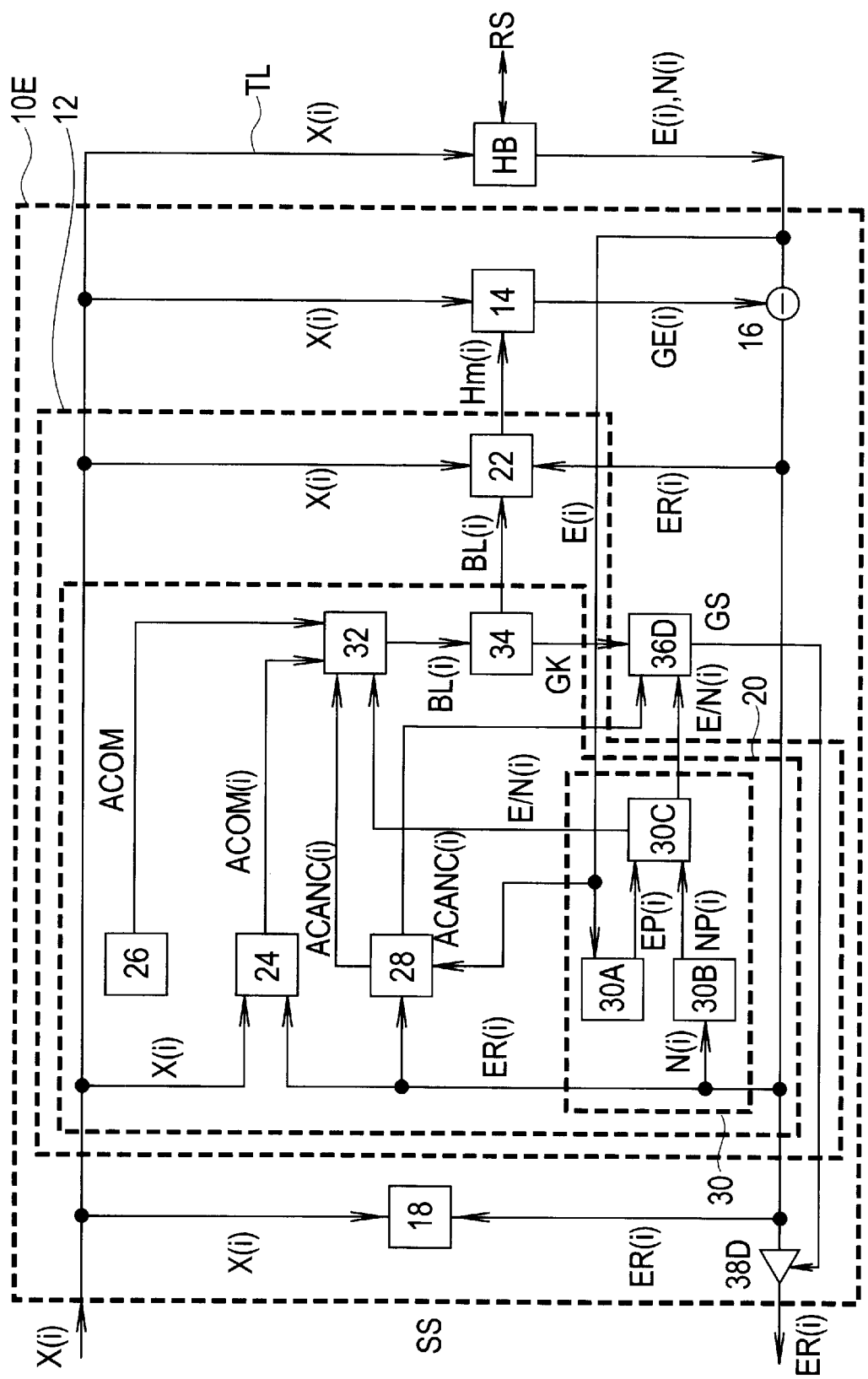
FIG. 9 is a configuration diagram of a fifth echo canceler.

FIG. 9 is a configuration diagram of an echo canceler in a fifth embodiment. The echo canceler in this fifth embodiment is hereinafter called the fifth echo canceler 10E.

The configuration of this fifth echo canceler 10E is a modification of the configuration of the second echo canceler 10B.

This fifth echo canceler 10E comprises an attenuation amount controller 36D and an attenuator 38D. The attenuation amount controller 36D is a device that computes and outputs an insertion attenuation amount $ATT_4(i)$ that is an attenuation amount for further attenuating the echo remainder power ERP(i). The attenuator 38D is a device for further attenuating the echo remainder power ERP(i) by that insertion attenuation amount $ATT_4(i)$.

The insertion attenuation amount $ATT_4(i)$ is the difference between the echo/noise ratio E/N(i) and the echo cancellation amount ACANC(i).

In process step 1-2-1 in the first embodiment, when the block length computer 32 has determined that the echo cancellation amount ACANC(i) is smaller than the echo/noise ratio E/N(i), that block length computer 32 outputs an attenuation amount computation signal GK to the block length controller 34 so that the attenuation amount controller 36D will compute this insertion attenuation amount $ATT_4(i)$.

Next, the attenuation amount controller 36D, in response to the attenuation amount computation signal GK, for example, first computes the insertion attenuation amount $ATT_4(i)$ that is the difference between the echo/noise ratio E/N(i) output by the echo/noise ratio computing unit 30C and the echo cancellation amount ACANC(i) output by the echo cancellation amount computer 28. Then the attenuation amount controller 36D outputs an attenuation amount control signal GS to the attenuator 38D so that the echo remainder power ERP(i) is reduced by that insertion attenuation amount $ATT_4(i)$.

Next, the attenuator 38D, in response to that attenuation amount control signal GS, forcibly reduces the echo remainder power ERP(i) by that insertion attenuation amount $ATT_4(i)$.

Accordingly, the fifth echo canceler 10E is capable of reducing the echo remainder power ERP(i) down to the level of the noise power NP(i) even when the amplitude of the noise N(i) fluctuates greatly, or the impulse response in the echo path fluctuates, or the tap length T is insufficient.

The attenuation amount controller 36D also can guarantee an echo attenuation amount ACOM(i) that accords with the level of the noise power NP(i), irrespective of the value set for the desired echo attenuation amount ACOM. Hence this fifth echo canceler 10E is effective in cases where the echo/noise ratio E/N(i) is large (that is, where the noise power NP(i) is sufficiently small).

The third echo canceler 10C described earlier also produces the same operational effects as the fifth echo canceler 10E, but this fifth echo canceler 10E has the advantage of enhanced computing speed to the degree that the computation volume is less than that of the third echo canceler 10C.

Except for the operation described in the foregoing, the operations are the same as those of the first echo canceler 10A, and so are not further described here.

Sixth Embodiment

Figure 10:
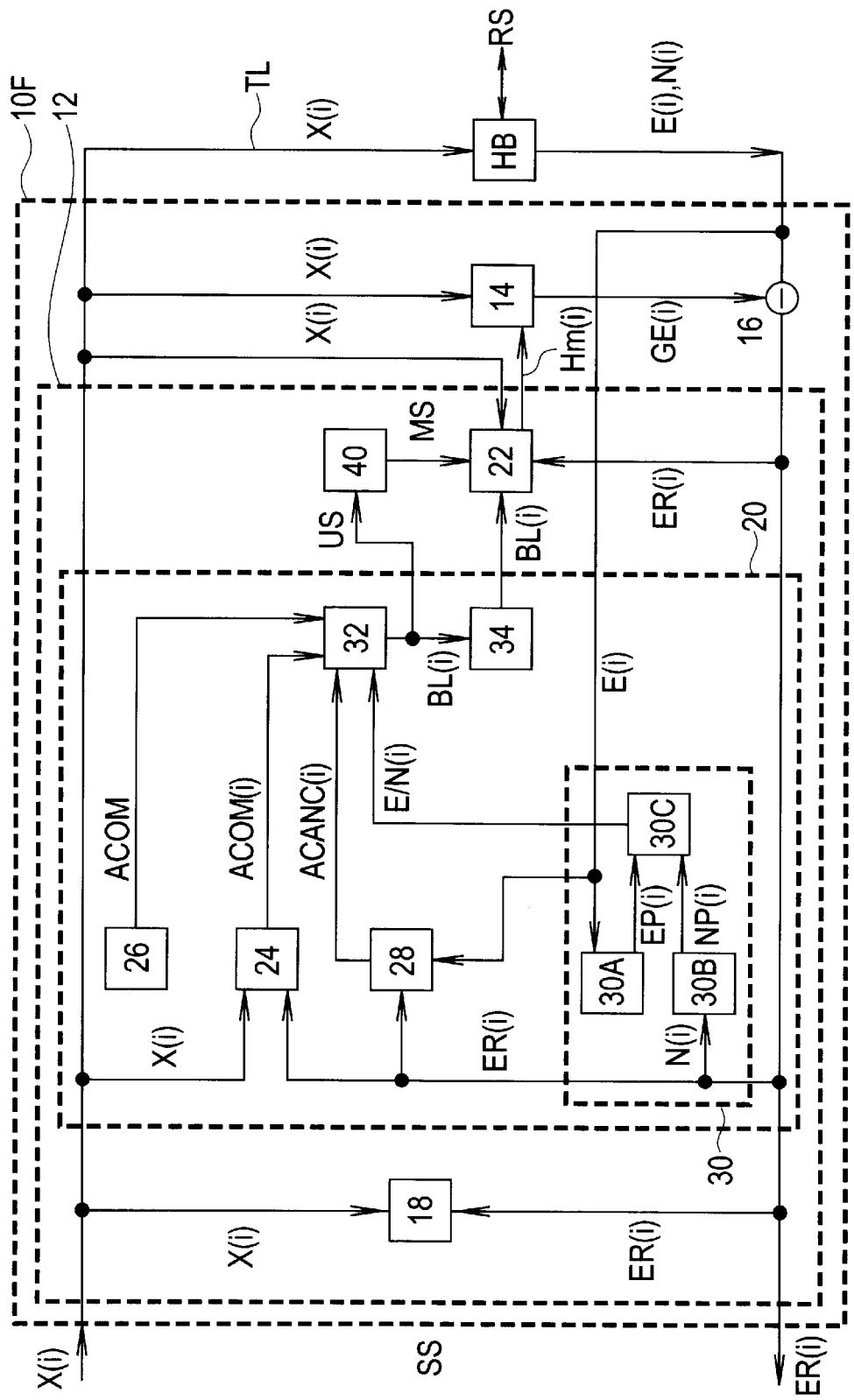
FIG. 10 is a configuration diagram of a sixth echo canceler.

FIG. 10 is a configuration diagram of an echo canceler in a sixth embodiment. The echo canceler in this sixth embodiment is hereinafter called the sixth echo canceler 10F.

This sixth echo canceler 10F is based on the first echo canceler 10A.

With the first echo canceler 10A in the first embodiment described earlier, when the tab length T is insufficient, adequate attenuation of the echo power EP(i) cannot be expected. Therefore, in process step 1-2-1 in the first embodiment, the learning-identification method cannot be expected to be effective. As a consequence, the echo remainder power ERP(i) cannot be reduced to the noise power NP(i).

That being so, the sixth echo canceler 10F comprises a tap length controller 40.

After the process step 1-2-1 processes in the first embodiment, the tap length computer 32 outputs a control signal US to the tap length controller 40 that causes the tap length T in the adaptive filter modulus computer 22 to be lengthened. This tap length controller 40, when the control signal US is input, outputs a control signal MS so that the adaptive filter modulus computer 22 lengthens the tap length T. The adaptive filter modulus computer 22, when that control signal MS is input, lengthens the tap length T. That is, the number of delay devices (tap devices, not shown) used by the adaptive filter modulus computer 22 is increased.

Accordingly, in the process step 1-2-1 processes, even in cases where the echo remainder power cannot be reduced to the level of the noise power due to insufficient tap length, that tap length T is lengthened under the control of the tap length controller 40. Hence it can be expected that the echo remainder power ERP(i) can be reduced to the level of the noise power NP(i).

Except for the operation described in the foregoing, the operations are the same as those of the first echo canceler 10A, and so are not further described here.

Seventh Embodiment

Figure 11:
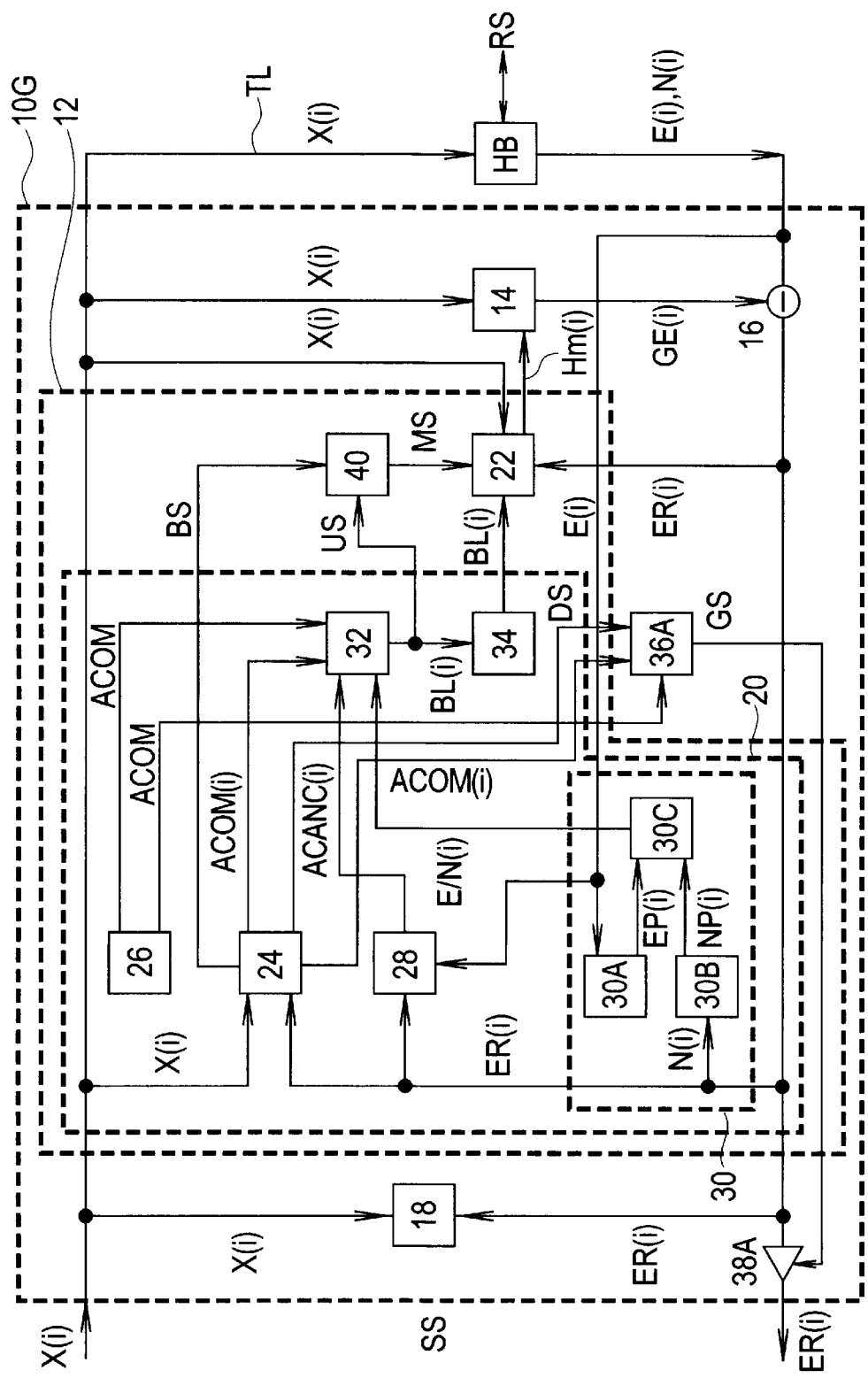
FIG. 11 is a configuration diagram of a seventh echo canceler.

FIG. 11 is a configuration diagram of an echo canceler in a seventh embodiment. The echo canceler in this seventh embodiment is hereinafter called the seventh echo canceler 10G.

This seventh echo canceler 10G is a combination of the second echo canceler 10B in the second embodiment and the sixth echo canceler 10F in the sixth embodiment.

This seventh echo canceler 10G is like the sixth echo canceler 10F described above in that, after the process step 1-2-1 processes in the first embodiment, the tap length T for the delay device (tap device, not shown) in the adaptive filter modulus computer 22 is lengthened.

Next, the echo attenuation amount computer 24 compares the size relationship between the echo attenuation amount ACOM(i+Δi) after the lengthening computed on the basis of the lengthened tap length T and the echo attenuation amount ACOM(i) prior to the lengthening computed on the basis of the tap length T prior to lengthening.

Alternatively, that size relationship is compared for a smoothing value ACOMH(i) for the echo attenuation amount ACOM(i), according to formula 13 below, for example.

$$ACOMH(i+1)=(1-\delta_{ACOM})ACOMH(i)+\delta_{ACOM}ACOM(i) \quad (13)$$

where $\delta_{ACOM}$ is a smoothing constant having the range $0<\delta_{ACOM}<1$.

When the echo attenuation amount ACOM(i+Δi) after lengthening is larger than the echo attenuation amount ACOM(i) prior to lengthening, the echo attenuation amount computer 24 outputs a control signal BS to the tap length controller 40, causing the tap length controller 40 to keep outputting the control signal MS related to the lengthening of the tap length T of the adaptive filter modulus computer 22. Hence the lengthening of the tap length T is maintained.

When the echo attenuation amount ACOM(i+Δi) after lengthening is equal to or less than the echo attenuation amount ACOM(i) prior to lengthening, on the other hand, the echo attenuation amount computer 24 outputs the control signal BS to the tap length controller 40 and causes that tap length controller 40 to stop outputting the control signal MS relating to the lengthening of the tap length T of the adaptive filter modulus computer 22. At the same time, this echo attenuation amount computer 24 outputs a control signal DS to the attenuation amount controller 36A, causing that attenuation amount controller 36A to compute the insertion attenuation amount $ATT_1(i)$ described earlier. The attenuation amount controller 36A computes that insertion attenuation amount $ATT_1(i)$ and, as described earlier, outputs the attenuation amount control signal GS to the attenuator 38A. That attenuator 38A, when that attenuation amount control signal GS is input, further reduces the echo remainder power ERP(i) by that insertion attenuation amount $ATT_1(i)$.

Consequently, after the tap length T has been lengthened, verification is made as to whether or not lengthening the tap length T was effective. If the echo attenuation amount ACOM(i+Δi) after the lengthening is larger than the echo attenuation amount ACOM(i) prior to lengthening, then it will be seen that lengthening was effective, and so the lengthening of the tap length T will be continued. If, on the other hand, the echo attenuation amount ACOM(i+Δi) after lengthening is equal to or less than the echo attenuation amount ACOM(i) prior to lengthening, then it will be seen that lengthening was not effective. In that case, the echo remainder power ERP(i) can be forcibly attenuated by the insertion attenuation amount $ATT_1(i)$ by the attenuator 38A described earlier.

Except for the operation described in the foregoing, the operations are the same as those of the first echo canceler 10A, and so are not further described here.

Eighth Embodiment

Figure 12:
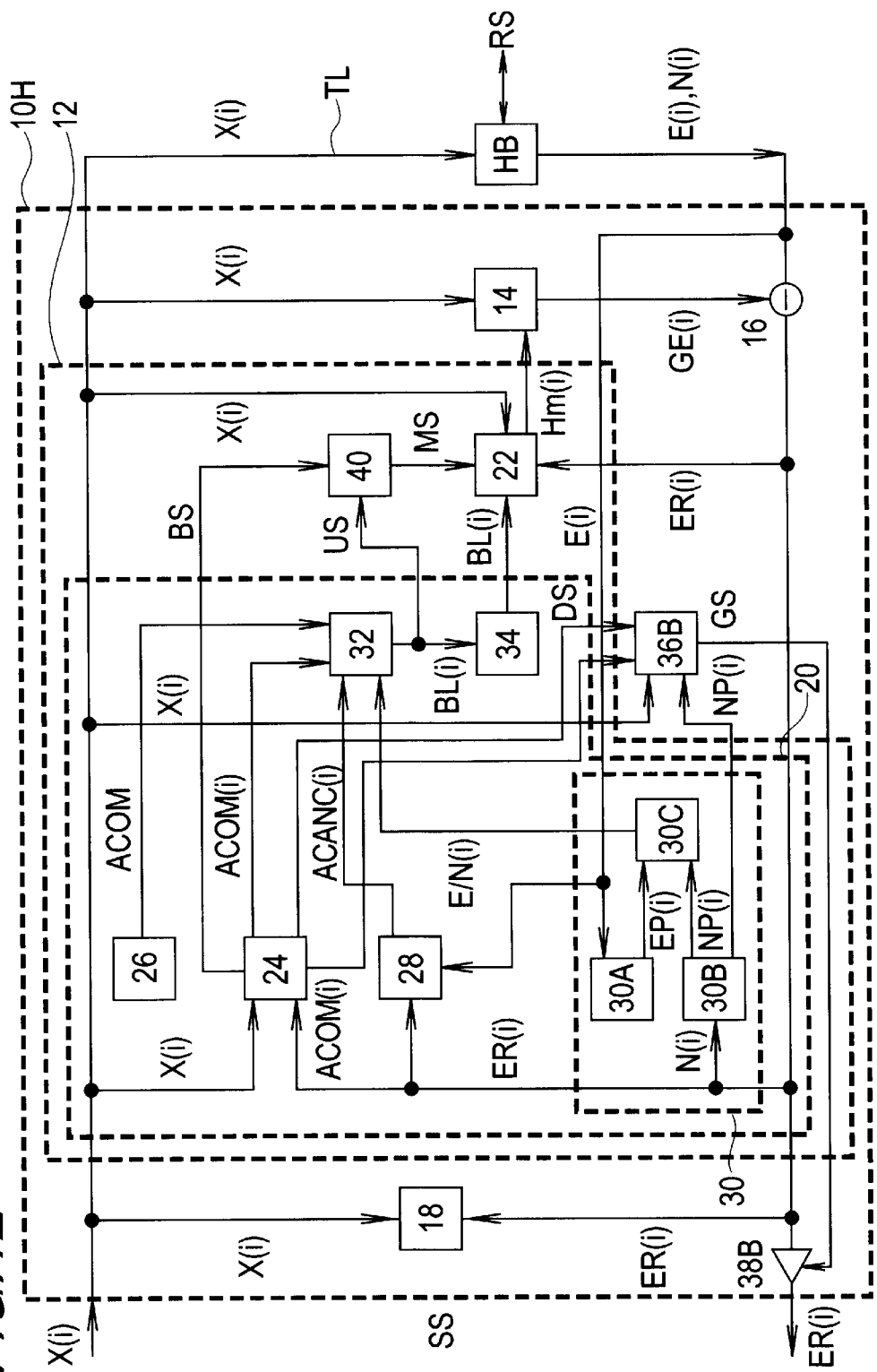
FIG. 12 is a configuration diagram of an eighth echo canceler.

FIG. 12 is a configuration diagram of an echo canceler in an eighth embodiment. The echo canceler in this eighth embodiment is hereinafter called the eighth echo canceler 10H.

This eighth echo canceler 10H is a combination of the third echo canceler 10C in the third embodiment and the sixth echo canceler 10F in the sixth embodiment.

This eighth echo canceler 10H is like the sixth echo canceler 10F described above in that, after the process step 1-2-1 processes in the first embodiment, the tap length T for the delay device (tap device, not shown) in the adaptive filter modulus computer 22 is lengthened.

Next, the echo attenuation amount computer 24 compares the size relationship between the echo attenuation amount ACOM(i+Δi) after the lengthening computed on the basis of the lengthened tap length T and the echo attenuation amount ACOM(i) prior to the lengthening computed on the basis of the tap length T prior to lengthening.

Alternatively, the size relationship is compared for a smoothing value ACOMH(i) for the echo attenuation amount ACOM(i), according to formula 13 given above, for example.

When the echo attenuation amount ACOM(i+Δi) after lengthening is larger than the echo attenuation amount ACOM(i) prior to lengthening, this echo attenuation amount computer 24 causes the lengthening of the tap length T in the adaptive filter modulus computer 22 by the tap length controller 40 to be sustained.

When the echo attenuation amount ACOM(i+Δi) after lengthening is equal to or less than the echo attenuation amount ACOM(i) prior to lengthening, on the other hand, the echo attenuation amount computer 24 stops the lengthening of the tap length T in the adaptive filter modulus computer 22 by the tap length controller 40. Then the attenuation amount controller 36B described earlier computes, the insertion attenuation amount $ATT_2(i)$, and, following thereupon, the attenuator 38B described earlier further reduces the echo remainder power ERP(i) by that insertion attenuation amount $ATT_2(i)$.

Consequently, after the tap length T has been lengthened, verification is made as to whether or not lengthening the tap length T was effective. If the echo attenuation amount ACOM(i+Δi) after the lengthening is larger than the echo attenuation amount ACOM(i) prior to lengthening, then it will be seen that lengthening was effective, and so the lengthening of the tap length T will be continued. If, on the other hand, the echo attenuation amount ACOM(i+Δi) after lengthening is equal to or less than the echo attenuation amount ACOM(i) prior to lengthening, then it will be seen that lengthening was not effective. In that case, the echo remainder power ERP(i) can be forcibly attenuated by the insertion attenuation amount $ATT_2(i)$ by the attenuator 38B described earlier.

Except for the operation described in the foregoing, the operations are the same as those of the seventh echo canceler 10G, and so are not further described here.

Ninth Embodiment

Figure 13:
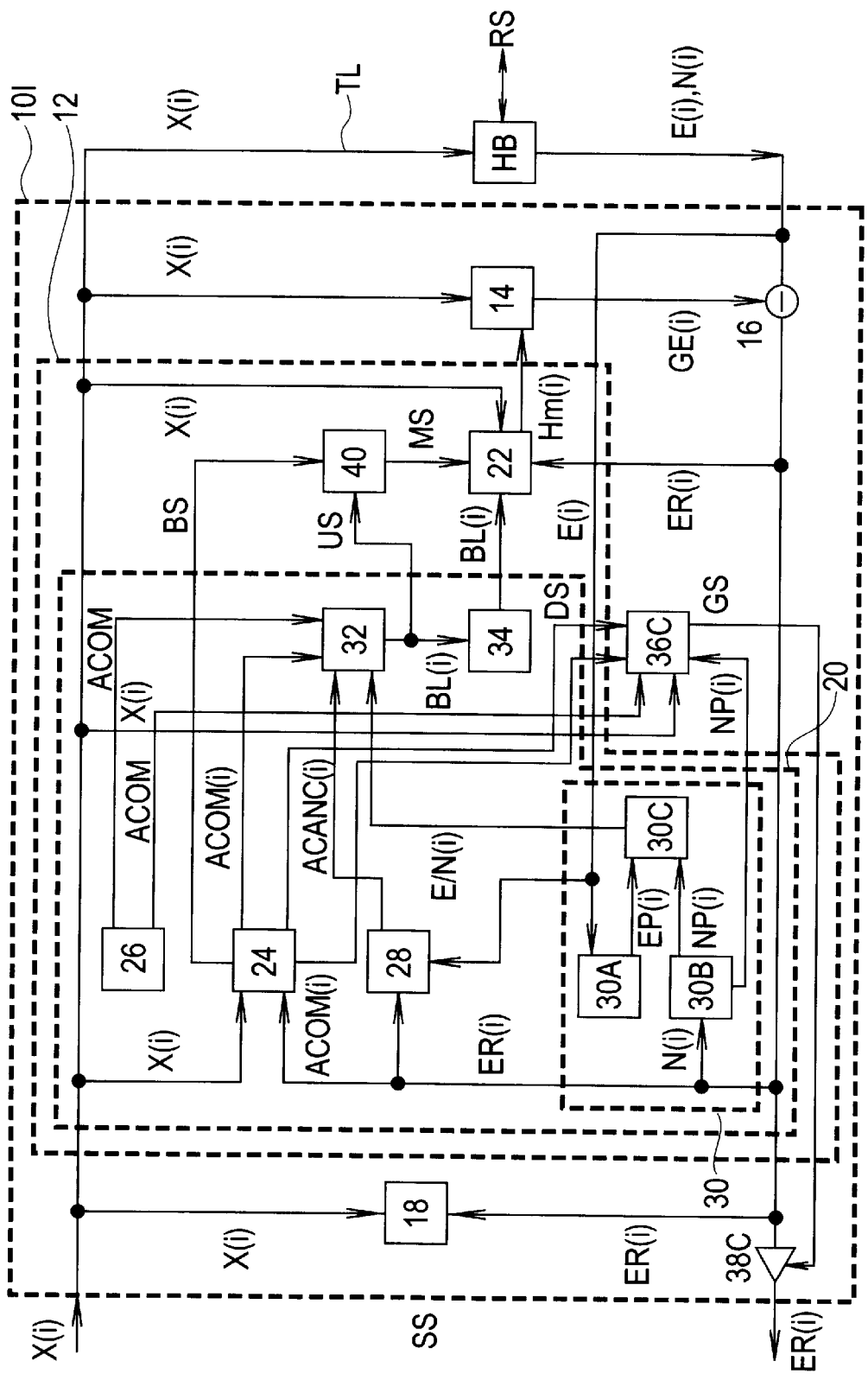
FIG. 13 is a configuration diagram of a ninth echo canceler.

FIG. 13 is a configuration diagram of an echo canceler in a ninth embodiment. The echo canceler in this ninth embodiment is hereinafter called the ninth echo canceler 10I.

This ninth echo canceler 10I is a combination of the fourth echo canceler 10D in the fourth embodiment and the sixth echo canceler 10F in the sixth embodiment.

This ninth echo canceler 10I is like the sixth echo canceler 10F described above in that, after the process step 1-2-1 processes in the first embodiment, the tap length T for the delay device (tap device, not shown) in the adaptive filter modulus computer 22 is lengthened.

Next, the echo attenuation amount computer 24 compares the size relationship between the echo attenuation amount ACOM(i+Δi) after the lengthening computed on the basis of the lengthened tap length T and the echo attenuation amount ACOM(i) prior to the lengthening computed on the basis of the tap length T prior to lengthening.

Alternatively, the size relationship is compared for a smoothing value ACOMH(i) for that echo attenuation amount ACOM(i), according to formula 13 given above, for example.

When the echo attenuation amount ACOM(i+Δi) after lengthening is larger than the echo attenuation amount ACOM(i) prior to lengthening, this echo attenuation amount computer 24 causes the lengthening of the tap length T in the adaptive filter modulus computer 22 by the tap length controller 40 to be sustained.

When the echo attenuation amount ACOM(i+Δi) after lengthening is equal to or less than the echo attenuation amount ACOM(i) prior to lengthening, on the other hand, the echo attenuation amount computer 24 stops the lengthening of the tap length T in the adaptive filter modulus computer 22 by the tap length controller 40. Then the attenuation amount controller 36C described earlier computes the insertion attenuation amount $ATT_3(i)$, and, following thereupon, the attenuator 38C described earlier further reduces the echo remainder power ERP(i) by that insertion attenuation amount $ATT_3(i)$.

Consequently, after the tap length T has been lengthened, verification is made as to whether or not lengthening the tap length T was effective. If the echo attenuation amount ACOM(i+Δi) after the lengthening is larger than the echo attenuation amount ACOM(i) prior to lengthening, then it will be seen that lengthening was effective, and so the lengthening of the tap length T will be continued. If, on the other hand, the echo attenuation amount ACOM(i+Δi) after lengthening is equal to or less than the echo attenuation amount ACOM(i) prior to lengthening, then it will be seen that lengthening was not effective. In that case, the echo remainder power ERP(i) can be forcibly attenuated by the insertion attenuation amount $ATT_3(i)$ by the attenuator 38C described earlier.

Except for the operation described in the foregoing, the operations are the same as those of the seventh echo canceler 10G, and so are not further described here.

Tenth Embodiment

Figure 14:
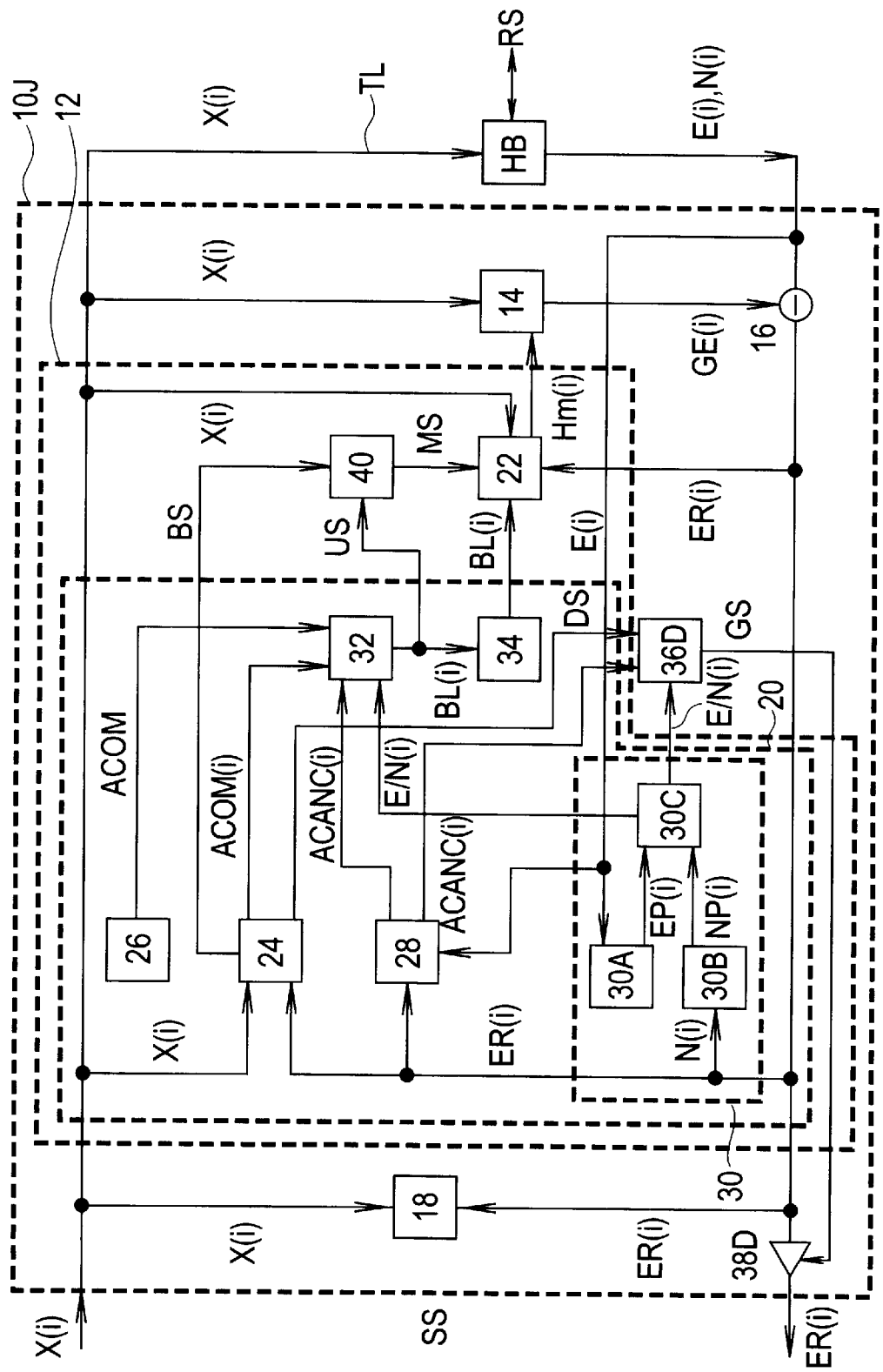
FIG. 14 is a configuration diagram of a tenth echo canceler.

FIG. 14 is a configuration diagram of an echo canceler in a tenth embodiment. The echo canceler in this tenth embodiment is hereinafter called the tenth echo canceler 10J.

This tenth echo canceler 10J is a combination of the fifth echo canceler 10E in the fifth embodiment and the sixth echo canceler 10F in the sixth embodiment.

This tenth echo canceler 10J is like the sixth echo canceler 10F described above in that, after the process step 1-2-1 processes in the first embodiment, the tap length T for the delay device (tap device, not shown) in the adaptive filter modulus computer 22 is lengthened.

Next, the echo attenuation amount computer 24 compares the size relationship between the echo attenuation amount ACOM(i+Δi) after the lengthening computed on the basis of the lengthened tap length T and the echo attenuation amount ACOM(i) prior to the lengthening computed on the basis of the tap length T prior to lengthening.

Alternatively, the size relationship is compared for a smoothing value ACOMH(i) for that echo attenuation amount ACOM(i), according to formula 13 given above, for example.

When the echo attenuation amount ACOM(i+Δi) after lengthening is larger than the echo attenuation amount ACOM(i) prior to lengthening, this echo attenuation amount computer 24 causes the lengthening of the tap length T in the adaptive filter modulus computer 22 by the tap length controller 40 to be sustained.

When the echo attenuation amount ACOM(i+Δi) after lengthening is equal to or less than the echo attenuation amount ACOM(i) prior to lengthening, on the other hand, the echo attenuation amount computer 24 stops the lengthening of the tap length T in the adaptive filter modulus computer 22 by the tap length controller 40. Then the attenuation amount controller 36D described earlier computes the insertion attenuation amount $ATT_4(i)$, and, following thereupon, the attenuator 38D described earlier further reduces the echo remainder power ERP(i) by that insertion attenuation amount $ATT_4(i)$.

Consequently, after the tap length T has been lengthened, verification is made as to whether or not lengthening the tap length T was effective. If the echo attenuation amount ACOM(i+Δi) after the lengthening is larger than the echo attenuation amount ACOM(i) prior to lengthening, then it will be seen that lengthening was effective, and so the lengthening of the tap length T will be continued. If, on the other hand, the echo attenuation amount ACOM(i+Δi) after lengthening is equal to or less than the echo attenuation amount ACOM(i) prior to lengthening, then it will be seen that lengthening was not effective. In that case, the echo remainder power ERP(i) can be forcibly attenuated by the insertion attenuation amount $ATT_4(i)$ by the attenuator 38D described earlier.

Except for the operation described in the foregoing, the operations are the same as those of the seventh echo canceler 10G, and so are not further described here.

11th Embodiment

Figure 15:
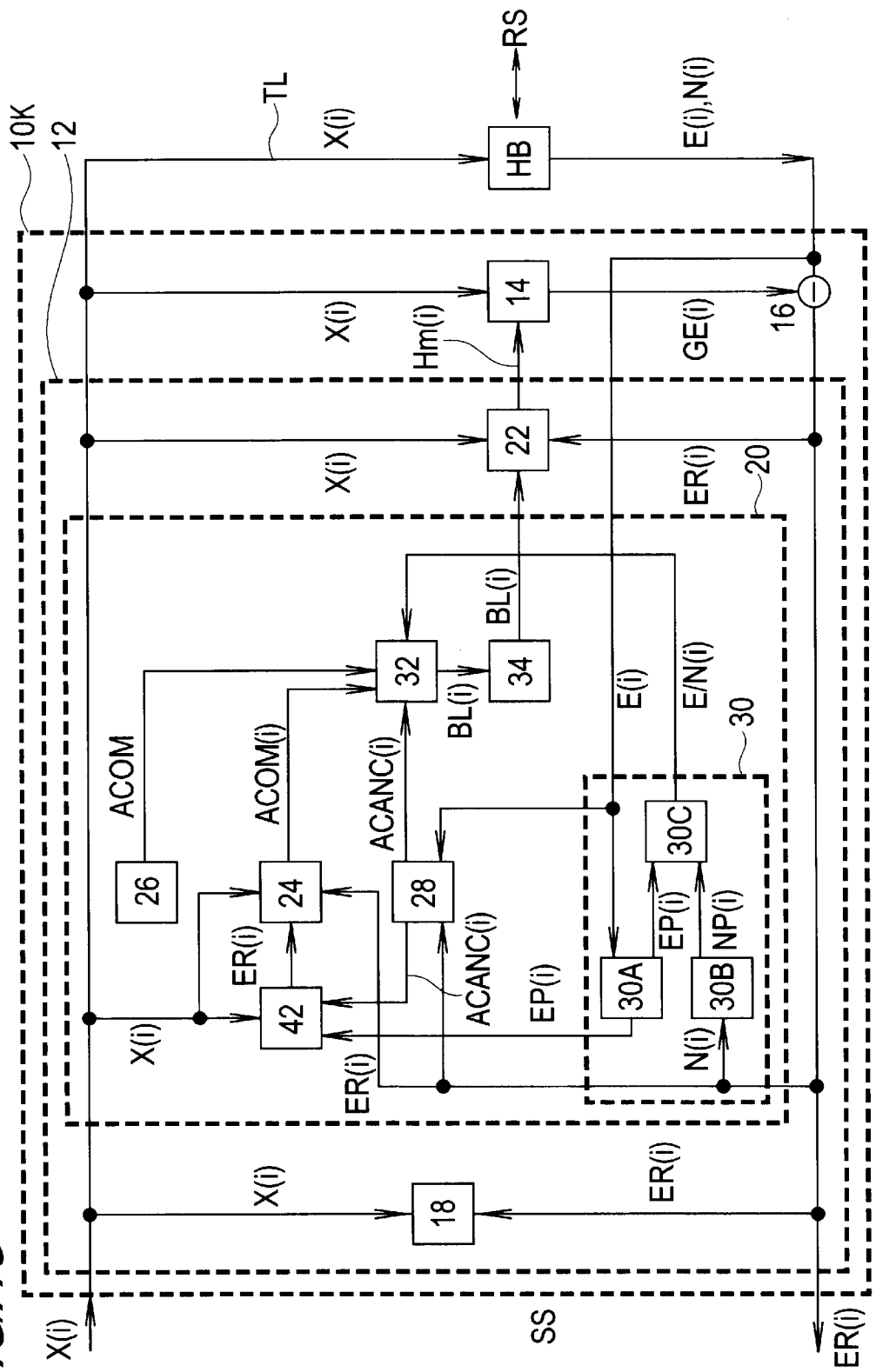
FIG. 15 is a configuration diagram of an 11th echo canceler.

FIG. 15 is a configuration diagram of an echo canceler in an 11th embodiment. The echo canceler in this 11th embodiment is hereinafter called the 11th echo canceler 10K.

The 11th echo canceler 10K is based on the first echo canceler 10A in the first embodiment.

With the first echo canceler 10A, the block length BL(i) is only computed when the call status is the simplex status. Accordingly, when the call status has changed to the simplex status from any call status other than the simplex status, the first echo canceler 10A must redo the computation of the block length BL(i) from the predetermined minimum value.

This presents a problem in that it requires much time to determine the block length BL(i) in the simplex status.

That being so, the block length determinator 20 in this 11th echo canceler 10K comprises an echo loss amount computer 42 for computing the echo loss amount AECHO (i).

This echo loss amount AECHO(i) is defined, according to formula 14 below, as the logarithmic ratio between the reception signal power XP(i) and the echo power EP(i).

$$AECHO(i) = 10\log\frac{XP(i)}{EP(i)} \qquad (14)$$

The configuration is made so that the echo power EP(i) output by the echo power computer 30A, for example, is input as the echo power EP(i) to the echo loss amount computer 42.

When the duplex detector 18 has determined that the call status has been changed from the simplex status to the duplex status, the duplex status detector 18 outputs a control signal to the echo loss amount computer 42 (not shown in FIG. 15). Upon receiving that control signal, the echo loss amount computer 42 estimates the echo attenuation amount ACOM(i) during the period of that duplex status.

More specifically, the echo loss amount computer 42 estimates the echo attenuation amount ACOM(i) during this duplex status as the sum of the echo loss amount AECHO(i) during the simplex status immediately prior to the change to the duplex status, and the echo cancellation amount ACANC (i) during that simplex status (it being permissible to use, for example, the echo cancellation amount ACANC(i) output from the echo cancellation amount computer 28).

Next, during this duplex status, the echo loss amount computer 42 computes the difference between the reception signal X(i) during that duplex status and the estimated echo attenuation amount ACOM(i), in accordance with formula 15 below. Then the echo loss amount computer 42 estimates the echo remainder ER(i) during this duplex status to be that computed difference, and outputs this estimated echo remainder ER(i) to the echo attenuation amount computer 24.

$$ER(i)=10\ \log^{-1}\{10\ \log XP(i)-ACANC(i)\} \qquad (15)$$

Figure 16:
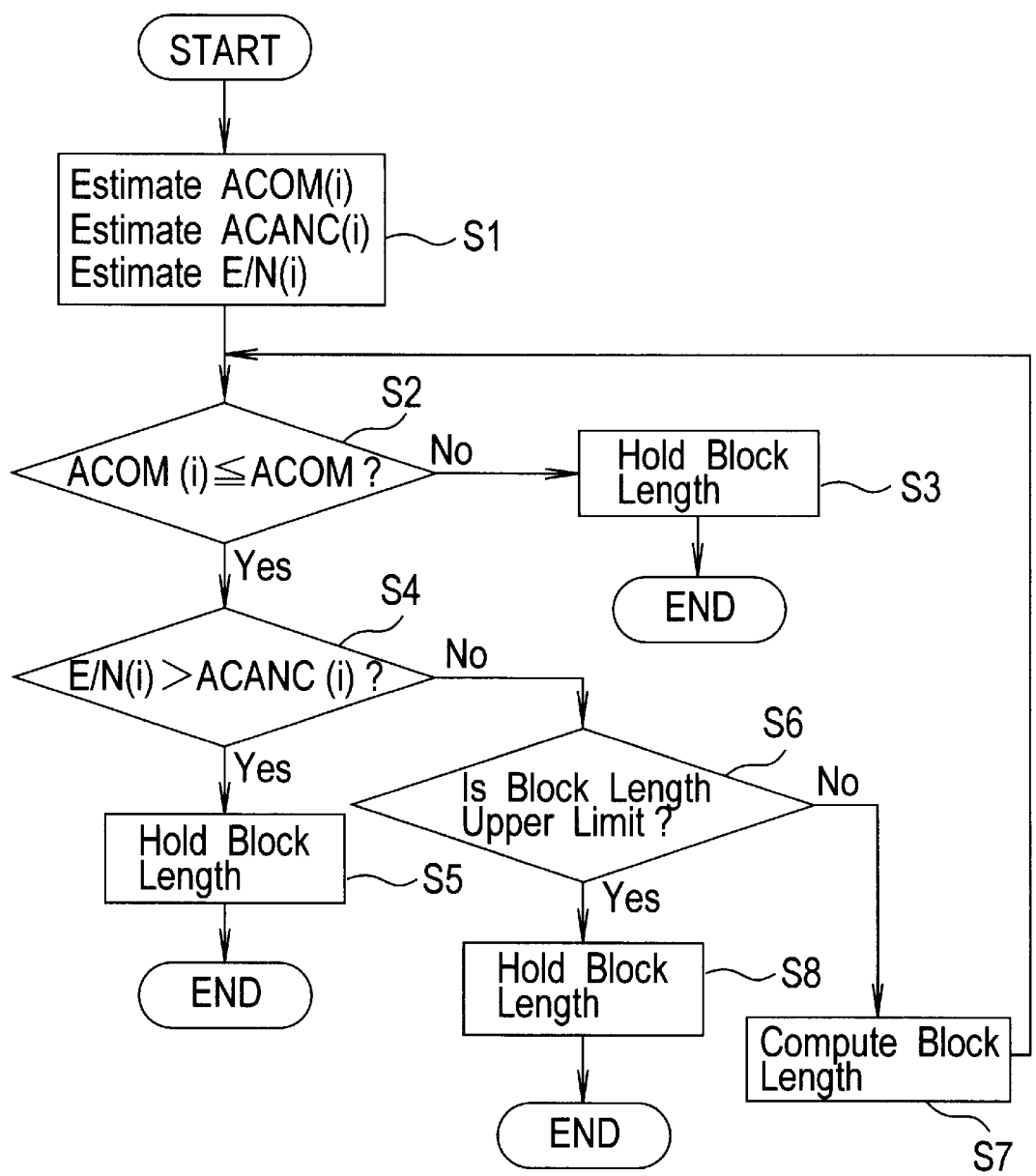
FIG. 16 is a flowchart used in describing the operation of the 11th echo canceler.

The operation of the 11th echo canceler 10K is now described with reference to FIG. 16. FIG. 16 is a flowchart for describing the operations of the 11th echo canceler 10K in the duplex status.

Next, the echo attenuation amount computer 24 estimates the echo attenuation amount ACOM(i) during this duplex status to be the logarithmic ratio between the reception signal X(i) during this duplex status and the estimated echo remainder ER(i) input from the echo loss amount computer 42, and outputs that to the block length computer 32 (S1 in FIG. 16).

The echo cancellation amount computer 28 also estimates the echo cancellation amount ACANC(i) during this duplex status to be the immediately prior echo cancellation amount ACANC(i) during the simplex status immediately prior to the change to this duplex status (S1 in FIG. 16).

The echo/noise ratio computing unit-30C also estimates the echo/noise ratio E/N(i) during this duplex status to be the immediately prior echo/noise ratio E/N(i) during the simplex status immediately prior to the change to this duplex status (S1 in FIG. 16).

Process Step 1: The block length computer 32 then compares the size relationship between the estimated echo attenuation amount ACOM(i) output by the echo attenuation amount computer 24 and the desired echo attenuation amount ACOM output from the desired echo attenuation amount indicator 26 (S2 in FIG. 16).

Process Step 1-1: When the estimated echo attenuation amount ACOM(i) is equal to or greater than the desired echo attenuation amount, this block length computer 32 outputs the block length BL(i) at the current time as is, without updating it, to the block length controller 34 (S3 in FIG. 16).

Process Step 1-2: When the estimated echo attenuation amount ACOM(i) is less than the desired echo attenuation amount ACOM, on the other hand, the block length computer 32 compares the size relationship between the estimated echo cancellation amount ACANC(i) and the estimated echo/noise ratio E/N(i) (S4 in FIG. 16).

Process Step 1-2-1: Then, when the estimated echo cancellation amount ACANC(i) is smaller than the estimated echo/noise ratio E/N(i), the block length, computer 32 outputs the block length BL(i) at the current time as is, without updating it, to the block length controller 34 (S5 in FIG. 16).

Process Step 1-2-2: When the estimated echo cancellation amount ACANC(i) is equal to or greater than the estimated echo/noise ratio E/N(i), however, the block length computer 32 determines whether or not the block length BL(i) at the current time is the predetermined upper limit of the block length (S6 in FIG. 16). If the block length BL(i) is less than the maximum value for the block length, the block length computer 32 increases the block length BL(i) and outputs that increased block length BL(i) to the block length controller 34. Then it returns to process step 1 (S7 in FIG. 16). If the block length BL(i) at the current time is the maximum value for the block length, on the other hand, the block length computer 32 outputs the block length BL(i) at the current time as is, without updating it, to the block length controller 34 (S8 in FIG. 16).

Process Step 2: Next, the block length controller 34 stores the block length BL(i) output from the block length computer 32 without outputting it to the adaptive filter modulus computer 22.

The adaptive filter modulus computer 22 stops computing the adaptive filter modulus $H_m(i)$, holds the immediately prior adaptive filter modulus $H_m(i)$ during the simplex status immediately prior to that duplex status, and outputs that adaptive filter modulus $H_m(i)$ to the adaptive filter 14.

Next, when the duplex detector 18 has determined that the call status has been changed from the duplex status to the simplex status, the block length controller 34 outputs that block length BL(i) stored by the block length controller 34 to the adaptive filter modulus computer 22.

According to the configuration of this 11th echo canceler 10K, when the call status has changed from the duplex status to the simplex status, during that duplex status, the echo attenuation amount computer 24 can estimate the block length BL(i) using the echo remainder ER(i) estimated by the echo loss amount computer 42. The block length controller 34 then holds that estimated block length BL(i). Thereafter, when the call status changes from the duplex status to the simplex status, the adaptive filter modulus computer 22 is able to use the estimated block length BL(i) stored by the block length controller 34 during the duplex status, wherefore the adaptive filter 14 can perform echo canceling immediately.

Except for the operation described above, the operations are the same as those of the first echo canceler 10A, and so are not further described here.

12th Embodiment

Figure 17:
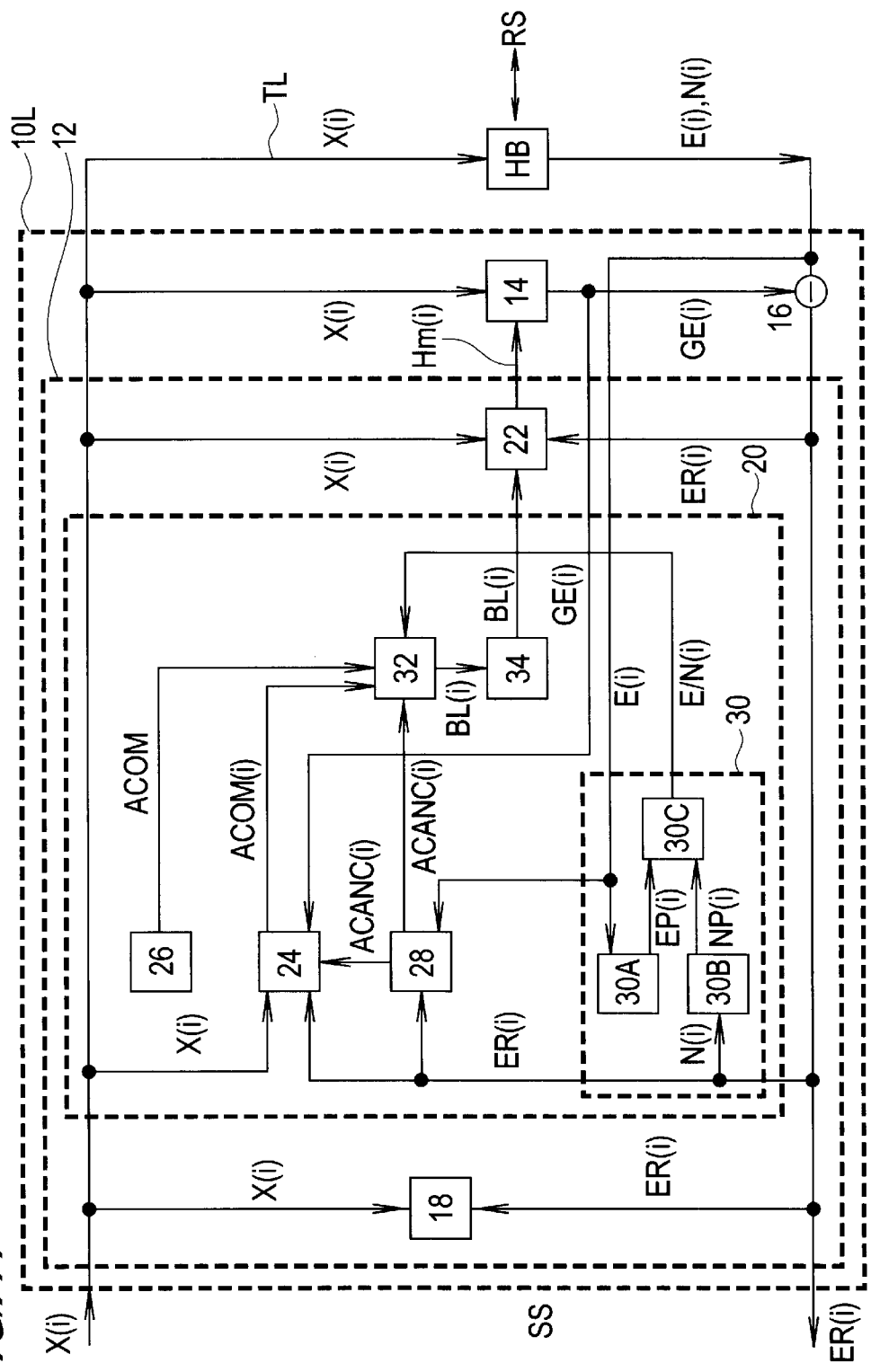
FIG. 17 is a configuration diagram of a 12th echo canceler.

FIG. 17 is a configuration diagram of an echo canceler in a 12th embodiment. The echo canceler in this 12th embodiment is hereinafter called the 12th echo canceler 10L.

This 12th echo canceler 10L is a modification of the 11th echo canceler 10K in the 11th embodiment.

This 12th echo canceler 10L estimates the echo attenuation amount ACOM(i) during the duplex status using a different method from that used by the 11th echo canceler 10K. That is, the echo attenuation amount computer 24 described earlier, during the duplex status, computes the differential between the reception signal power XP(i) during that duplex status and the pseudo-echo signal power GEP(i) during that duplex status. Next, this echo attenuation amount computer 24 estimates the echo attenuation amount ACOM(i) during that duplex status to be the sum of that differential and the echo cancellation amount ACANC(i) during the simplex status immediately prior to the change to the duplex status (it being permissible to use, for example, the echo cancellation amount ACANC(i) output by the echo cancellation amount computer 28). The echo attenuation amount computer 24 then outputs the estimated echo attenuation amount ACOM(i) to the block length computer 32.

Accordingly, during that duplex status, the echo attenuation amount computer 24 can estimate the block length BL(i) by itself. This 12th echo canceler 10L, unlike the 11th echo canceler 10K described earlier, may be made as a smaller apparatus by the measure of not containing the echo loss amount computer 42.

Except for the operation described above, the operations are the same as those of the 11th echo canceler 10K, and so are not further described here.

13th Embodiment

Figure 18:
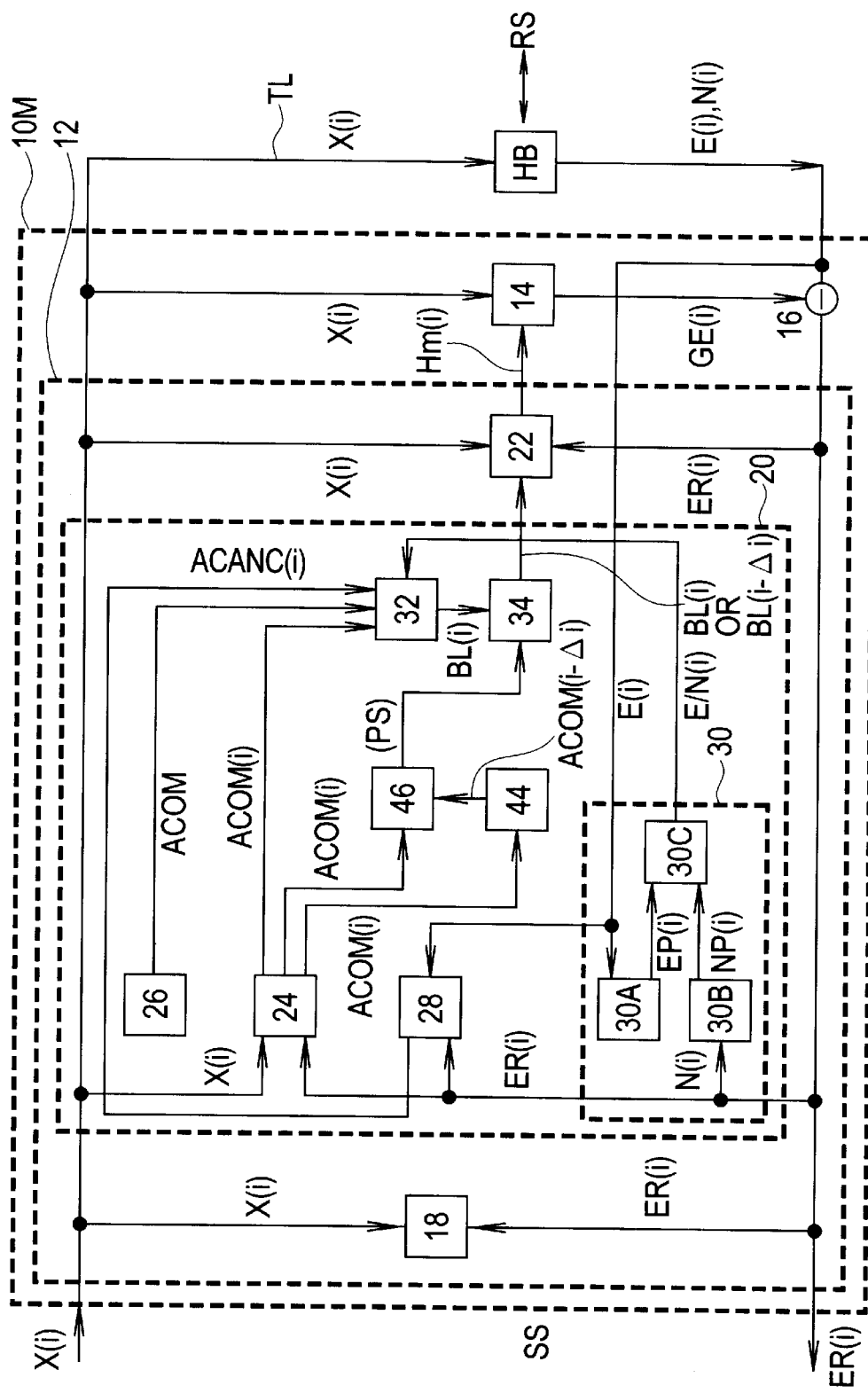
FIG. 18 is a configuration diagram of a 13th echo canceler.

FIG. 18 is a configuration diagram of an echo canceler in a 13th embodiment. The echo canceler in the 13th embodiment is hereinafter called the 13th echo canceler 10M.

This 13th echo canceler 10M is based on the first echo canceler 10A.

In the first echo canceler 10A in the first embodiment, described earlier, there are cases where, when the amplitude of the noise N(i) fluctuates greatly, the echo attenuation amount ACOM(i) does not increase as time elapses. Accordingly, the echo remainder power ERP(i) cannot be attenuated to the level of the noise power NP(i). That is, once the echo attenuation amount ACOM(i) reaches a certain value, it will not increase above that value.

That being so, the 13th echo canceler 10M comprises a delay register 44 and a first comparator 46 (described below).

When the call status is the simplex status, the delay register 44 holds the echo attenuation amount ACOM(i) output by the echo attenuation amount computer 24 and outputs it to the first comparator 46 after a delay of a $\Delta i$ sample (where $\Delta i$ is a natural number). The first comparator 46 compares the size relationship between that delayed echo attenuation amount ACOM(i) and the echo attenuation amount ACOM(i) output by the echo attenuation amount computer 24.

As will be discussed subsequently, the block length controller 34 in this 13th echo canceler 10M has functions for holding the block length BL(i) output by the block length computer 32.

Here, the echo attenuation amount ACOM(i) output after the delay of the $\Delta i$ sample from the delay register 44 is made the delayed echo attenuation amount ACOM(i–$\Delta i$) and the echo attenuation amount ACOM(i) output by the echo attenuation amount computer 24 is made the first undelayed echo attenuation amount ACOM(i).

Next, operations relating to the first comparator 46 described above are described.

Process Step 1: First, the first comparator 46 compares the size relationship between the first undelayed echo attenuation amount ACOM(i) and the delayed echo attenuation amount ACOM(i–$\Delta i$).

Process Step 1-1: When the first comparator 46 has determined that the first undelayed echo attenuation amount ACOM(i) is larger than the delayed echo attenuation amount ACOM(i–$\Delta i$), the first comparator 46 outputs a control signal PS to the block length controller 34 to cause the block length BL(i) output by the block length computer 32 to be output to the adaptive filter modulus computer 22. When this control signal PS is input, the block length controller 34 outputs that block length BL(i) to the adaptive filter modulus computer 22.

Process Step 1-2: When, on the other hand, the first comparator 46 has determined that the first undelayed echo attenuation amount ACOM(i) is equal to or less than the delayed echo attenuation amount ACOM(i–$\Delta i$), the first comparator 46 outputs a control signal PS to the block length controller 34 to cause the block length BL(i–$\Delta i$) at a point in time prior to the noted $\Delta i$ held by the block length controller 34 to be output to the adaptive filter modulus computer 22. When that control signal PS is input, the block length controller 34 outputs that block length BL(i–$\Delta i$) to the adaptive filter modulus computer 22.

Accordingly, in the simplex status, verification can be made as to whether or not the echo attenuation amount ACOM(i) is increasing as time elapses.

When the first undelayed echo attenuation amount ACOM(i) is larger than the delayed echo attenuation amount ACOM(i–$\Delta i$), that is, when the echo attenuation amount ACOM(i) at the current time is larger than the echo attenuation amount ACOM(i–$\Delta i$) at a point in time prior to the $\Delta i$ sample, it is known that this 13th echo canceler 10M is operating normally. In that case, the first comparator 46 exercises no particular control on the block length controller 34.

When, on the other hand, the first undelayed echo attenuation amount ACOM(i) is equal to or less than the delayed echo attenuation amount ACOM(i–$\Delta i$), that is, when the echo attenuation amount at the current time is equal to or less than the echo attenuation amount ACOM(i–$\Delta i$) at a point in time prior to the $\Delta i$ sample, it is known that the 13th echo canceler 10M is not operating normally. A possible cause thereof is that the amplitude of the noise N(i) is fluctuating greatly. In that case, the first comparator 46 judges that the echo attenuation amount ACOM(i) cannot be further increased even by increasing the block length BL(i). Thereupon, the block length controller 34, under the control of the first comparator 46, outputs the block length BL(i–$\Delta i$) at a point in time prior to the $\Delta i$ sample to the adaptive filter modulus computer 22. After that current point in time, if the large fluctuations in the amplitude of the noise N(i) disappear, the echo attenuation amount ACOM(i) can be expected to again be increased.

Except for the operation described above, the operations are the same as those of the first echo canceler 10A, and so are not further described here.

14th Embodiment

Figure 19:
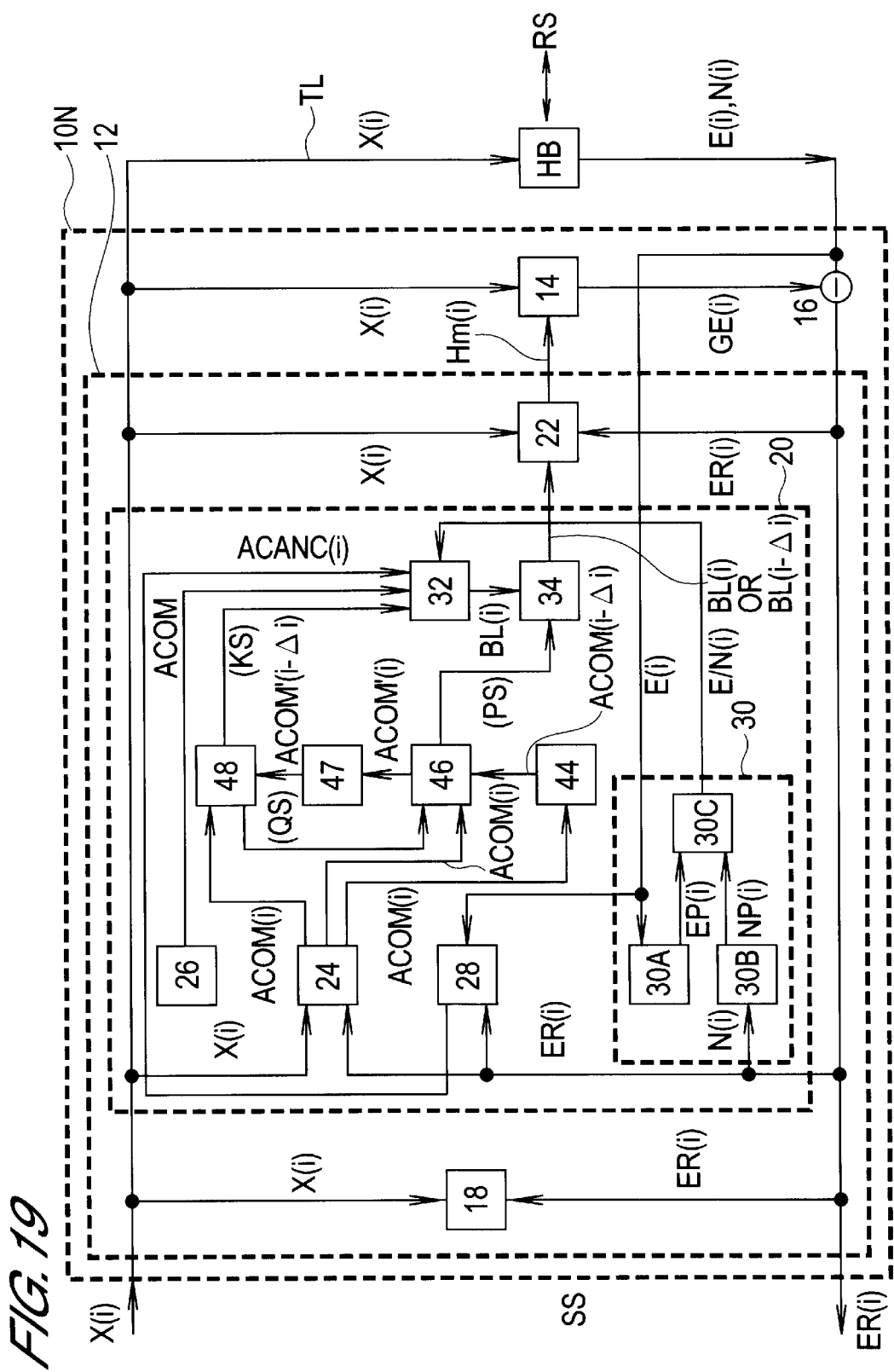
FIG. 19 is a configuration diagram of a 14th echo canceler.

FIG. 19 is a configuration diagram of an echo canceler in a 14th embodiment. The echo canceler in this 14th embodiment is hereinafter called the 14th echo canceler 10N.

This 14th echo canceler 10N is based on the 13th echo canceler 10M. The block length determinator 20 in this 14th echo canceler 10N further comprises a second delay register 47 and a second comparator 48.

In process step 1-1 in the 13th embodiment, the first comparator 46, when it has been determined that the first undelayed echo attenuation amount ACOM(i) is larger than the delayed echo attenuation amount ACOM(i−Δi), outputs the first undelayed echo attenuation amount ACOM(i) as a first delayed echo attenuation amount for consideration ACOM'(i). In process step 1-2 in the 13th embodiment, the first comparator 46, when it has been determined that the first undelayed echo attenuation amount ACOM(i) is equal to or less than the delayed echo attenuation amount ACOM (i−Δi), outputs the delayed echo attenuation amount ACOM (i−Δi) as the first delayed echo attenuation amount for consideration ACOM'(i).

The second delay register 47 delays that first delayed echo attenuation amount for consideration ACOM'(i) by the Δi sample and then outputs it as a second delayed echo attenuation amount for consideration ACOM'(i−Δi).

The second comparator 48 compares the size relationship between the second delayed echo attenuation amount for consideration ACOM'(i−Δi) output from the second delay register 47, and the echo attenuation amount ACOM(i) output by the echo attenuation amount computer 24.

When the second comparator 48 has determined that the echo attenuation amount ACOM(i) is larger than the second delayed echo attenuation amount for consideration ACOM' (i−Δi), that second comparator 48 does nothing in particular.

When, on the other hand, that second comparator 48 has determined that the echo attenuation amount ACOM(i) is equal to or less than the second delayed echo attenuation amount for consideration ACOM'(i−Δi), that second comparator 48 sends a control signal KS to the block length computer 32. The block length computer 32, when that control signal KS is input, outputs a predetermined initial block length as the block length BL(i) to the block length controller 34. Simultaneously therewith, the second comparator 48 outputs a control signal QS to the first comparator 46. The first comparator 46, when that control signal QS is input, outputs the control signal PS to the block length controller 34. The block length controller 34, when that control signal PS is input, outputs the initial block length to the adaptive filter modulus computer 22.

According to this configuration, when the echo attenuation amount ACOM(i) is equal to or less than the second echo attenuation amount for consideration ACOM'(i−Δi), it is known that altering the block length in the past was not effective. A possible cause thereof is not that the noise amplitude fluctuated greatly but rather that there was fluctuation in the impulse response in the echo path. In that case, the second comparator 48 recomputes a suitable block length by initializing the block length BL(i).

Except for the operation described above, the operations are the same as those of the 13th echo canceler 10M, and so are not further described here.

15th Embodiment

Figure 20:
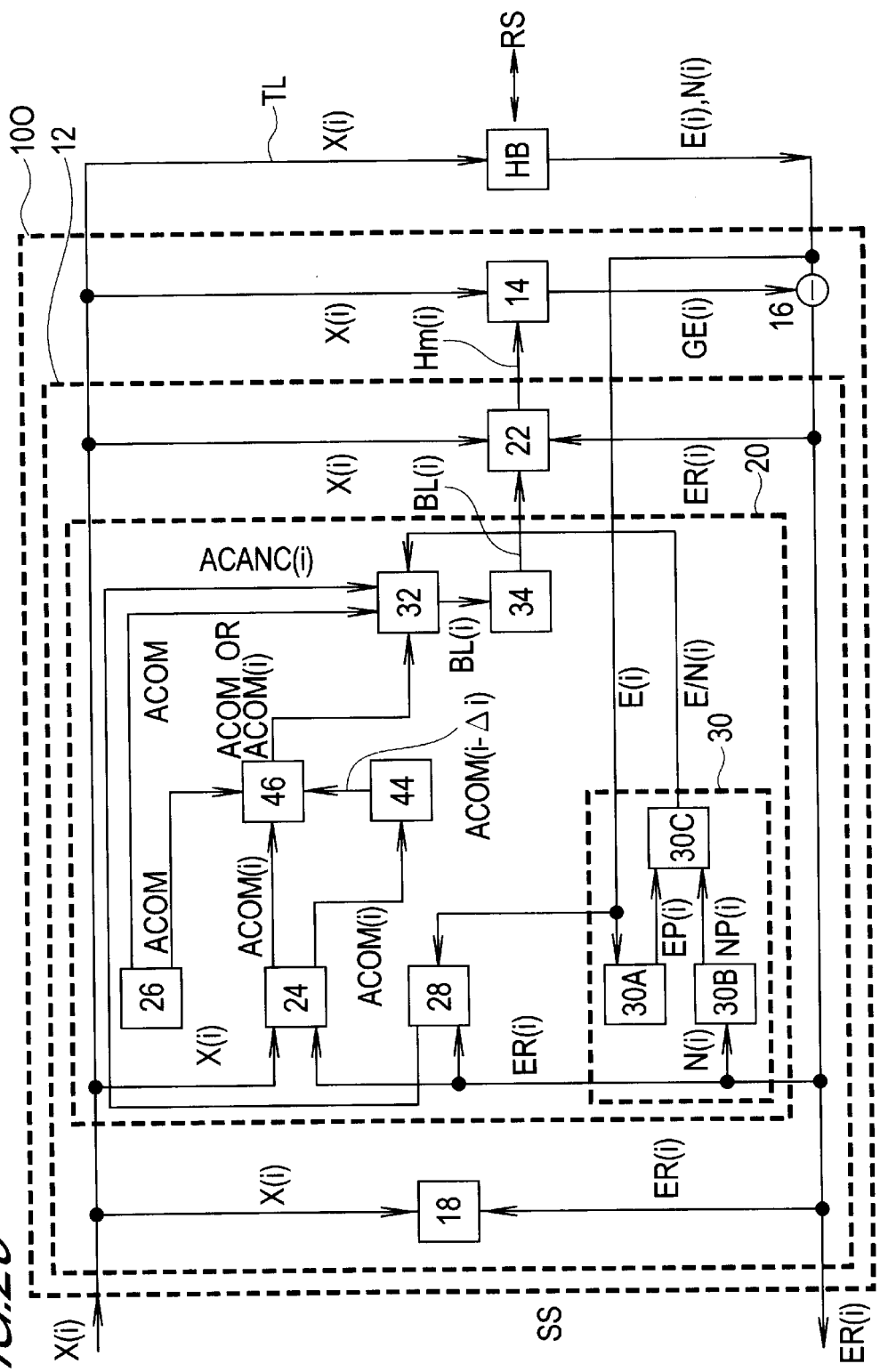
FIG. 20 is a configuration diagram of a 15th echo canceler.

FIG. 20 is a configuration diagram of an echo canceler in a 15th embodiment. The echo canceler in this 15th embodiment is hereinafter called the 15th echo canceler 10O.

The configuration of this 15th echo canceler 10O is a modification of the configuration of the 13th echo canceler 10M.

In this 15th echo canceler 10O, unlike in the 13th echo canceler 10M, the echo attenuation amount computer 24 is not connected to the block length computer 32, but is connected to the first comparator 46. Also, the first comparator 46 is not connected to the block length controller 34, but is connected to the block length computer 32.

Figure 21:
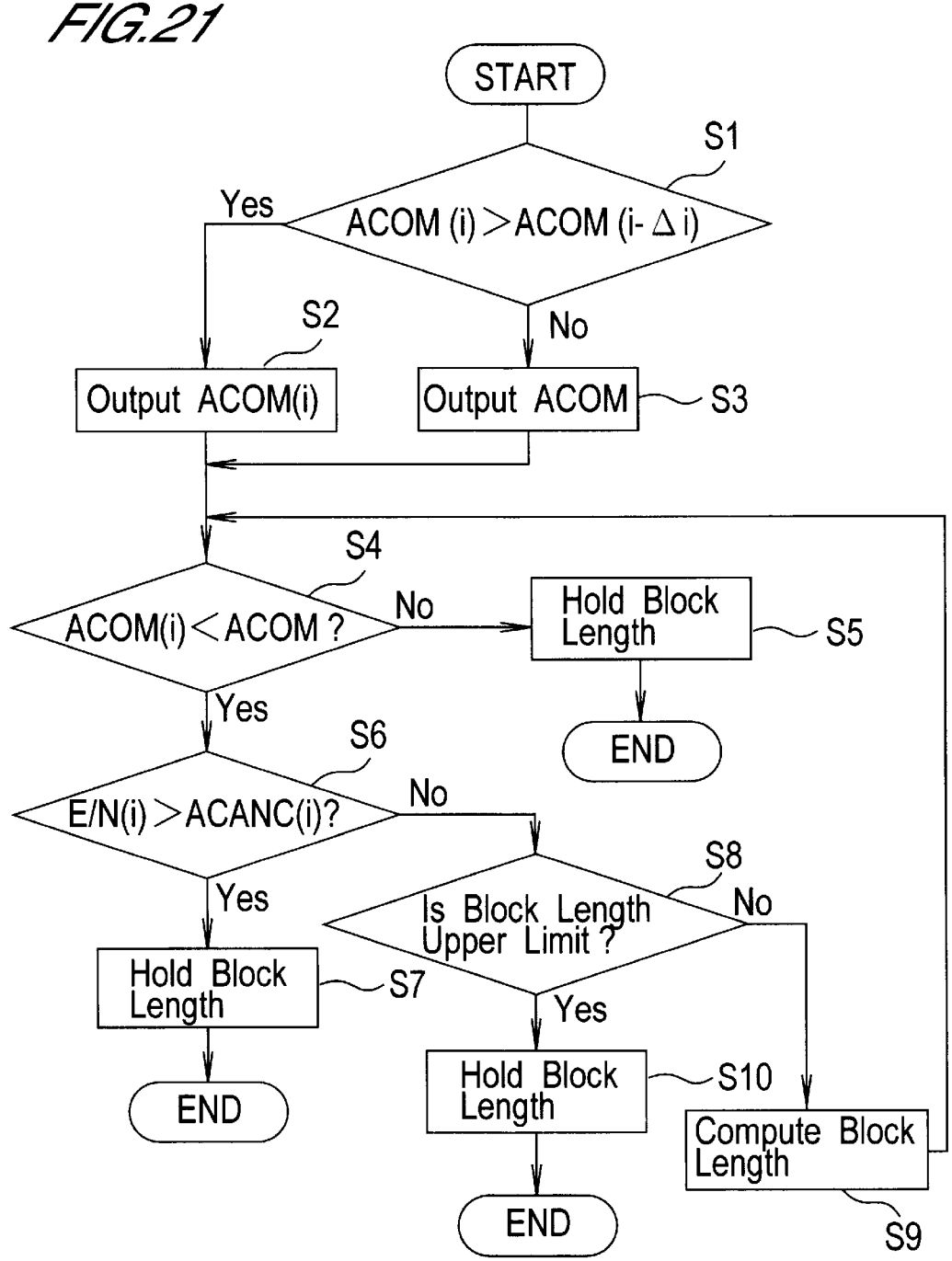
FIG. 21 is a flowchart used in describing the operation of the 15th echo canceler.

The operations of this 15th echo canceler 10O are next described with an emphasis on the points of difference with the operations of the 13th echo canceler 10M. FIG. 21 is a flowchart for describing the operations of the 15th echo canceler 10O in the simplex status.

Process Step 1: In the simplex status, the first comparator 46 compares the size relationship between the echo attenuation amount ACOM(i) output after a delay of the Δi sample from the delay register 44, and the echo attenuation amount ACOM(i) output by the echo attenuation amount computer 24 (S1 in FIG. 21).

Here, the echo attenuation amount ACOM(i) output from the delay register 44 after the delay of the Δi sample is made the delayed echo attenuation amount ACOM(i−Δi), and the echo attenuation amount ACOM(i) output by the echo attenuation amount computer 24 is made the first undelayed echo attenuation amount ACOM(i).

Process Step 1-1: When the first comparator 46 has determined that the first undelayed echo attenuation amount ACOM(i) is larger than the delayed echo attenuation amount ACOM(i−Δi), the first comparator 46 outputs that first undelayed echo attenuation amount ACOM(i) as the echo attenuation amount ACOM(i) to the block length computer 32 (S2 in FIG. 21).

Process Step 1-2: When, on the other hand, the first comparator 46 has determined that the first undelayed echo attenuation amount ACOM(i) is equal to or less than the delayed echo attenuation amount ACOM(i−Δi), the first comparator 46 sends a control signal to the desired echo attenuation amount indicator 26 to cause the desired echo attenuation amount ACOM to be output from that desired echo attenuation amount indicator 26 to the first comparator 46. Then the first comparator 46 outputs that desired echo attenuation amount ACOM as the echo attenuation amount ACOM(i) to the block length computer 32 (S3 in FIG. 21, noting that this ACOM(i) is represented as ACOM in FIG. 20 and in S3 in FIG. 21).

Process Step 2: Next, the block length computer 32 compares the size relationship between the echo attenuation amount ACOM(i) output from the first comparator 46 and the desired echo attenuation amount ACOM output from the desired echo attenuation amount indicator 26 (S4 in FIG. 21).

Process Step 2-1: When the echo attenuation amount ACOM(i) is equal to or greater than the desired echo attenuation amount ACOM, the block length computer 32 outputs the block length BL(i) at the current time as is, without updating it, to the block length controller 34 (S5 in FIG. 21).

Process Step 2-2: When the echo attenuation amount ACOM(i) is smaller than the desired echo attenuation amount ACOM, however, the block length computer 32 compares the size relationship between the echo cancellation amount ACANC(i) and the echo/noise ratio E/N(i) (S6 in FIG. 21).

Process Step 2-2-1: Then, when the echo cancellation amount ACANC(i) is smaller than the echo/noise ratio E/N(i), the block length computer 32 outputs the block length BL(i) at the current time as is, without updating it, to the block length controller 34 (S7 in FIG. 21).

Process Step 2-2-2: When, on the other hand, the echo cancellation amount ACANC(i) is equal to or greater than the echo/noise ratio E/N(i), the block length computer 32 determines whether or not the block length BL(i) at the current time is the predetermined upper limit of the block length (S8 in FIG. 21). If the block length BL(i) is less than the maximum value for the block length, the block length computer 32 increases the block length BL(i), and outputs that increased block length BL(i) to the block length controller 34. Then it returns to process step 2 (S9 in FIG. 21). If, however, the block length BL(i) at the current time is the maximum value for the block length, then the block length computer 32 outputs that block length BL(i) at the current time as is, without updating it, to the block length controller 34 (S10 in FIG. 21).

Process Step 3: Next, the block length controller 34 outputs the block length BL(i) output by the block length computer 32 to the adaptive filter modulus computer 22.

According to the configuration of this 15th echo canceler 10O, it can be verified whether or not the echo attenuation amount ACOM(i) is increasing as time elapses in the simplex status.

When the first undelayed echo attenuation amount ACOM(i) is larger than the delayed echo attenuation amount ACOM(i−Δi), that is, when the echo attenuation amount ACOM(i) at the current time is larger than the echo attenuation amount ACOM(i−Δi) at a point in time prior to the Δi sample, it is known that the 15th echo canceler 10O is operating normally. In that case, the first undelayed echo attenuation amount ACOM(i) is output from the first comparator 46. Accordingly, the echo attenuation amount ACOM(i) will appear to be directly output from the echo attenuation amount computer 24 to the block length computer 32.

When, on the other hand, the first undelayed echo attenuation amount ACOM(i) is equal to or less than the delayed echo attenuation amount ACOM(i−Δi), that is, when the echo attenuation amount ACOM(i) at the current time is equal to or less than the echo attenuation amount ACOM(i−Δi) at a point in time prior to the Δi sample, then it is known that the 15th echo canceler 10O is not operating normally. A possible cause thereof is that the amplitude of the noise N(i) is fluctuating greatly. In that case, the first comparator 46 judges that the echo attenuation amount ACOM(i) cannot be further increased even though the block length BL(i) be increased. Thereupon, the first comparator 46 causes the desired echo attenuation amount ACOM from the desired echo attenuation amount indicator 26 to be output to that first comparator 46, and outputs that desired echo attenuation amount ACOM as the echo attenuation amount ACOM(i) to the block length computer 32. Hence an echo attenuation amount ACOM(i) having the same value as the desired echo attenuation amount ACOM will appear to be directly output from the echo attenuation amount computer 24 to the block length computer 32. Accordingly, this block length computer 32 outputs the block length BL(i) at the current time, without increasing it, to the block length controller 34. The block length controller 34 outputs that block length BL(i) at the current time to the adaptive filter modulus computer 22. After that current point in time, if the large fluctuations in the noise N(i) cease, the echo attenuation amount ACOM(i) can be expected to again be increased.

Except for the operation described above, the operations are the same as those of the first echo canceler 10A, and so are not further described here.

16th Embodiment

Figure 22:
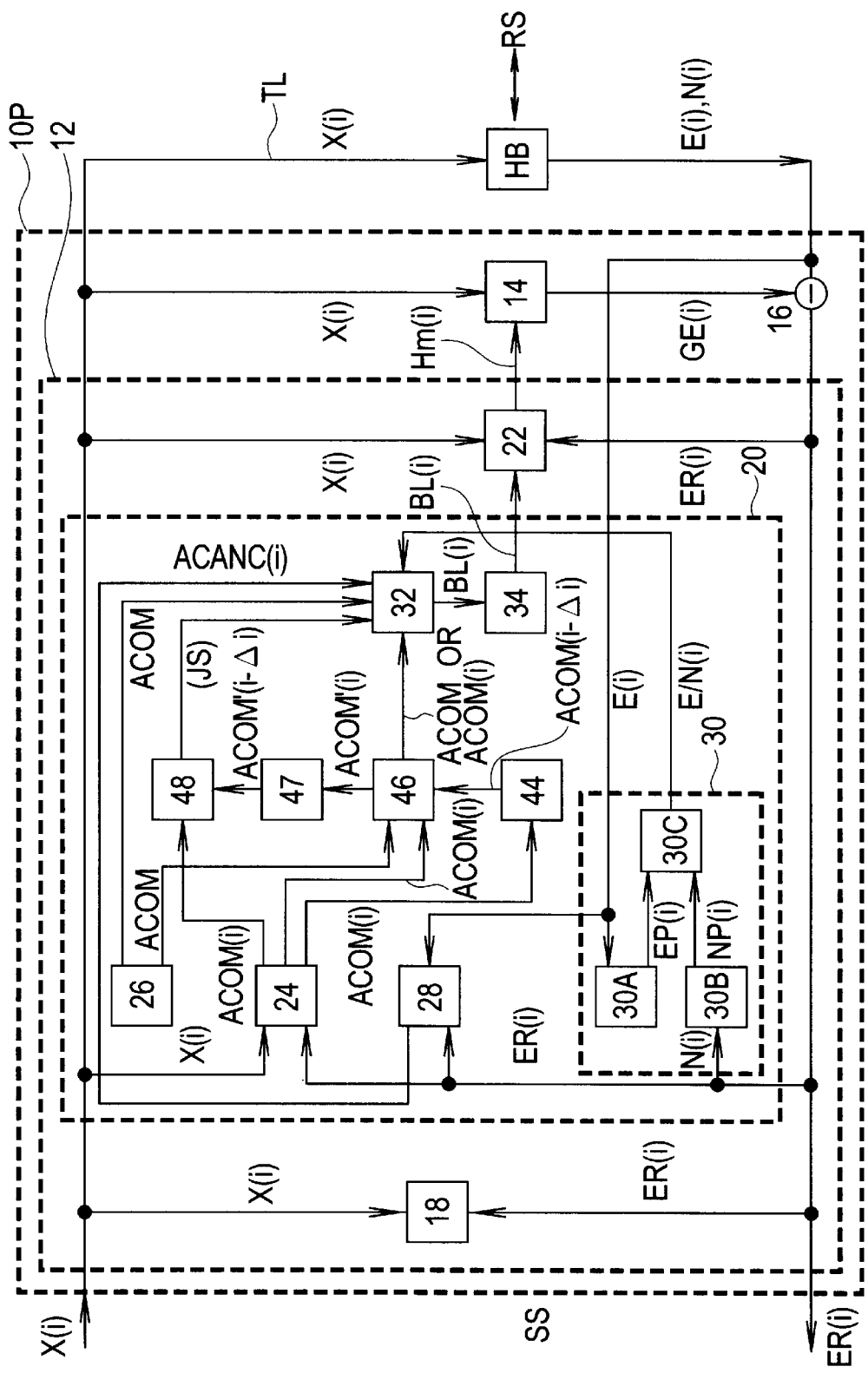
FIG. 22 is a configuration diagram of a 16th echo canceler.

FIG. 22 is a configuration diagram of an echo canceler in a 16th embodiment. The echo canceler in this 16th embodiment is hereinafter called the 16th echo canceler 10P.

This 16th echo canceler 10P is based on the 15th echo canceler 10O. The block length determinator 20 in this 16th echo canceler 10P further comprises a second delay register 47 and a second comparator 48.

In process step 1-1 in the 15th embodiment, the first comparator 46 also outputs the delayed echo attenuation amount ACOM(i−Δi), as the first delayed echo attenuation amount for consideration ACOM'(i), to the second delay register 47.

In process step 1-2 in the 15th embodiment, the first comparator 46, after causing the desired echo attenuation amount ACOM to be output from the desired echo attenuation amount indicator 26 to the first comparator 46, also outputs the delayed echo attenuation amount ACOM(i−Δi), as the first delayed echo attenuation amount for consideration ACOM'(i), to the second delay register 47.

Next, the second delay register 47 delays this first delayed echo attenuation amount for consideration ACOM'(i) by the Δi sample, and outputs it as the second delayed echo attenuation amount for consideration ACOM'(i−Δi) to the second comparator 48.

Next, the second comparator 48 compares the size relationship between the second delayed echo attenuation amount for consideration ACOM'(i−Δi) output from the second delay register 47, and the echo attenuation amount ACOM(i) output by the echo attenuation amount computer 24.

When the second comparator 48 has determined that the echo attenuation amount ACOM(i) is larger than the second delayed echo attenuation amount for consideration ACOM'(i−Δi), this second comparator 48 does nothing in particular.

When the second comparator 48 has determined that the echo attenuation amount ACOM(i) is equal to or less than the second echo attenuation amount for consideration ACOM'(i−Δi), on the other hand, this second comparator 48 outputs a control signal JS to the block length computer 32. The block length computer 32, when that control signal JS is input, outputs a predetermined initial block length as the block length BL(i) to the block length controller 34.

According to this configuration, when the echo attenuation amount ACOM(i) is equal to or less than the second delayed echo attenuation amount for consideration ACOM'(i−Δi), it is known that the alteration of the block length in the past was not effective. A possible cause thereof is not that the noise amplitude fluctuated greatly, but rather that there was fluctuation in the impulse response in the echo path. In that case, the second comparator 48 recomputes a suitable block length by initializing the block length BL(i).

Except for the operation described above, the operations are the same as those of the 15th echo canceler 10O, and so are not further described here.

17th Embodiment

Figure 23:
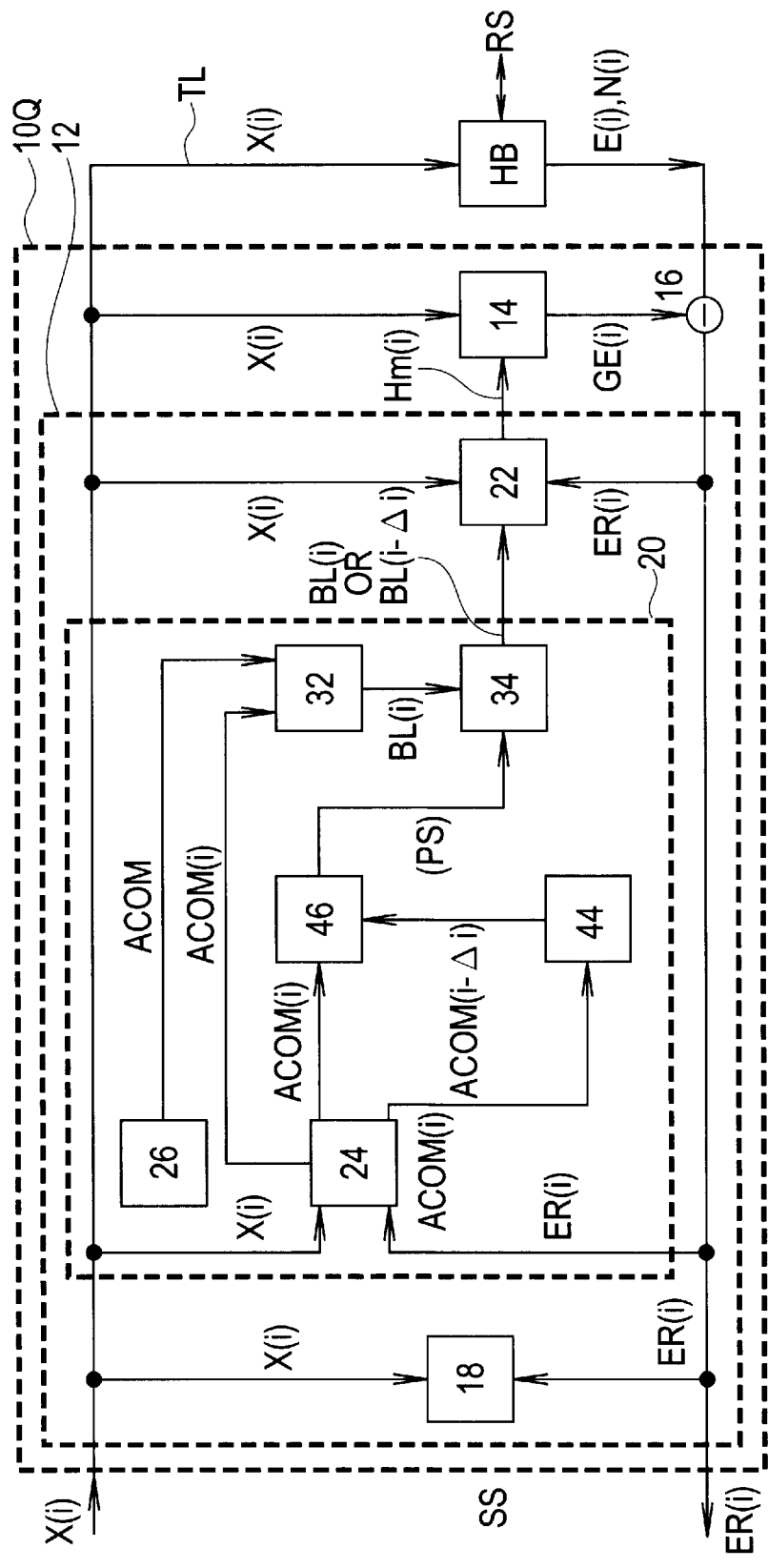
FIG. 23 is a configuration diagram 6f a 17th echo canceler.

FIG. 23 is a configuration diagram of an echo canceler in a 17th embodiment. The echo canceler in this 17th embodiment is hereinafter called the 17th echo canceler 10Q.

The configuration of this 17th echo canceler 10Q is a configuration achieved by eliminating the echo cancellation amount computer 28 and the echo/noise ratio computing unit 30 from the 13th echo canceler 10M. Accordingly, the block length computer 32 does not compare the ACANC(i) output by the echo cancellation amount computer 28 and the E/N(i) output by the echo/noise ratio computing unit 30. As a consequence, the block length computer 32 will always increase the block length BL(i). The block length computer 32 increases the block length BL(i) according to formula 2 or formula 2' below, for example $$BL(i+1) = BL(i) + \Delta BL(i)$$ (2)
$$\Delta BL(i) = INT\left(10^{\frac{Z(i)}{20}} + CI\right)$$

$$BL(i+1) = (1.0 + \Delta BL(i)) \cdot BL(i)$$ (2)'
$$\Delta BL(i) = INT\left(10^{\frac{Z(i)}{20}} + CI\right)$$

Except for the operation described above, the operations are the same as those of the 17th echo canceler 10Q, and so are not further described here.

18th Embodiment

Figure 24:
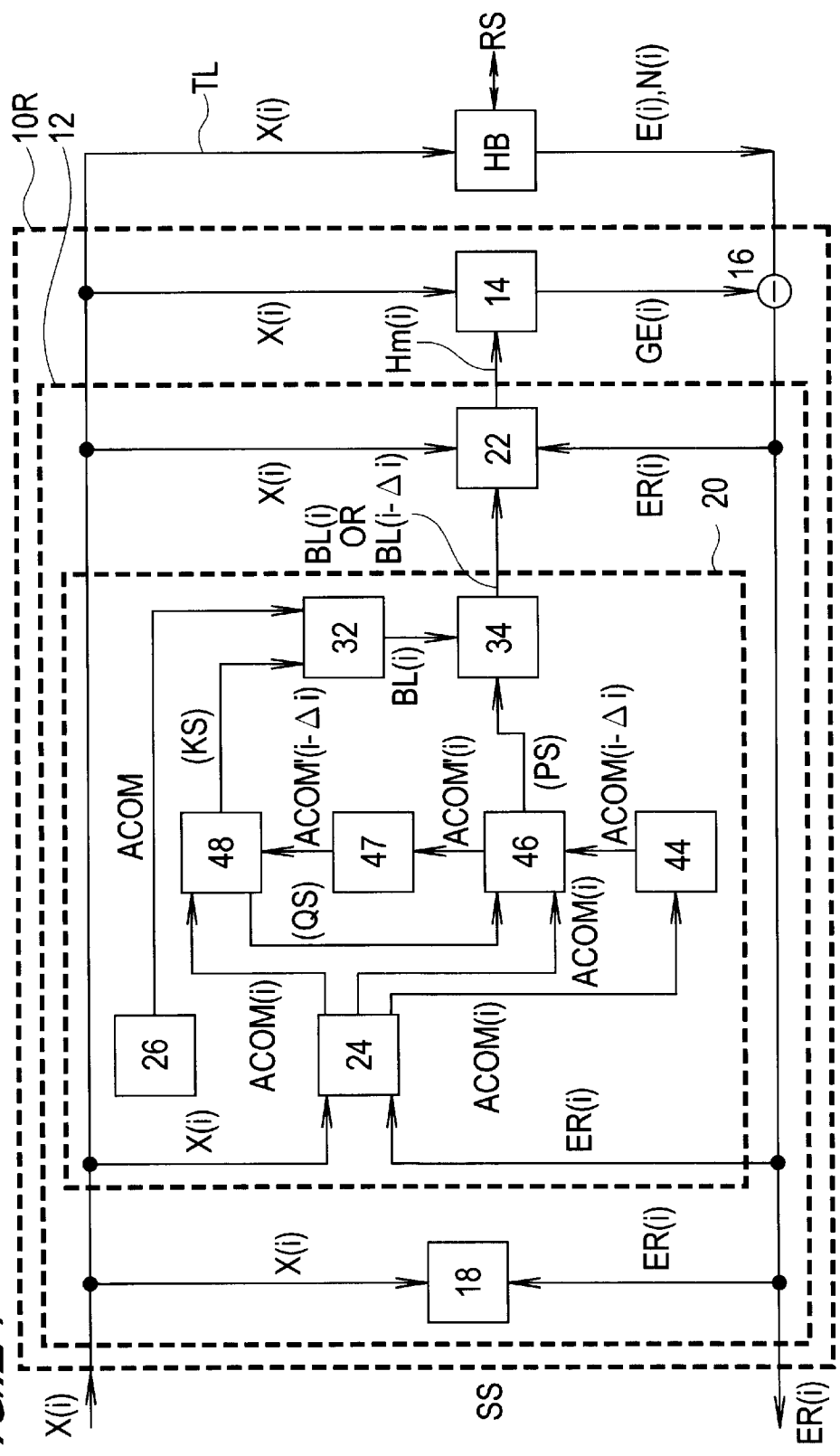
FIG. 24 is a configuration diagram of a 18th echo canceler.

FIG. 24 is a configuration diagram of an echo canceler in an 18th embodiment. The echo canceler in this 18th embodiment is hereinafter called the 18th echo canceler 10R.

The configuration of this 18th echo canceler 10R is a configuration that combines the 17th echo canceler 10Q and the 14th echo canceler 10N.

The operational effectiveness provided by this 18th echo canceler 10R is identical to the operational effectiveness provided by the 14th echo canceler 10N.

19th Embodiment

Figure 25:
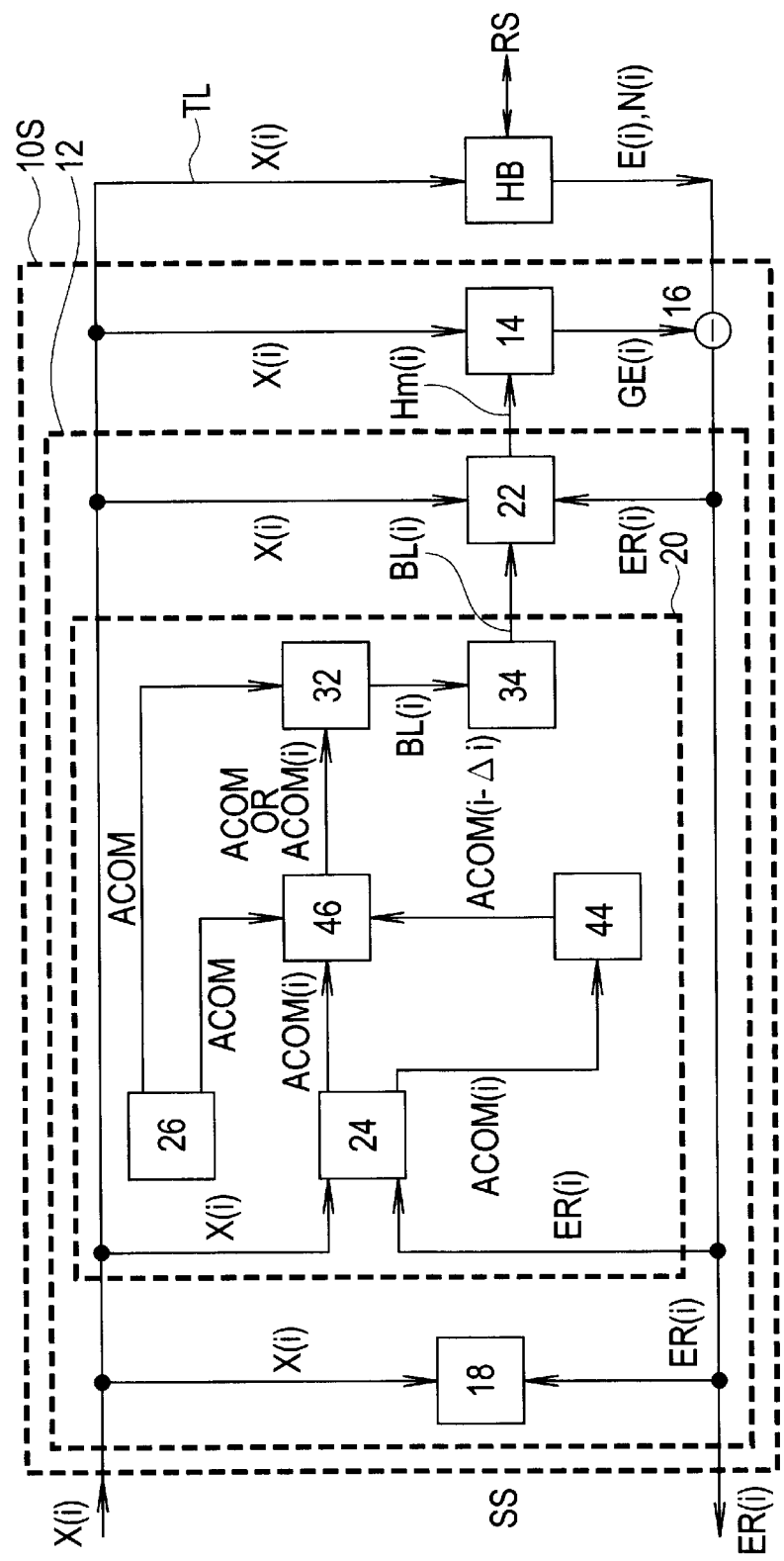
FIG. 25 is a configuration diagram of a 19th echo canceler.

FIG. 25 is a configuration diagram of an echo canceler in a 19th embodiment. The echo canceler in this 19th embodiment is hereinafter called the 19th echo canceler 10S.

The configuration of this 19th echo canceler 10S is a configuration achieved by eliminating the echo cancellation amount computer 28 and the echo/noise ratio computing unit 30 from the 15th echo canceler 10O. Accordingly, the block length computer 32 does not compare the ACANC(i) output by the echo cancellation amount computer 28 and the E/N(i) output by the echo/noise ratio computing unit 30. As a consequence, the block length computer 32 will always increase the block length BL(i). The block length computer 32 increases the block length BL(i) according to formula 2 or formula 2' below, for example $$BL(i+1) = BL(i) + \Delta BL(i)$$ (2)
$$\Delta BL(i) = INT\left(10^{\frac{Z(i)}{20}} + CI\right)$$

$$BL(i+1) = (1.0 + \Delta BL(i)) \cdot BL(i)$$ (2)'
$$\Delta BL(i) = INT\left(10^{\frac{Z(i)}{20}} + CI\right)$$

The operational effectiveness provided by this 19th echo canceler 10S is identical to the operational effectiveness provided by the 15th echo canceler 10O.

20th Embodiment

Figure 26:
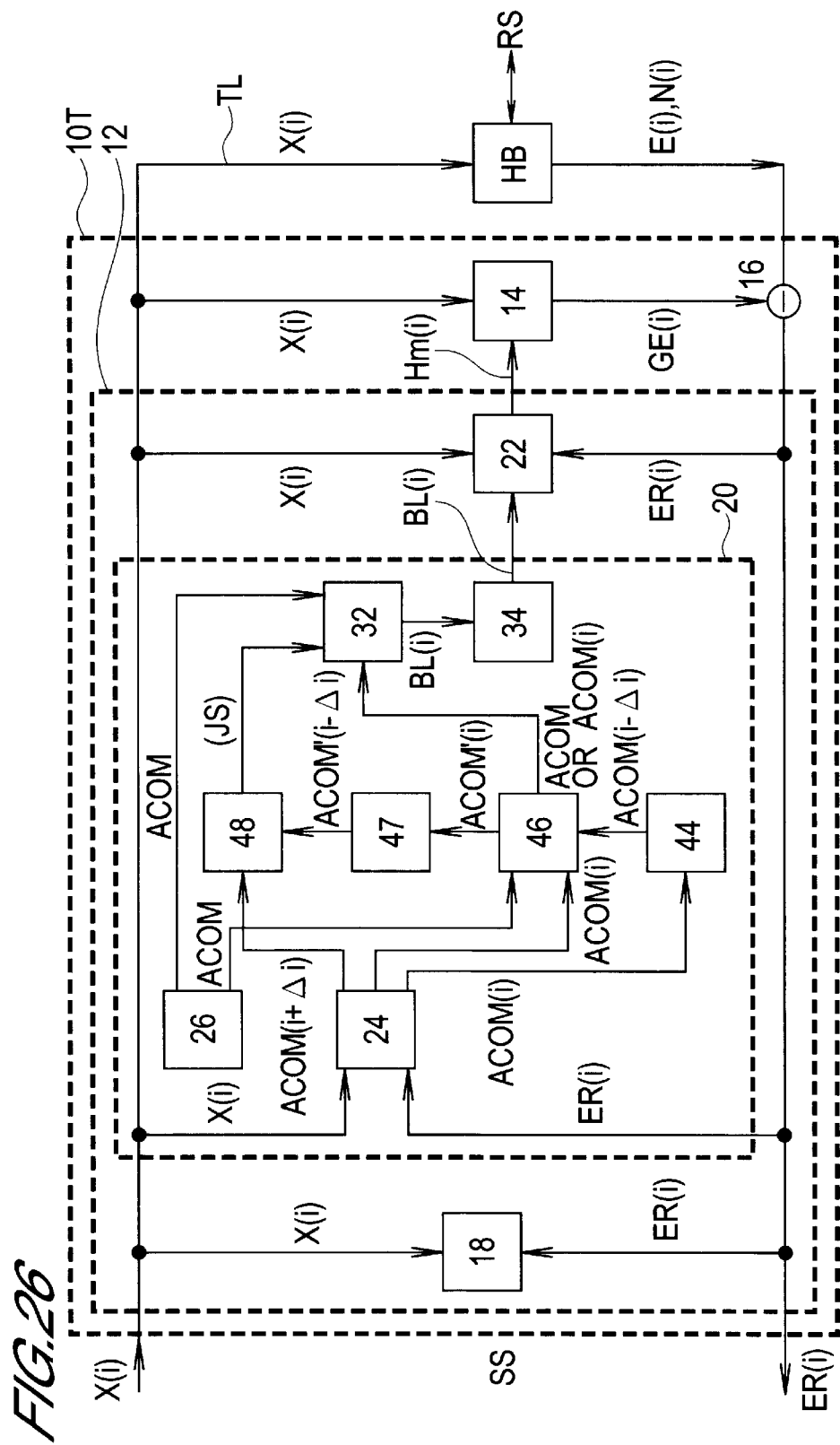
FIG. 26 is a configuration diagram of a 20th echo canceler.
Figure 27:
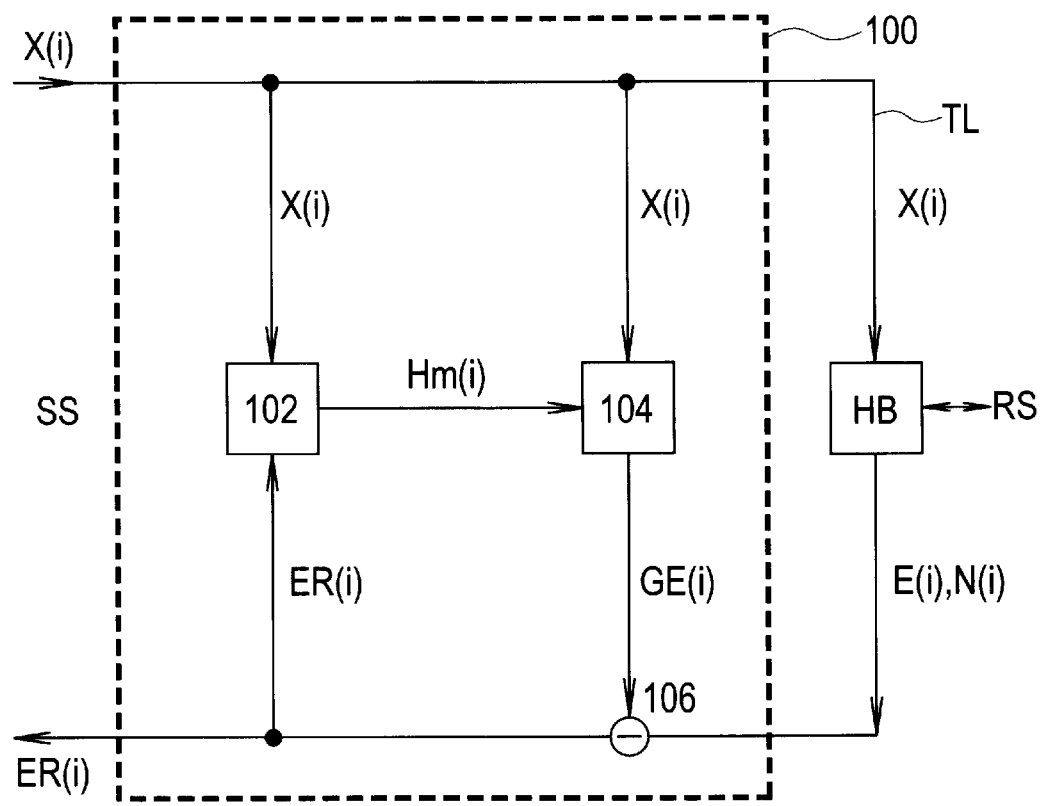
FIG. 27 is a configuration diagram of a conventionally configured echo canceler.

FIG. 26 is a configuration diagram of an echo canceler in a 20th embodiment. The echo canceler in this 20th embodiment is hereinafter called the 20th echo canceler 10T.

The configuration of this 20th echo canceler 10R is a configuration that combines the 19th echo canceler 10S and the 16th echo canceler 10P.

The operational effectiveness provided by this 20th echo canceler 10T is identical to the operational effectiveness provided by the 16th echo canceler 10P.

Description of Modification Examples

The present invention is not limited to or by the embodiments described in the foregoing, and can be modified in various ways according to design.

For example, in the embodiments described in the foregoing, the echo power EP(i) is not limited to being defined by the computation indicated in formula 5. The echo power EP(i) may be made the cumulative sum of the squares of the echo E(i), for example.

Furthermore, for example, in the embodiments described in the foregoing, the noise power NP(i) is not limited to being defined by the computation indicated in formula 6. The noise power NP(i) may be the cumulative sum of the squares of the noise N(i), for example.

Furthermore, for example, in the embodiments described in the foregoing, when the call status is the non-calling status, the call-transmission status, or the duplex status, the computation operations of the echo attenuation amount computer 24 are stopped. However, even if the computations of that echo attenuation amount computer 24 are continued, the computation operations of the block length computer 32 are stopped, wherefore the block length computer 32 will not be subjected to any particularly ill effects. That being so, the computation operations of the echo attenuation amount computer 24 may be continued.

Furthermore, for example, in the embodiments described in the foregoing, an attenuator is used as the device for attenuating the echo remainder ER(i), but a center clipper may also be used.

Furthermore, for example, in the 13th and 15th embodiments, real-time values are used in determining the size relationship between the first undelayed echo attenuation amount ACOM(i) and the delayed echo attenuation amount ACOM(i–Δi), but smoothing values may be used as in formula 13.

Furthermore, for example, in the 14th and 16th embodiments, real time values are used in determining the size relationship between the second delayed echo attenuation amount for consideration ACOM'(i–Δi) and the echo attenuation amount ACOM(i), but smoothing values may be used as in formula 13.

According to the echo canceler of the present invention, as is evident from the foregoing descriptions, the echo power can be lowered to the level of the noise power. Accordingly, long-distance telephone calling becomes more enjoyable.

According to the echo canceler of the present invention, moreover, the echo remainder power can be lowered to the level of the noise power, even when the noise amplitude fluctuates greatly, or the impulse response in the echo path fluctuates, or the tap length is insufficient. Accordingly, long-distance telephone calling becomes more enjoyable.

According to the echo canceler of the present invention, furthermore, the adaptive filter modulus computations and block length computations are simpler than those in a conventionally configured echo canceler, wherefore the present invention is efficient. The size of the devices involved in the echo canceler computations can also be made smaller.

According to the echo canceler of the present invention, moreover, the block length is estimated in the duplex status, and that block length can be used when there has been a change from the duplex status to the simplex status. Accordingly, in the simplex status, echo canceling can be done faster.

What is claimed is:

1. An echo canceler for canceling an echo resulting in a telephone line when part of a reception signal output from sending party end circles back to said sending party end through an echo path on receiving party end, comprising:

an adaptive filter modulus computing system for estimating impulse response of said echo path by least mean square method, and outputting said estimated impulse response as an adaptive filter modulus;

an adaptive filter for producing, and outputting, a pseudo-echo signal for said echo by convoluting said adaptive filter modulus and said reception signal; and an adder for canceling said echo by subtracting said pseudo-echo signal from said echo; wherein:

said adaptive filter modulus computing system comprises:
a duplex detector;
a block length determinator; and
an adaptive filter modulus computer;
said duplex detector determines whether call status is simplex status, duplex status, call-transmission status, or non-calling status, when difference between said echo and said pseudo-echo signal is made echo remainder, logarithmic ratio between power of said reception signal and power of said echo remainder is made echo attenuation amount, and any predetermined target value for said echo attenuation amount is made desired echo attenuation amount;

said block length determinator determines and outputs block length in said least mean square method so that said echo attenuation amount is ultimately made equal to or greater than said desired echo attenuation amount; and said adaptive filter modulus computer computes said adaptive filter modulus using said block length, said echo remainder, and said reception signal, and outputs said adaptive filter modulus to said adaptive filter.

2. An echo canceler according to claim 1, wherein said desired echo attenuation amount is set greater than logarithmic ratio between power of said reception signal and noise power.

3. An echo canceler according to claim 1, wherein, when, in sample number i (where i=1, 2, 3, . . . ), said reception signal is represented as X(i), said echo remainder is represented as ER(i), m'th said adaptive filter modulus (where m=1, 2, 3, . . . ) is represented as $H_m(i)$, and said block length is represented as BL(i), and it has been determined by said duplex detector that said call status is said simplex status, said adaptive filter modulus computer is configured to compute said adaptive filter modulus $H_m(i)$ in accordance with a formula, namely $$A_m(i) = \sum_{j=iBL(i)+1}^{(i+1)BL(i)} ER(j) X(j-m)$$
$$XP_m(i) = (1 - \delta_p)XP_m(i-1) + \delta_p X^2(i)$$
$$R_m(i) = \frac{A_m(i)}{XP_m(i)}$$
$$H_m(i+1) = H_m(i) + KR_m(i)$$

where $\delta_P$ is a smoothing constant in range $0<\delta_p<1$, and K (K>0) is step gain.

4. An echo canceler according to claim 1, wherein, when noise is made noise component excluding echo component, logarithmic ratio between power of said echo and power of said echo remainder is made echo cancellation amount, and logarithmic ratio between power of said echo and power of said noise is made echo/noise ratio, said block length determinator, when it has been determined by said duplex detector that said call status is said simplex status, comprises: an echo attenuation amount computer for computing and outputting said echo attenuation amount; a desired echo attenuation amount indicator for designating said desired echo attenuation amount; an echo cancellation amount computer for computing and outputting said echo cancellation amount; an echo/noise ratio computing unit for computing and outputting said echo/noise ratio; a block length computer for computing, and outputting, said block length, based on said echo attenuation amount, said desired echo attenuation amount, said echo cancellation amount, and said echo/noise ratio, so that said echo attenuation amount is made equal to or greater than said desired echo attenuation amount; and a block length controller for determining, from said block length, said block length to be output to said adaptive filter modulus computer, and outputting said block length to said adaptive filter modulus computer.

5. An echo canceler according to claim 4, wherein said echo/noise ratio computation unit comprises: an echo power computer for computing and outputting said echo power; a noise power computer for computing and outputting said noise power; and an echo/noise ratio computing unit for computing, and outputting, said echo/noise ratio from said echo power output from said echo power computer and said noise power output from said noise power computer.

6. An echo canceler according to claim 1, further comprising: an attenuation amount controller for computing and outputting an insertion attenuation amount that is an attenuation amount for further attenuating said power of said echo remainder; and an attenuator for further attenuating power of said echo remainder by said insertion attenuation amount.

7. An echo canceler according to claim 4, further comprising: an attenuation amount controller for computing and outputting an insertion attenuation amount that is an attenuation amount for further attenuating said power of said echo remainder; and an attenuator for further attenuating power of said echo remainder by said insertion attenuation amount; wherein said attenuation amount controller computes difference between said desired echo attenuation amount output from said desired echo attenuation amount indicator and said echo attenuation amount output by said echo attenuation amount computer, as said insertion attenuation amount.

8. An echo canceler according to claim 5, further comprising: an attenuation amount controller for computing and outputting an insertion attenuation amount that is an attenuation amount for further attenuating power of said echo remainder; and an attenuator for further attenuating power of said echo remainder by said insertion attenuation amount; wherein said attenuation amount controller computes reception signal/noise ratio that is logarithmic ratio between power of said reception signal and power of said noise output from said noise power computer, and thereafter computes difference between said reception signal/noise ratio and said echo attenuation amount output by said echo attenuation amount computer, as said insertion attenuation amount.

9. An echo canceler according to claim 5, further comprising: an attenuation amount controller for computing and outputting an insertion attenuation amount that is an attenuation amount for further attenuating power of said echo remainder; and an attenuator for further attenuating power of said echo remainder by said insertion attenuation amount; wherein said attenuation amount controller computes difference between said echo/noise ratio output by said echo/noise ratio computing unit and said echo cancellation amount output by said echo cancellation amount computer, as said insertion attenuation amount.

10. An echo canceler according to claim 4, further comprising a tap length controller for lengthening tap length in said adaptive filter modulus computer when said echo cancellation amount is smaller than said echo/noise ratio.

11. An echo canceler according to claim 4, wherein, when said duplex detector has determined that said call status has been changed from said simplex status to said duplex status, while in said duplex status, said echo attenuation amount computer estimates said echo attenuation amount during said duplex status, and outputs said estimated echo attenuation amount to said block length computer.

12. An echo canceler according to claim 11, further comprising an echo loss amount computer for computing echo loss amount that is logarithmic ratio between power of said reception signal and power of said echo, wherein: said echo loss amount computer, when said duplex detector has determined that said call status has been changed from said simplex status to said duplex status, estimates sum of said echo loss amount during said simplex status immediately prior to change to said duplex status and said echo cancellation amount during said simplex status to be said echo attenuation amount during said duplex status, and thereafter, while in said duplex status, estimates difference between said reception signal during said duplex status and said estimated echo attenuation amount to be said echo remainder during said duplex status, and outputs said estimated echo remainder to said echo attenuation amount computer; and said echo attenuation amount computer estimates logarithmic ratio between said reception signal during said duplex status and said estimated echo remainder to be said echo attenuation amount during said duplex status.

13. An echo canceler according to claim 11, wherein said echo attenuation amount computer, when said duplex detector has determined that said call status has been changed from said simplex status to said duplex status, while in said duplex status, computes differential between power of said reception signal during said duplex status and power of said pseudo-echo signal during said duplex status, and then estimates sum of said differential and said echo cancellation amount during said simplex status immediately prior to change to said duplex status to be said echo attenuation amount during said duplex status.

14. An echo canceler according to claim 4, wherein said block length determinator further comprises: a delay register for holding said echo attenuation amount output by said echo attenuation amount computer and outputting same after delay of $\Delta i$ sample (where $\Delta i$ is a natural number), when said duplex detector has determined that said call status is said simplex status; and a first comparator for comparing size relationship between said echo attenuation amount output from said delay register and said echo attenuation amount output by said echo attenuation amount computer.

15. An echo canceler according to claim 14, wherein said block length controller, according to results of comparisons by said first comparator, either outputs said block length output by said block length computer to said adaptive filter modulus computer without delaying same, or outputs said block length at point in time prior to said $\Delta i$ sample held by said block length controller to said adaptive filter modulus computer.

16. An echo canceler according to claim 14, wherein said block length determinator further comprises: a second delay register for outputting said echo attenuation amount output from said first comparator after delaying same by said $\Delta i$ sample; and a second comparator for comparing size relationship between said echo attenuation amount output from said second delay register and said echo attenuation amount output by said echo attenuation amount computer.

17. An echo canceler according to claim 16, wherein said block length computer, according to results of comparisons by said second comparator, either outputs said block length to said block length controller, or outputs a predetermined initial block length, as said block length, to said block length controller.

18. An echo canceler according to claim 1, wherein, when noise is made noise component excluding echo component, said block length determinator, when said duplex detector has determined that said call status is said simplex status, comprises: an echo attenuation amount computer for computing and outputting said echo attenuation amount; a desired echo attenuation amount indicator for designating said desired echo attenuation amount; a block length computer for computing, and outputting said block length, based on said echo attenuation amount and said desired echo attenuation amount, so that said echo attenuation amount is made equal to or greater than said desired echo attenuation amount; a delay register for holding said echo attenuation amount output by said echo attenuation amount computer and outputting same after delaying by $\Delta i$ sample (where $\Delta i$ is a natural number); a first comparator for comparing size relationship between said echo attenuation amount output from said delay register and said echo attenuation amount output by said echo attenuation amount computer; and a block length controller for, according to results of comparisons by said first comparator, either outputting said block length output by said block length computer, without a delay, to said adaptive filter modulus computer, or outputting said block length at point in time prior to said $\Delta i$ sample held by said block length controller to said adaptive filter modulus computer.

19. An echo canceler operating method for causing an echo canceler to cancel an echo resulting in a telephone line when part of a reception signal output from sending party end circles back to said sending party end via echo path on receiving party end, wherein:

said echo canceler comprises:
an adaptive filter modulus computing system;
an adaptive filter; and
an adder;
said adaptive filter modulus computing system comprises:
a duplex detector;
a block length determinator; and
an adaptive filter modulus computer;
said adaptive filter modulus computing system estimates impulse response of said echo path by least mean square method and outputs said estimated impulse response as an adaptive filter modulus;
said adaptive filter produces and outputs a pseudo-echo signal for said echo by convoluting said adaptive filter modulus and said reception signal;
said adder cancels said echo by subtracting said pseudo-echo signal from said echo;
said duplex detector determines whether said call status is simplex status, duplex status, call-transmission status, or non-calling status, when difference between said echo and said pseudo-echo signal is made echo remainder, logarithmic ratio between power of said reception signal and power of said echo remainder is made echo attenuation amount, and any predetermined target value for said echo attenuation amount is made desired echo attenuation amount;
said block length determinator, when said duplex detector has determined that said call status is said simplex status, determines block length in said least mean square method so that said echo attenuation amount is made equal to or greater than said desired echo attenuation amount; and said adaptive filter modulus computer computes said adaptive filter modulus using said block length, said echo remainder, and said reception signal, and outputs said adaptive filter modulus to said adaptive filter.

20. An echo canceler operating method according to claim 19, wherein: said block length determinator comprises: an echo attenuation amount computer, a desired echo attenuation amount indicator; an echo cancellation amount computer; an echo/noise ratio computing unit; a block length computer; and a block length controller; and, when noise is made noise component excluding echo component, logarithmic ratio between power of said echo and power of said echo remainder is made echo cancellation amount, and logarithmic ratio between power of said echo and power of said noise is made echo/noise ratio, and said duplex detector has determined that said call status is said simplex status: said echo attenuation amount computer computes and outputs said echo attenuation amount; said desired echo attenuation amount indicator designates said desired echo attenuation amount; said echo cancellation amount computer computes and outputs said echo cancellation amount; said echo/noise ratio computing unit computes and outputs said echo/noise ratio; said block length computer computes, and outputs, said block length, based on said echo attenuation amount, said desired echo attenuation amount, said echo cancellation amount, and said echo/noise ratio, so that said echo attenuation amount is made equal to or greater than said desired echo attenuation amount; and said block length controller determines, from said block length, said block length to be output by said adaptive filter modulus computer, and outputs said block length to said adaptive filter modulus computer.

21. An echo canceler operating method according to claim 20, wherein: when said duplex detector has determined that said call status is said simplex status, (in process step A-1) said block length computer compares size relationship between said echo attenuation amount and said desired echo attenuation amount; (in process step A-1-1) said block length computer, when said echo attenuation amount is equal to or greater than said desired echo attenuation amount, outputs said block length at current time as is, without updating, to said block length controller, or (in process step A-1-2), when said echo attenuation amount is smaller than said desired echo attenuation amount, compares size relationship between said echo cancellation amount and said echo/noise ratio; (in process step A-1-2-1) when said echo cancellation amount is smaller than said echo/noise ratio, said block length computer outputs said block length at current time as is, without updating, to said block length controller, or, (in process step A-1-2-2) when said echo cancellation amount is equal to or greater than said echo/noise ratio, if said block length at said current time is less than a predetermined maximum value for said block length, said block length computer increases said block length and outputs said increased block length to said block length controller and then returns to process step A-1, or, if said block length at said current time is said maximum value, outputs said block length at said current time as is, without updating, to said block length controller; and (in process step A-2) said block length controller next outputs said block length to said adaptive filter modulus computer.

22. An echo canceler operating method according to claim 21, wherein: said echo canceler further comprises an attenuation amount controller and an attenuator; after said process step A-1-2-1, said attenuation amount controller computes and outputs an insertion attenuation amount that is an attenuation amount for further attenuating power of said echo remainder; and, subsequent thereto, said attenuator further attenuates power of said echo remainder by said insertion attenuation amount.

23. An echo canceler operating method according to claim 21, wherein: said echo canceler further comprises a tap length controller; and, after said process step A-1-2-1, said tap length controller lengthens tap length in said adaptive filter modulus computer.

24. An echo canceler operating method according to claim 23, wherein: said echo canceler further comprises: an attenuation amount controller for computing and outputting an insertion attenuation amount that is an attenuation amount for further attenuating power of said echo remainder; and an attenuator for further attenuating power of said echo remainder by said insertion attenuation amount output by said attenuation amount controller; said echo attenuation amount computer, after said tap length controller has lengthened said tap length in said adaptive filter modulus computer, compares size relationship between said post-lengthening echo attenuation amount computed on basis of said lengthened tap length, and said pre-lengthening echo attenuation amount computed on basis of said tap length prior to lengthening, and thereafter, when said post-lengthening echo attenuation amount is larger than said pre-lengthening echo attenuation amount, sustains lengthening of said tap length in said adaptive filter modulus computer by said tap length controller, or, when said post-lengthening echo attenuation amount is equal to or less than said pre-lengthening echo attenuation amount, stops lengthening of said tap length in said adaptive filter modulus computer by said tap length controller; whereafter said attenuation amount controller computes said insertion attenuation amount; and said attenuator further attenuates power of said echo remainder by said insertion attenuation amount.

25. An echo canceler operating method according to claim 21, wherein: when said duplex detector has determined that said call status has changed from said simplex status to said duplex status, said echo cancellation amount computer estimates said echo cancellation amount immediately prior during said simplex status immediately prior to change to said duplex status to be said echo cancellation amount during said duplex status, and said echo/noise ratio computer estimates said echo/noise ratio immediately prior during said simplex status immediately prior to change to said duplex status to be said echo/noise ratio during said duplex status; next after which, during said duplex status, said echo attenuation amount computer estimates said echo attenuation amount during said duplex status and outputs said estimated echo attenuation amount to said block length computer; (in process step B-1) said block length computer compares size relationship between said estimated echo attenuation amount and said desired echo attenuation amount output from said desired echo attenuation amount indicator; (in process step B-1-1) when said estimated echo attenuation amount is equal to or greater than said desired echo attenuation amount, said block length computer outputs said block length at current time as is, without updating, to said block length controller, or, (in process step B-1-2) when said estimated echo attenuation amount is less than said desired echo attenuation amount, compares size relationship between said estimated echo cancellation amount and said estimated echo/noise ratio; whereupon, (in process step B-1-2-1) when said estimated echo cancellation amount is less than said estimated echo/noise ratio, said block length computer outputs said block length at current time as is, without updating, to said block length controller, or, (in process step B-1-2-2) when said estimated echo cancellation amount is equal to or greater than said estimated echo/noise ratio, said block length computer, if said block length at said current time is less than a predetermined maximum value for said block length, increases said block length, outputs said increased block length to said block length controller, and then returns to said process step B-1, or, if said block length at said current time is said maximum value for said block length, outputs said block length at said current time as is, without updating, to said block length controller, next after which (in process step B-2) said block length controller holds said block length without outputting said block length to said adaptive filter modulus computer; said adaptive filter modulus computer stops computation of said adaptive filter modulus, holds said adaptive filter modulus immediately prior during said simplex status immediately prior to said duplex status, and outputs that adaptive filter modulus to said adaptive filter; next after which, when said duplex detector has determined that said call status has changed from said duplex status to said simplex status, said block length controller outputs said block length held by that block length controller to said adaptive filter modulus computer.

26. An echo canceler operating method according to claim 25, wherein: when logarithmic ratio between power of said reception signal and power of said echo is defined as echo loss amount, said block length determinator comprises an echo loss amount computer for computing said echo loss amount; and, when said duplex detector has determined that said call status has changed from said simplex status to said duplex status, said echo loss amount computer estimates sum of said echo loss amount during said simplex status immediately prior to change to said duplex status and said echo cancellation amount during said simplex status to be said echo attenuation amount during said duplex status; whereafter, during said duplex status: said echo loss amount computer estimates difference between said reception signal during said duplex status and said estimated echo attenuation amount to be said echo remainder during said duplex status, and outputs that estimated echo remainder to said echo attenuation amount computer; and said echo attenuation amount computer estimates logarithmic ratio between said reception signal during said duplex status and said estimated echo remainder to be said echo attenuation amount during said duplex status, and outputs that estimated echo attenuation amount to said block length computer.

27. An echo canceler operating method according to claim 25, wherein: when said duplex detector has determined that said call status has changed from said simplex status to said duplex status, during said duplex status, said echo attenuation amount computer computes differential between power of said reception signal during that duplex status and power of said pseudo-echo signal during that duplex status, then estimates sum of said differential and said echo cancellation amount during said simplex status immediately prior to change to said duplex status to be said echo attenuation amount during said duplex status, and outputs said estimated echo attenuation amount to said block length computer.

28. An echo canceler operating method according to claim 20, wherein: said block length determinator further comprises a delay register and a first comparator; and, when said duplex detector has determined that said call status is said simplex status, said delay register holds said echo attenuation amount output by said echo attenuation amount computer and outputs same after delaying by $\Delta i$ sample (where $\Delta i$ is a natural number), and said first comparator compares size relationship between said echo attenuation amount output from said delay register and said echo attenuation amount output by said echo attenuation amount computer.

29. An echo canceler operating method according to claim 28, wherein: when said duplex detector has determined that said call status is said simplex status: (in process step C-1) said block length computer compares size relationship between said echo attenuation amount and said desired echo attenuation amount; (in process step C-1-1) when said echo attenuation amount is equal to or greater than said desired echo attenuation amount, said block length computer outputs said block length at current time as is, without updating, to said block length controller, or, (process step C-1-2) when said echo attenuation amount is smaller than said desired echo attenuation amount, compares size relationship between said echo cancellation amount and said echo/noise ratio; (process step C-1-2-1) when said echo cancellation amount is smaller than said echo/noise ratio, said block length computer outputs said block length at current time as is, without updating, to said block length controller, or, (process step C-1-2-2) when said echo cancellation amount is equal to or greater than said echo/noise ratio, said block length computer, if said block length at said current time is less than predetermined maximum value for said block length, increases said block length, outputs that increased block length to said block length controller, and then returns to process step C-1, or, if said block length at said current time is said maximum value for said block length, outputs said block length at said current time as is, without updating, to said block length controller; next after which, (in process step C-2) said block length controller holds said block length output by said block length computer; whereupon, when said echo attenuation amount output from said delay register is made a delayed echo attenuation amount, and said echo attenuation amount output by said echo attenuation amount computer is made a first undelayed echo attenuation amount: (in process step C-3) said first comparator compares size relationship between said first undelayed echo attenuation amount and said delayed echo attenuation amount; (in process step C-3-1) when said first comparator has judged said first undelayed echo attenuation amount to be larger than said delayed echo attenuation amount, said first comparator causes said block length controller to output said block length output from said block length computer without a delay to said adaptive filter modulus computer, or, (in process step C-3-2) when said first comparator has judged that said first undelayed echo attenuation amount is equal to or less than said delayed echo attenuation amount, said first comparator causes said block length controller to output said block length at point in time prior to said $\Delta i$ sample held by said block length controller to said adaptive filter modulus computer.

30. An echo canceler operating method according to claim 29, wherein: said block length determinator further comprises a second delay register and a second comparator; in said process step C-3-1, said first comparator also outputs said first undelayed echo attenuation amount as a first delayed echo attenuation amount for consideration; in said process step C-3-2, said first comparator also outputs said delayed echo attenuation amount as said first delayed echo attenuation amount for consideration; next after which said second delay register delays said first delayed echo attenuation amount for consideration by said $\Delta i$ sample and outputs same as a second delayed echo attenuation amount for consideration; next after which said second comparator compares size relationship between said second delayed echo attenuation amount for consideration output from said second delay register and said echo attenuation amount output by said echo attenuation amount computer; said second comparator does nothing when said second comparator has determined that said echo attenuation amount is larger than said second delayed echo attenuation amount for consideration, or, when said second comparator has determined that said echo attenuation amount is equal to or less than said second delayed echo attenuation amount for consideration, said second comparator outputs a control signal to said block length computer to cause a predetermined initial block length to be output as said block length to said block length controller, and, simultaneously, said second comparator outputs a control signal to said block length controller to cause said initial block length to be output to an adaptive filter modulus computer.

31. An echo canceler operating method according to claim 20, wherein: when said duplex detector has determined that said call status is said simplex status, (in process step D-1) said first comparator compares size relationship between said echo attenuation amount output from said delay register after being delayed by said $\Delta i$ sample and said echo attenuation amount output from said echo attenuation amount; whereupon, when said echo attenuation amount output from said delay register after being delayed by said $\Delta i$ sample is made delayed echo attenuation amount, and said echo attenuation amount output from said echo attenuation amount computer is made a first undelayed echo attenuation amount, (in process step D-1-1) when said first comparator has determined that said first undelayed echo attenuation amount is larger than said delayed echo attenuation amount, said first comparator outputs said first undelayed echo attenuation amount as said echo attenuation amount to said block length computer, or, (in process step D-1-2) when said first comparator has determined that said first undelayed echo attenuation amount is equal to or less that said delayed echo attenuation amount, said first comparator causes said desired echo attenuation amount indicator to output said desired echo attenuation amount from that desired echo attenuation amount indicator to that first comparator, and then outputs that desired echo attenuation amount as said echo attenuation amount to said block length computer; next after which, (in process step D-2) said block length computer compares size relationship between said echo attenuation amount output from said first comparator and said desired echo attenuation amount; (in process step D-2-1) when said echo attenuation amount is equal to or greater than said desired echo attenuation amount, said block length computer outputs said block length at current time as is, without updating, to said block length controller, or, (in process step D-2-2) when said echo attenuation amount is smaller than said desired echo attenuation amount, compares size relationship between said echo cancellation amount and said echo/noise ratio; (in process step D-2-2-1) when said echo cancellation amount is smaller than said echo/noise ratio, said block length computer outputs said block length at current time as is, without updating, to said block length controller, or, (in process step D-2-2-2) when said echo cancellation amount is equal to or greater than said echo/noise ratio, said block length computer, if said block length at said current time is less than a predetermined maximum value for said block length, increases said block length, outputs said increased block length to said block length controller, and then returns to process step D-2, or, if said block length at said current time is said maximum value for said block length, outputs said block length at said current time as is, without updating, to said block length controller; and next, (in process step D-3) said block length controller outputs said block length to said adaptive filter modulus computer.

32. An echo canceler operating method according to claim 31, wherein: said block length determinator further comprises a second delay register and a second comparator; in said process step D-1-1, when said first undelayed echo attenuation amount is judged to be larger than said delayed echo attenuation amount, said first comparator also outputs said delayed echo attenuation amount, as a first delayed echo attenuation amount for consideration, to said second delay register; in said process step D-1-2, said first comparator, after causing said desired echo attenuation amount to be output from said desired echo attenuation amount indicator to that first comparator, also outputs said delayed echo attenuation amount, as said first delayed echo attenuation amount for consideration, to said second delay register; next after which said second delay register outputs said delayed echo attenuation amount after a delay of $\Delta i$ sample, as a second delayed echo attenuation amount for consideration, to said second comparator; next after which said second comparator compares size relationship between said second delayed echo attenuation amount for consideration and said echo attenuation amount output by said echo attenuation amount computer; whereupon, when said second comparator has determined that said echo attenuation amount is larger than said second delayed echo attenuation amount for consideration, said second comparator does nothing, or, when said second comparator has determined that said echo attenuation amount is equal to or less than said second delayed echo attenuation amount for consideration, said second comparator causes said block length computer to output a predetermined initial block length, as said block length, to said block length controller.

33. An echo canceler operating method according to either claim 21, claim 29, or claim 31, wherein: when difference between said echo attenuation amount and said desired echo attenuation amount in sample number i (where i=1, 2, 3, ...) is made Z(i), said block length is made BL(i), and increase in that block length BL(i) is made $\Delta$BL(i), and when said duplex status has determined that said call status is said simplex status and said block length computer has determined both that said echo attenuation amount input to said block length computer is smaller than said desired echo attenuation amount and that said echo cancellation amount is equal to or greater than said echo/noise ratio, said block length computer increases and computes said block length BL(i), according to formula below, $$\left.\begin{aligned}BL(i+1) &= BL(i) + \Delta BL(i) \\ \Delta BL(i) &= INT\left(10^{\frac{Z(i)}{20}} + C1\right)\end{aligned}\right\}$$

$$\left.\begin{aligned}BL(i+1) &= (1.0 + \Delta BL(i)) \cdot BL(i) \\ \Delta BL(i) &= INT\left(10^{\frac{Z(i)}{20}} + C1\right)\end{aligned}\right\}$$

(where INT is an integerizing function, and C1 is either a constant or a function for ratio between power of said echo and power of said noise).

* * * * *